US011146302B2

(12) United States Patent
Marcum

(10) Patent No.: US 11,146,302 B2
(45) Date of Patent: Oct. 12, 2021

(54) MOBILE PHONE PROTECTIVE "BATTERY CASES" THAT PROVIDE HOUSING AND UNIVERSAL HOOKUP FOR "PROXIMATE HARDWARE" COMPRISED OF AFFIXED DEPLOYABLE, AND/OR REMOVABLE STRUCTURES THAT ANALOGOUSLY EXECUTE "MULTIPLE DIFFERING PHONE APPLICATIONS"

(71) Applicant: Alfred Marcum, LaGrange, KY (US)

(72) Inventor: Alfred Marcum, LaGrange, KY (US)

( * ) Notice: Subject to any disclaimer, the term of this patent is extended or adjusted under 35 U.S.C. 154(b) by 0 days.

(21) Appl. No.: 16/753,713

(22) PCT Filed: Oct. 4, 2018

(86) PCT No.: PCT/US2018/000381
§ 371 (c)(1),
(2) Date: Apr. 3, 2020

(87) PCT Pub. No.: WO2019/070303
PCT Pub. Date: Apr. 11, 2019

(65) Prior Publication Data
US 2020/0274573 A1   Aug. 27, 2020

Related U.S. Application Data

(60) Provisional application No. 62/568,266, filed on Oct. 4, 2017.

(51) Int. Cl.
*H04B 1/3888* (2015.01)
*H04M 1/02* (2006.01)

(52) U.S. Cl.
CPC ........ *H04B 1/3888* (2013.01); *H04M 1/0262* (2013.01)

(58) Field of Classification Search
CPC ..... H04B 1/3888; H04B 1/2883; H04M 1/02; H04M 1/72527; H04M 1/04; H04M 1/21;
(Continued)

(56) References Cited

U.S. PATENT DOCUMENTS 5,988,450 A * 11/1999 Cassarino ................. F41H 9/10
222/192
8,934,213 B2 * 1/2015 Froom ................ F41H 13/0025
361/232

(Continued)

*Primary Examiner* — Ankur Jain
(74) *Attorney, Agent, or Firm* — Breneman & Georges

(57) ABSTRACT

A multi-section protective case which encloses a wireless device while providing a universal mounting and storage platform for the housing of electrical and/or non-electrical peripheral hardware which is "supplemental" to the hardware carried by the wireless device itself. The multi-section protective case is generally comprised of an auxiliary battery source, modular customized bays for housing various pieces of peripheral "Proximate" hardware chosen specific to the desires and needs of the wireless device user, "Deployable/Retractable/Portable Structures" from which "multiple differing" Computer Applications and Devices may be conveniently run and/or executed from the same physical structure, either "wireless" and/or "wired" electrical interconnections and communications which are universally established and energized between all of the sections of the case and the entire hardware payload they bear simultaneous with completing the assembly of the case sections around the wireless device.

43 Claims, 29 Drawing Sheets

(58) Field of Classification Search
CPC ........... H04M 1/72522; H04M 1/0262; H04M 1/7246; H04M 1/72409; H04M 1/185; H02J 7/0042; G06F 1/1656
USPC .................................. 455/556.1, 557, 575.1
See application file for complete search history.

(56) References Cited

U.S. PATENT DOCUMENTS

| | | | |
|---|---|---|---|
| 10,142,458 B1* | 11/2018 | Cooksey | H04B 1/3822 |
| 10,169,933 B1* | 1/2019 | Harrison | H04W 4/02 |
| 10,333,647 B1* | 6/2019 | Harrison | H04K 3/68 |
| 10,421,358 B1* | 9/2019 | Marrisette, Sr. | H04W 4/14 |
| 2003/0003950 A1* | 1/2003 | Kroll | H04M 1/21 |
| | | | 455/557 |
| 2006/0279732 A1* | 12/2006 | Wang | G01J 3/02 |
| | | | 356/326 |
| 2016/0050309 A1* | 2/2016 | Gooberman | H04M 1/6075 |
| | | | 455/418 |
| 2016/0088136 A1* | 3/2016 | Di Donato | A61B 5/157 |
| | | | 600/365 |
| 2016/0260098 A1* | 9/2016 | Landrock | G06F 21/35 |
| 2017/0007159 A1* | 1/2017 | Dieffenderfer | A61B 5/0871 |

* cited by examiner

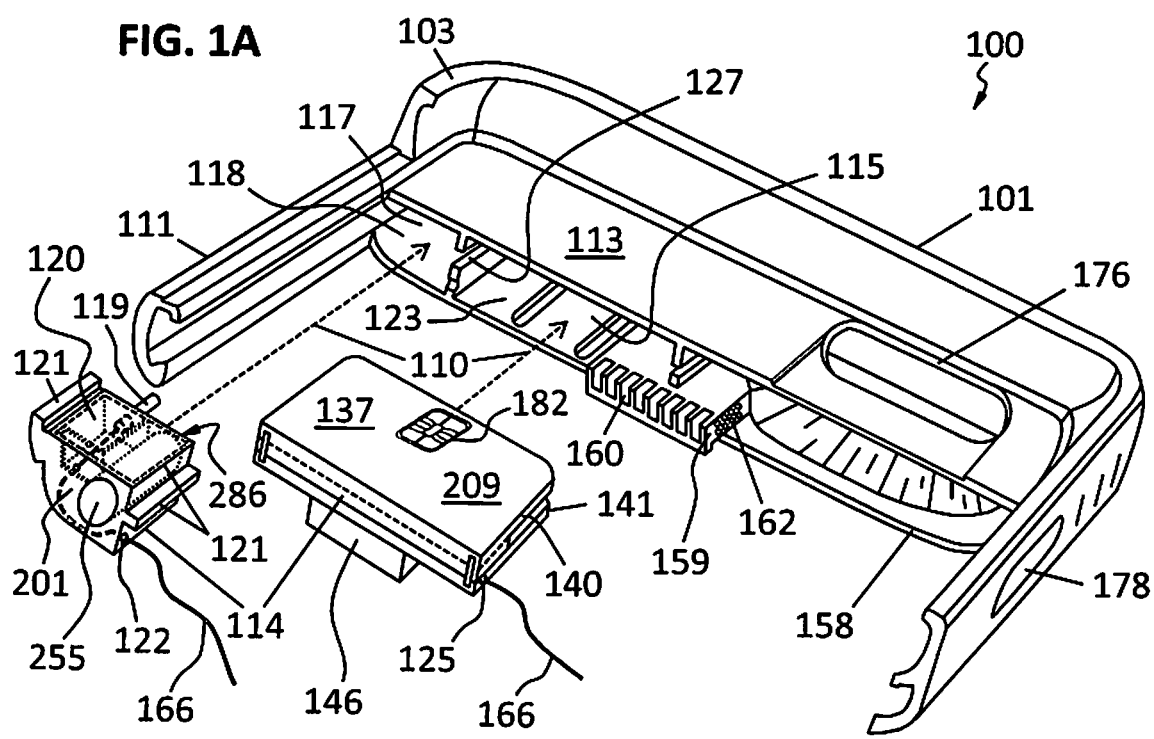
FIG. 1A
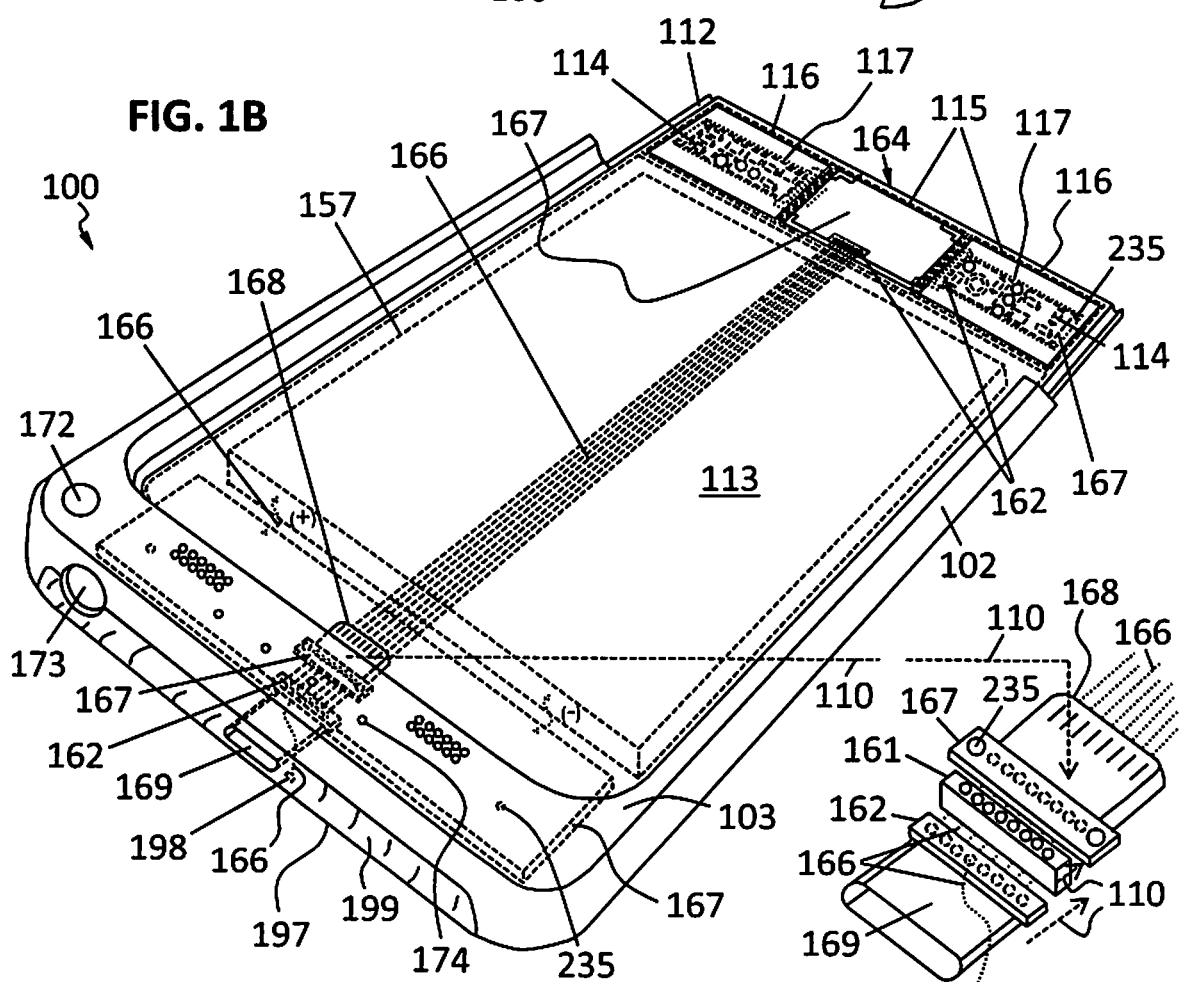
FIG. 1B
FIG. 1C

FIG. 3A Hand Contact Sensing
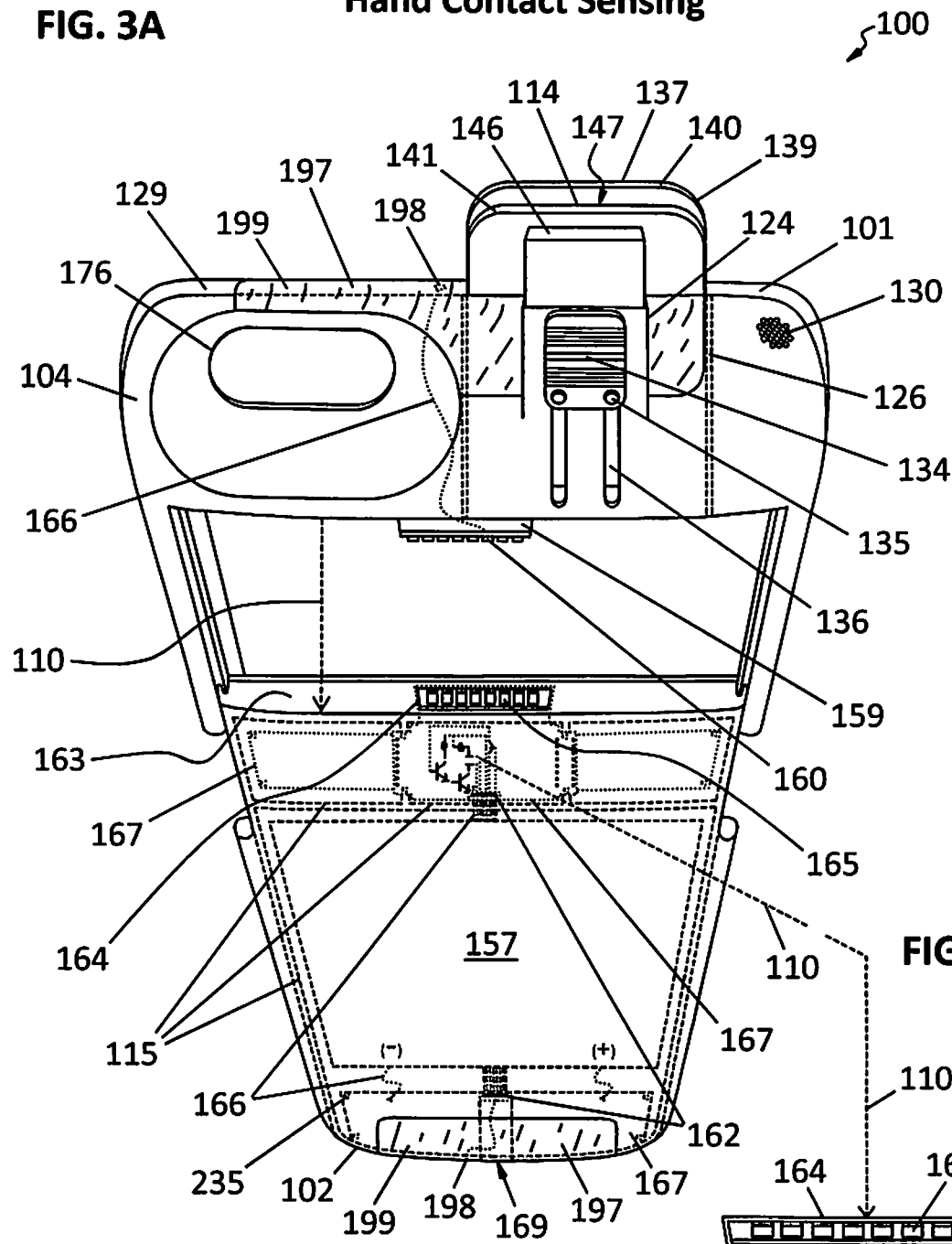
FIG. 3B
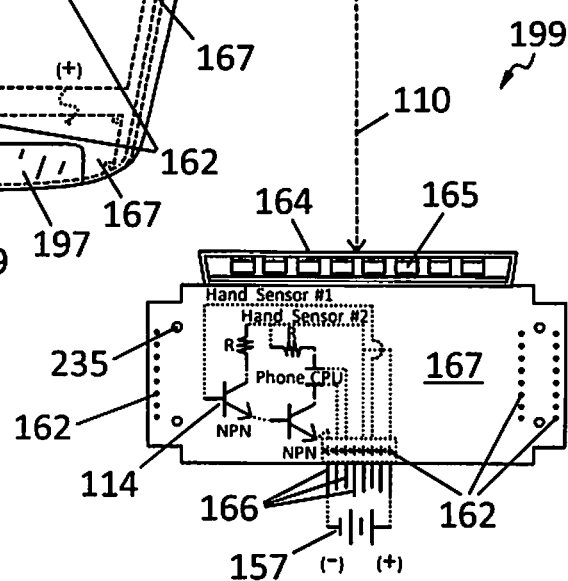

Deployable/Retractable Credit Card Reader

Multi-Applications Platform

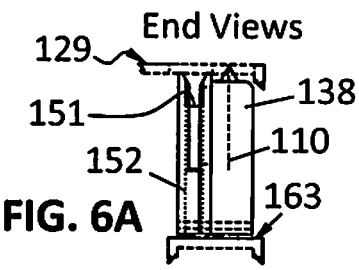
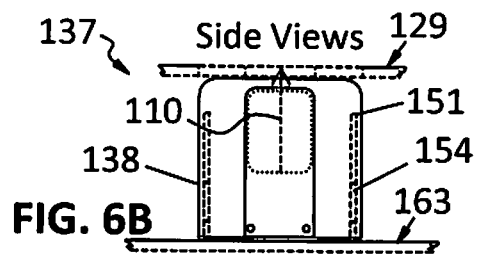
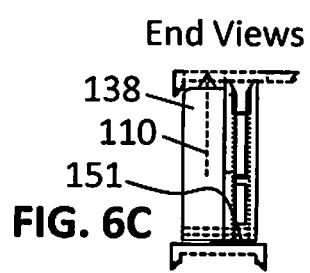
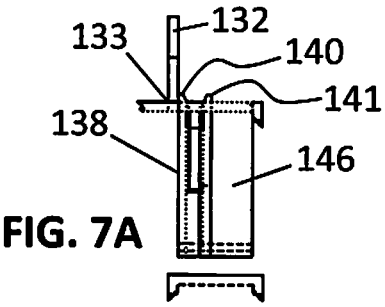
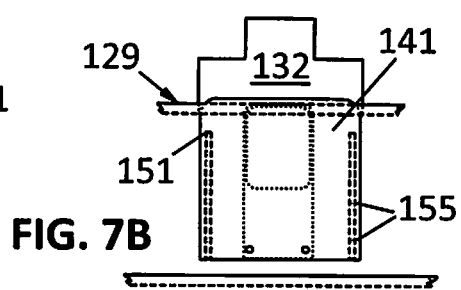
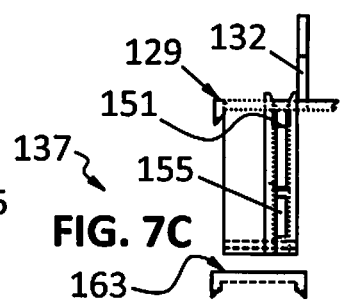
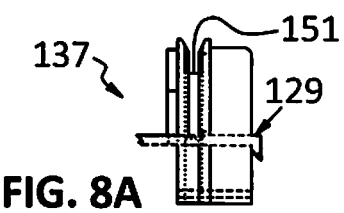
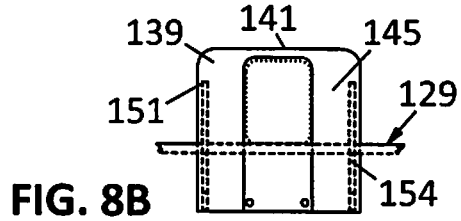
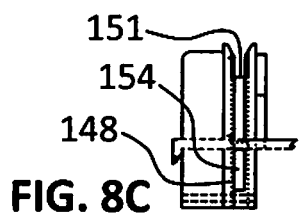
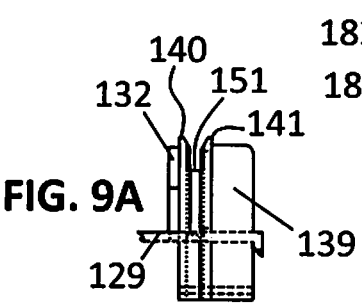
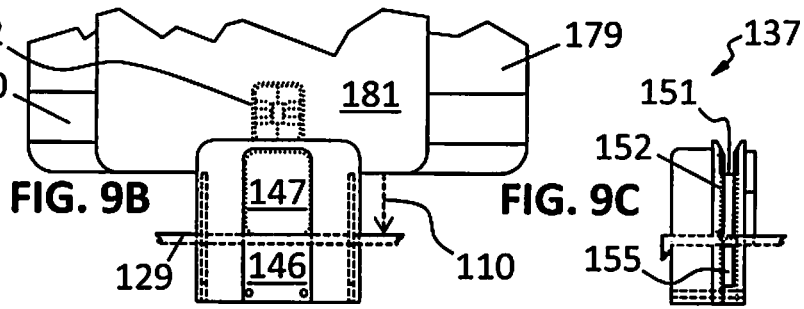
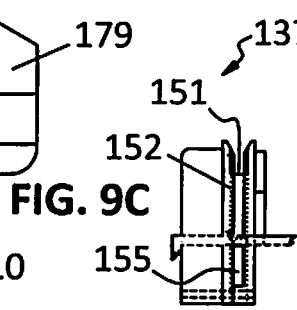
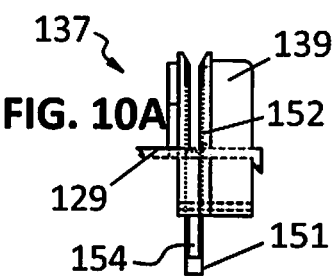
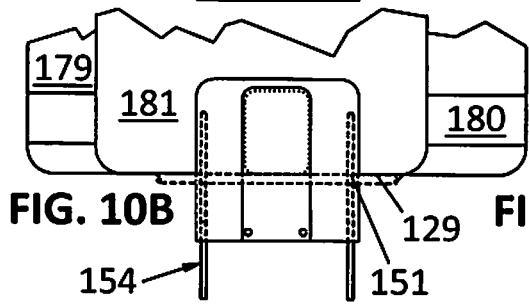
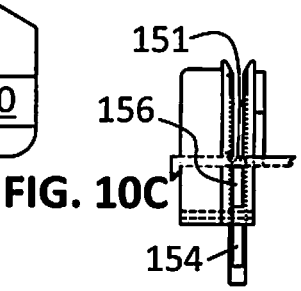
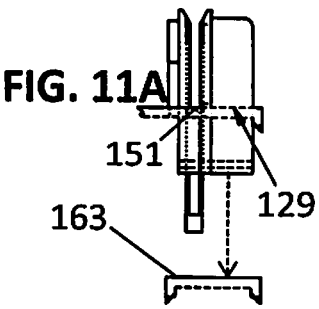
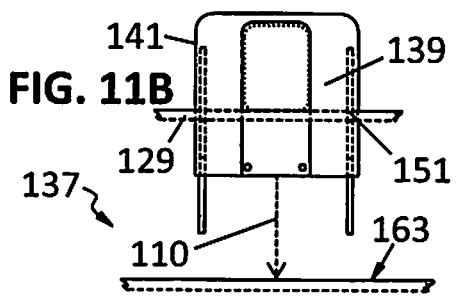
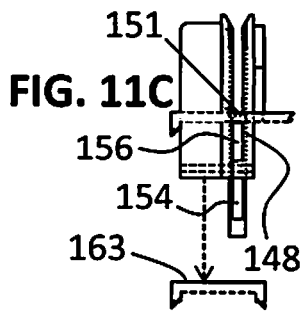

Mouthpiece/Funnel for Bi-Directional Gas Sampling

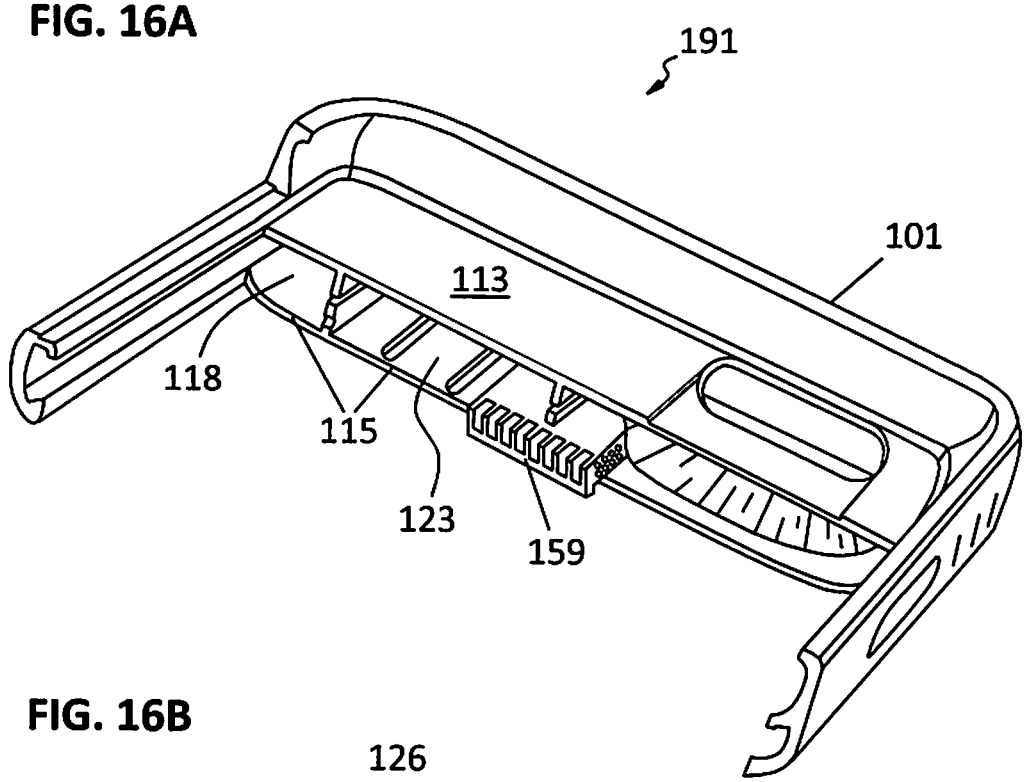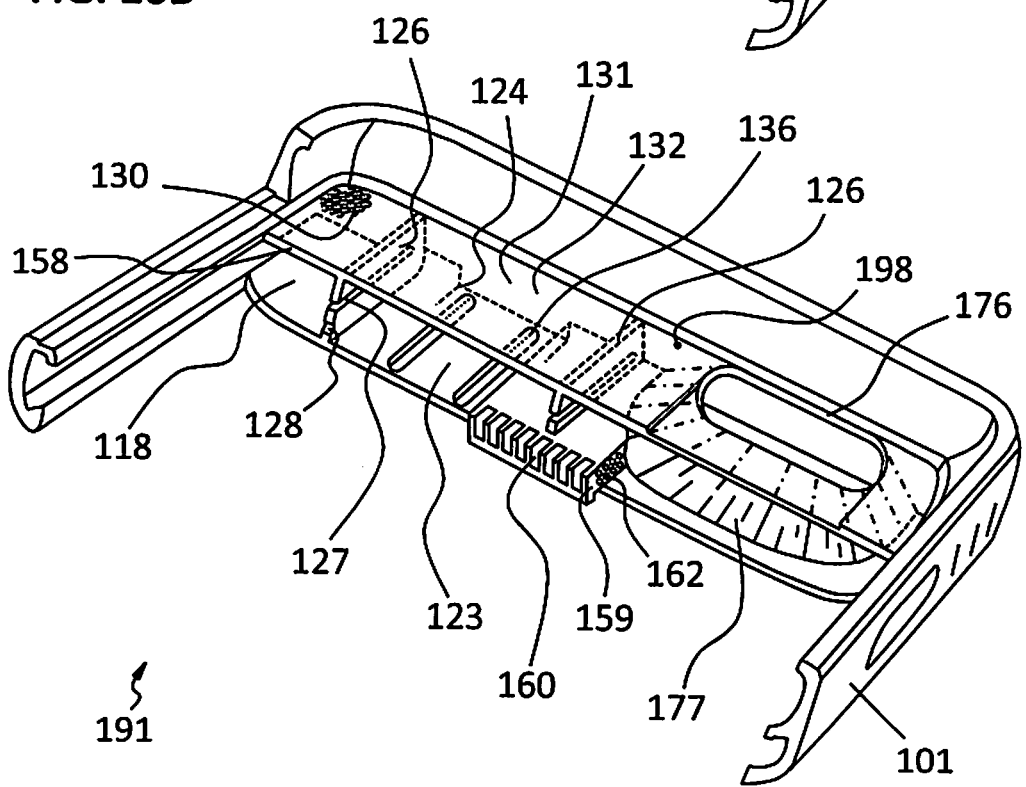

Full Width
Credit Card Reader

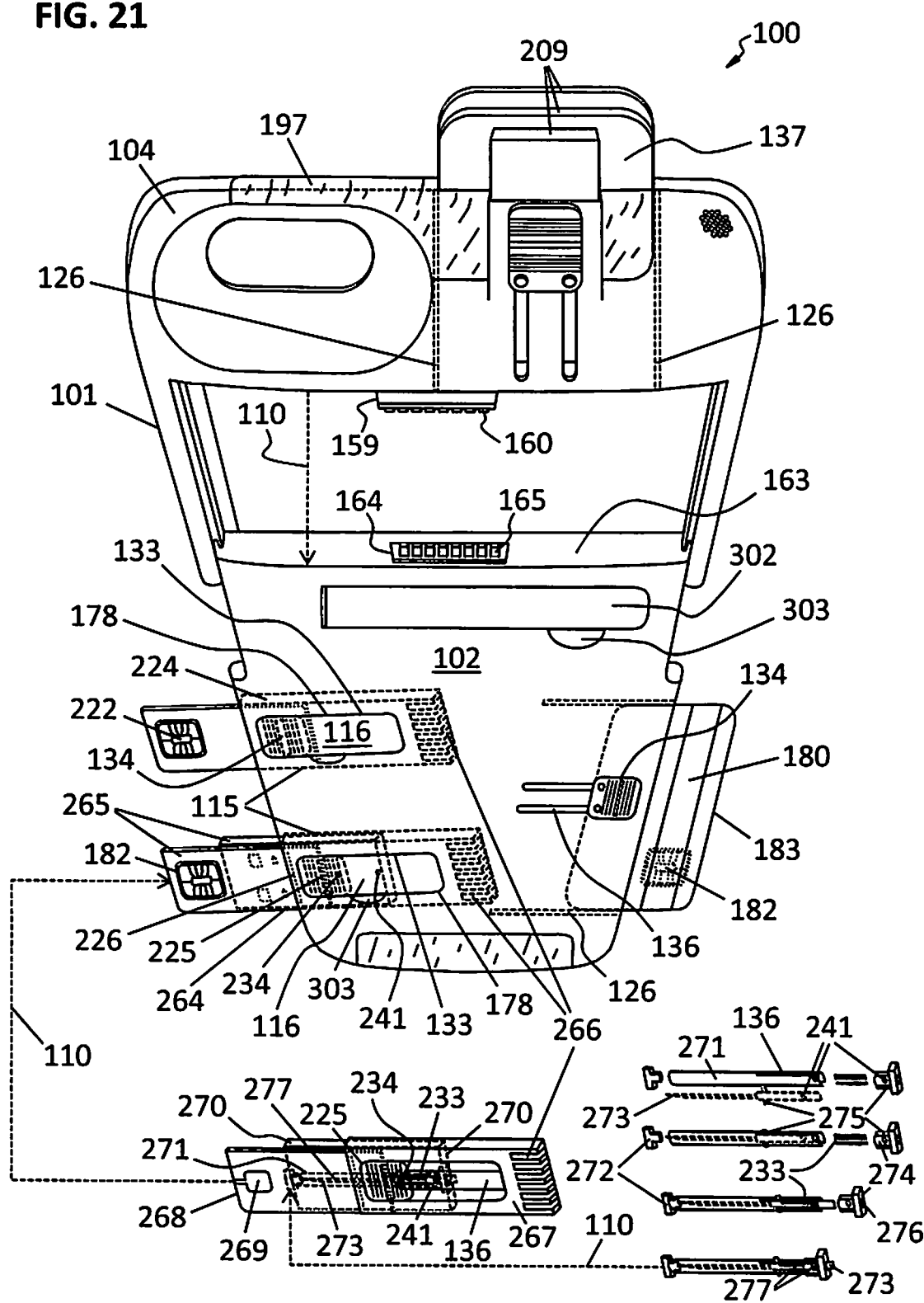
FIG. 21 Data Transfer/Data Memory/ or Blood Testing Devices

Case to Case Data Exchange

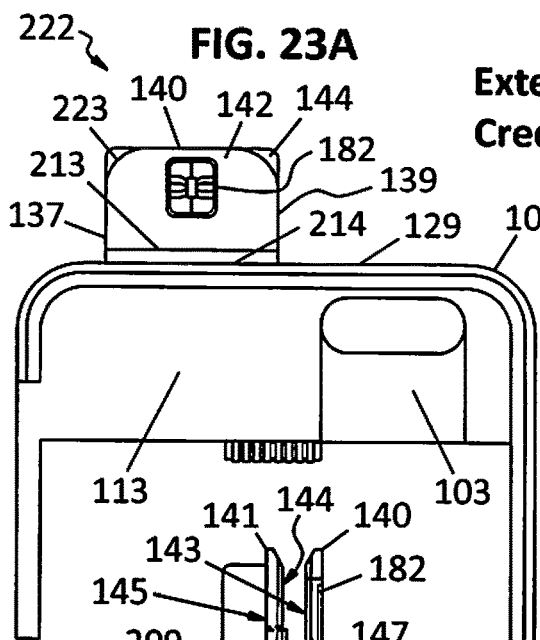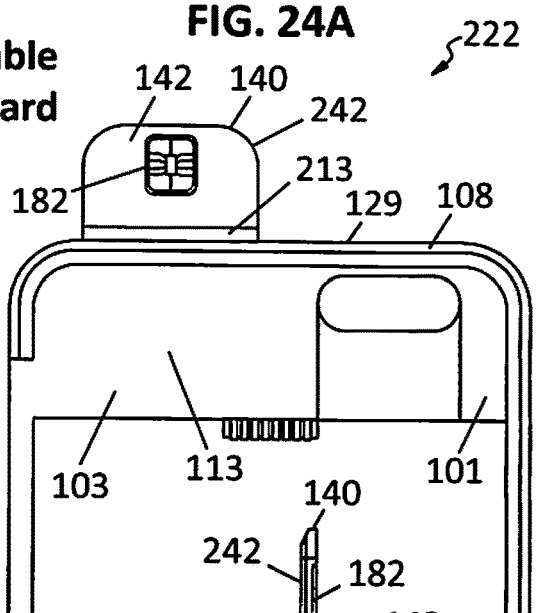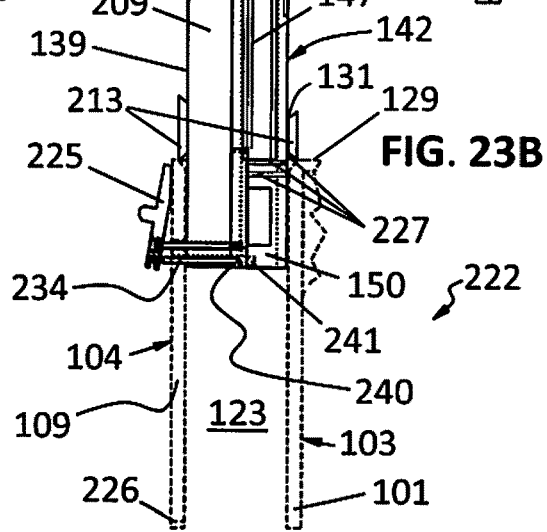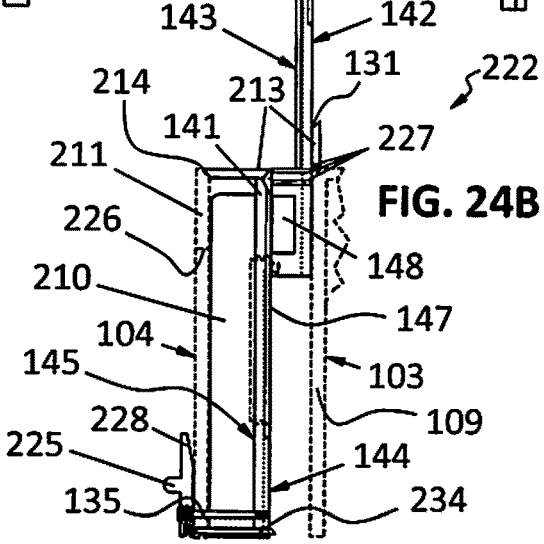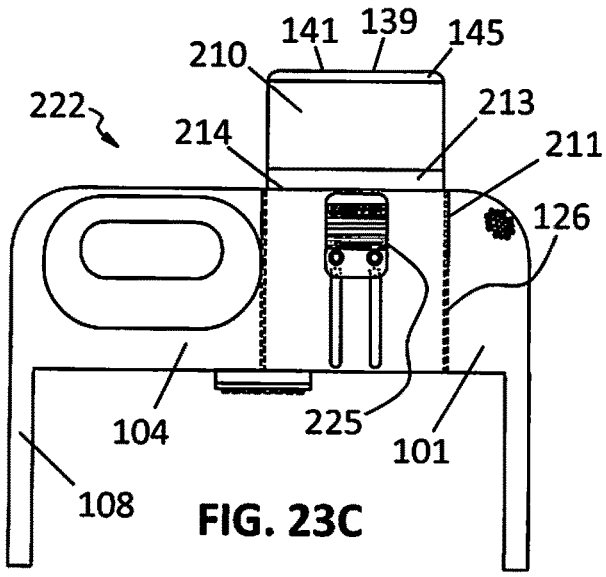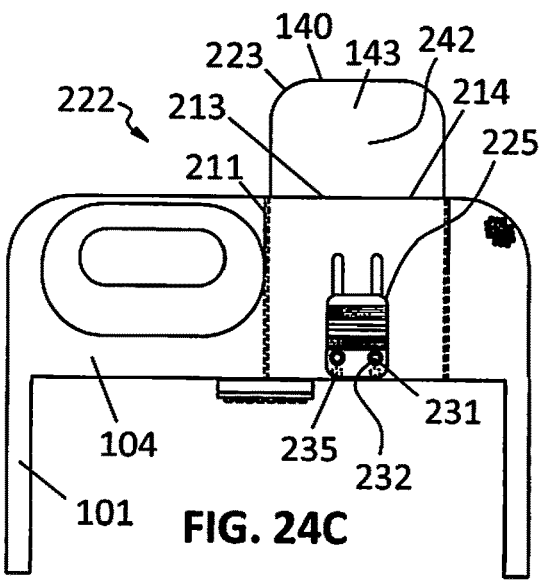

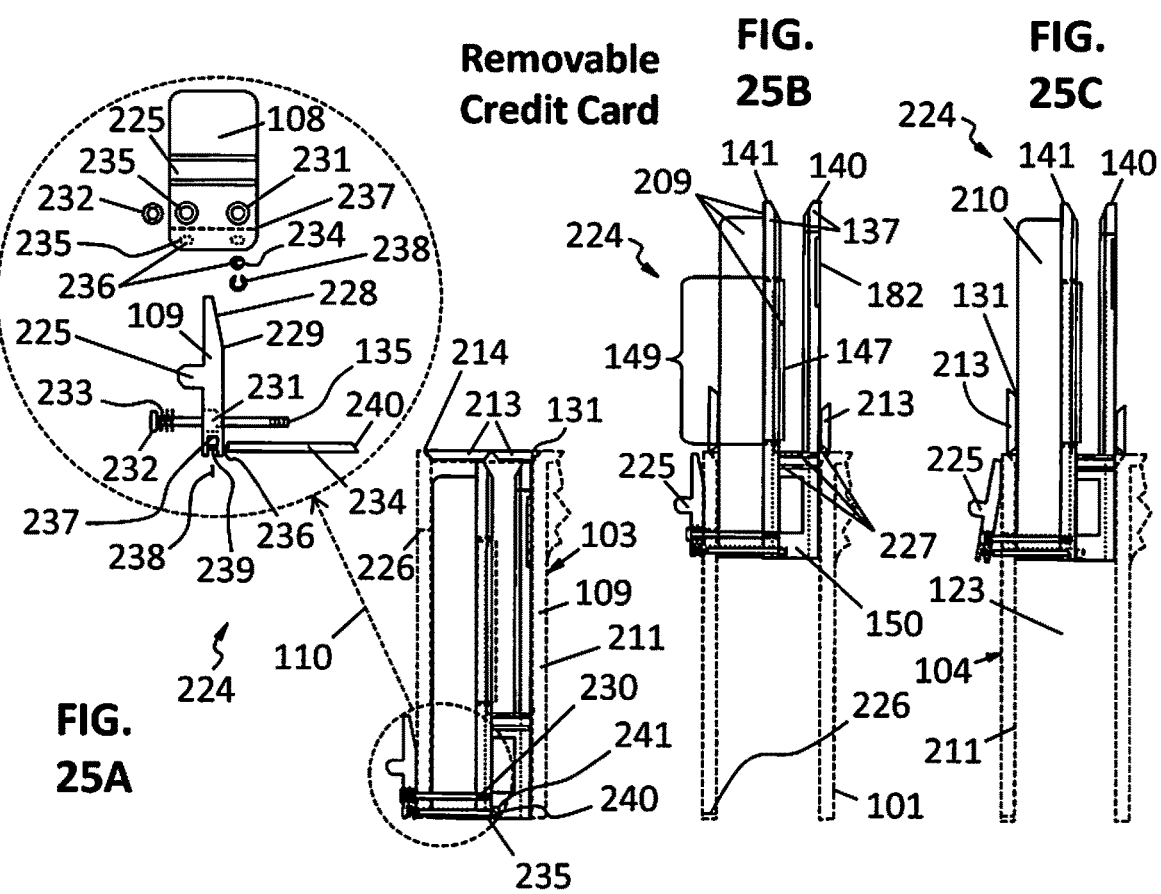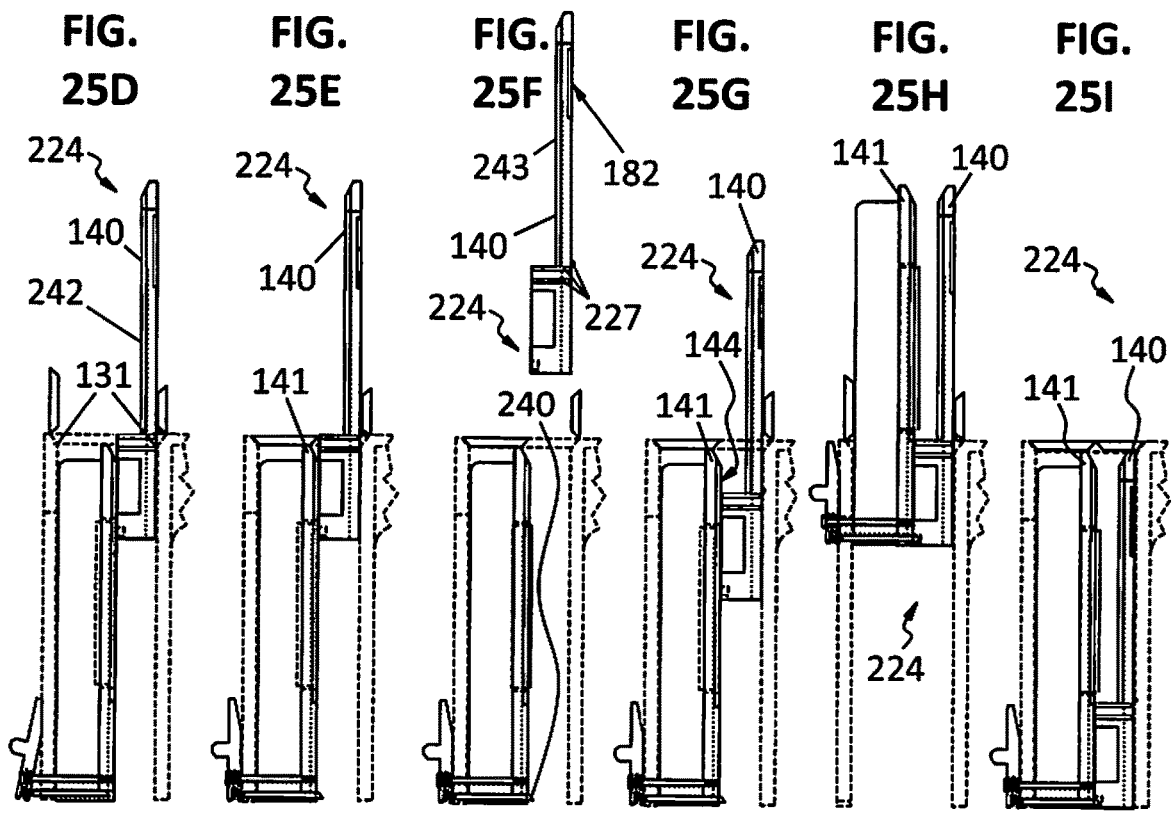

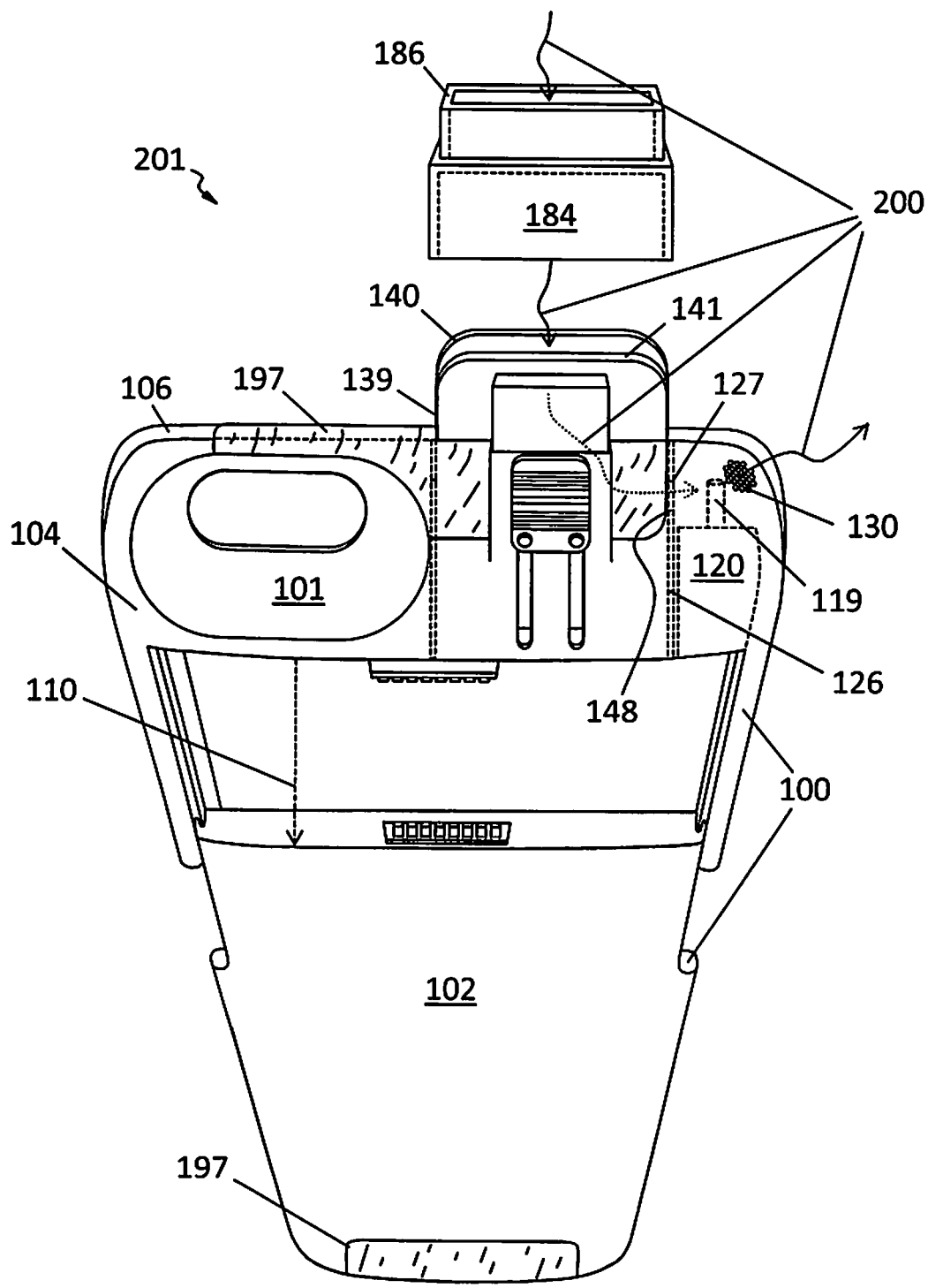

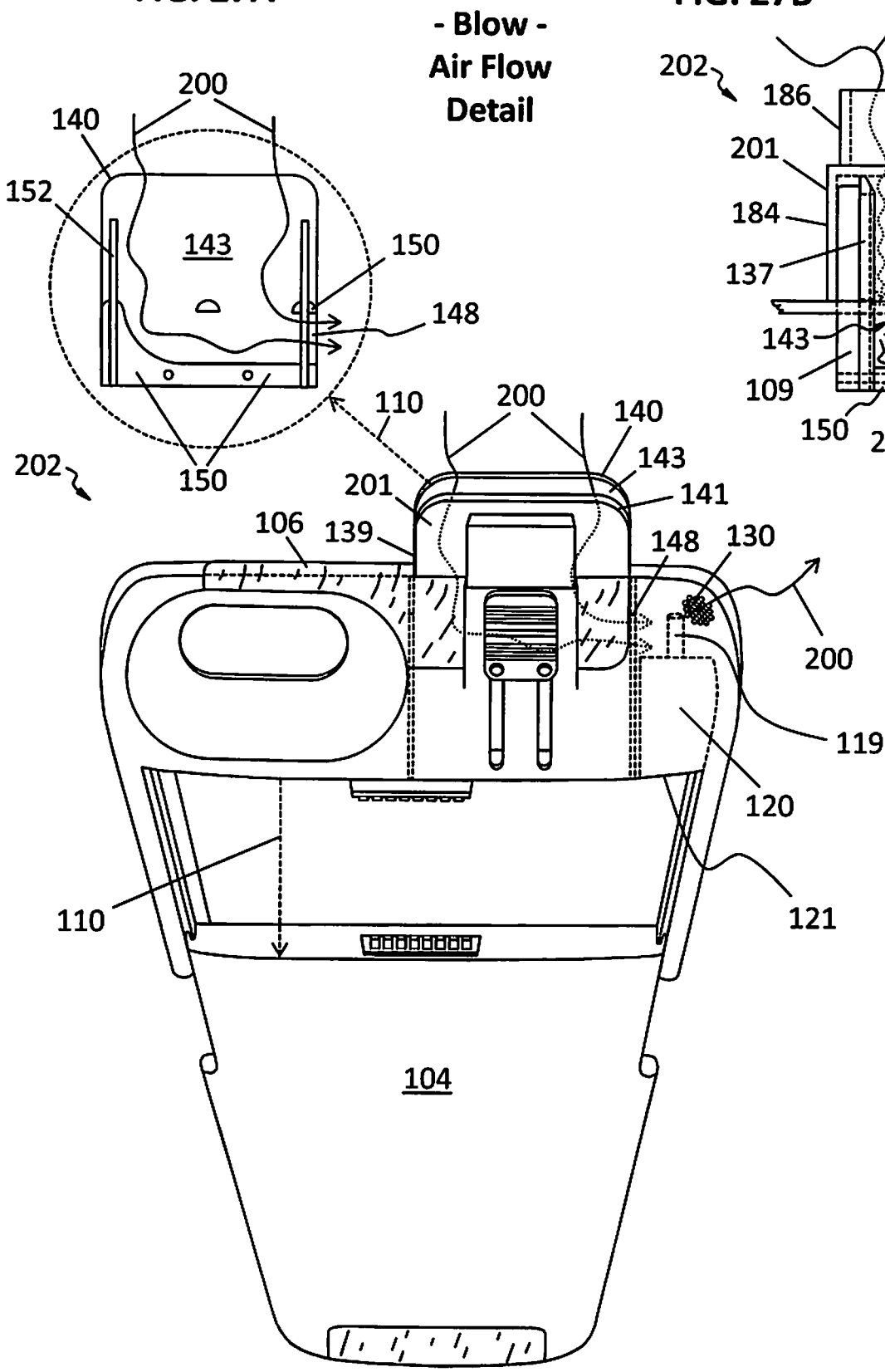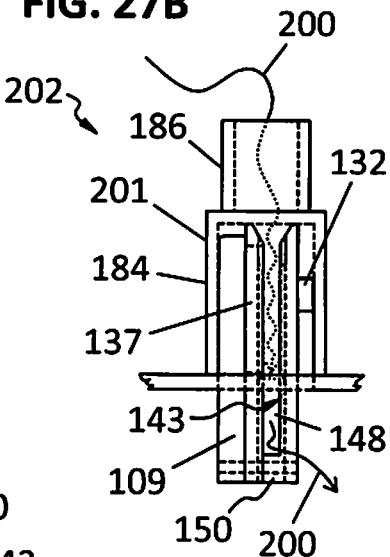

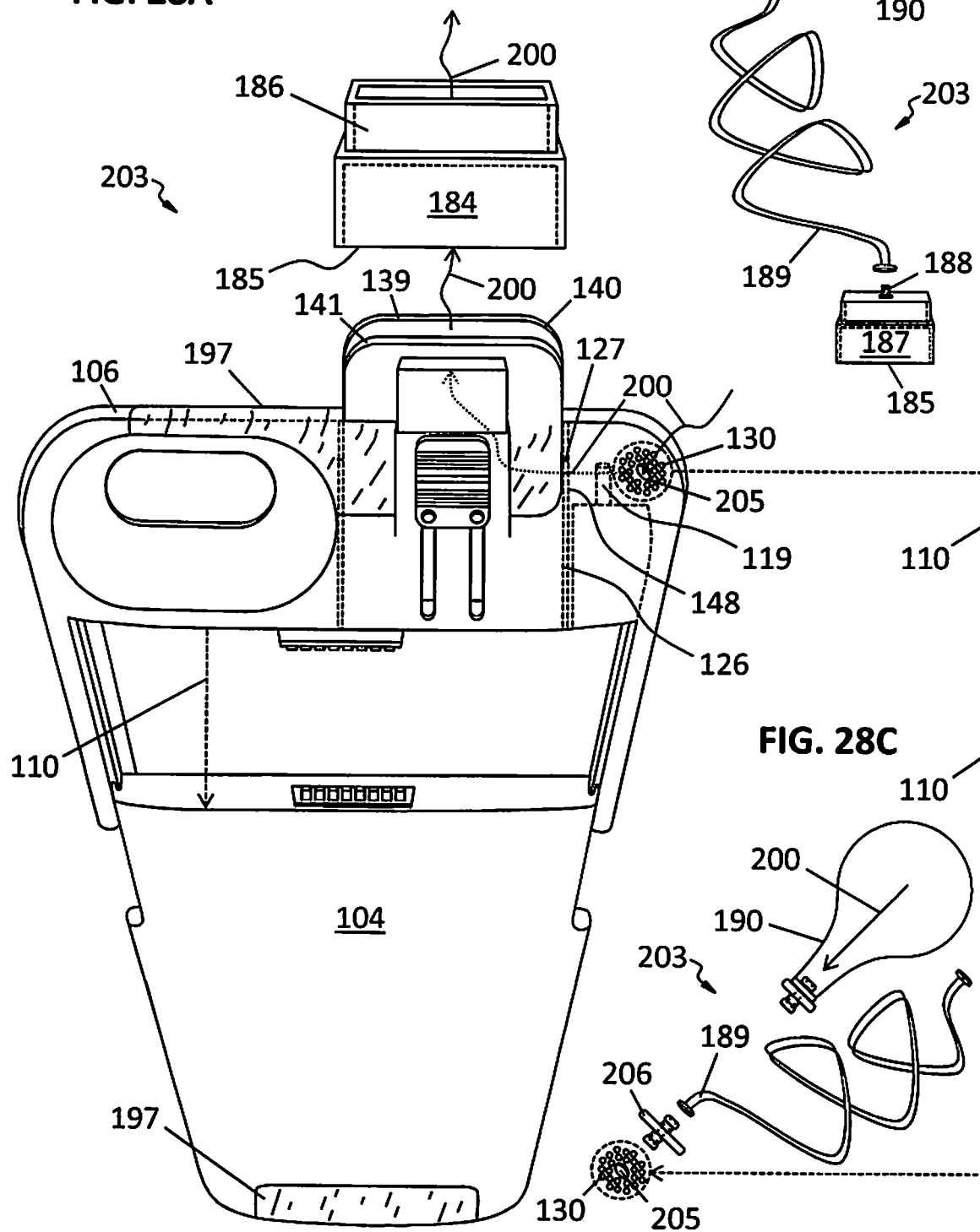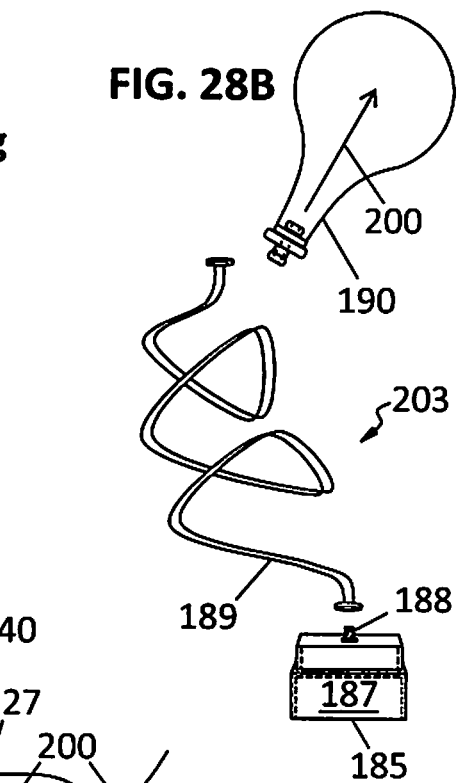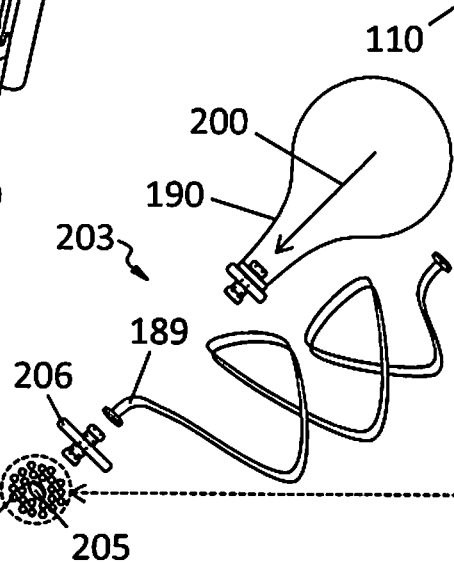

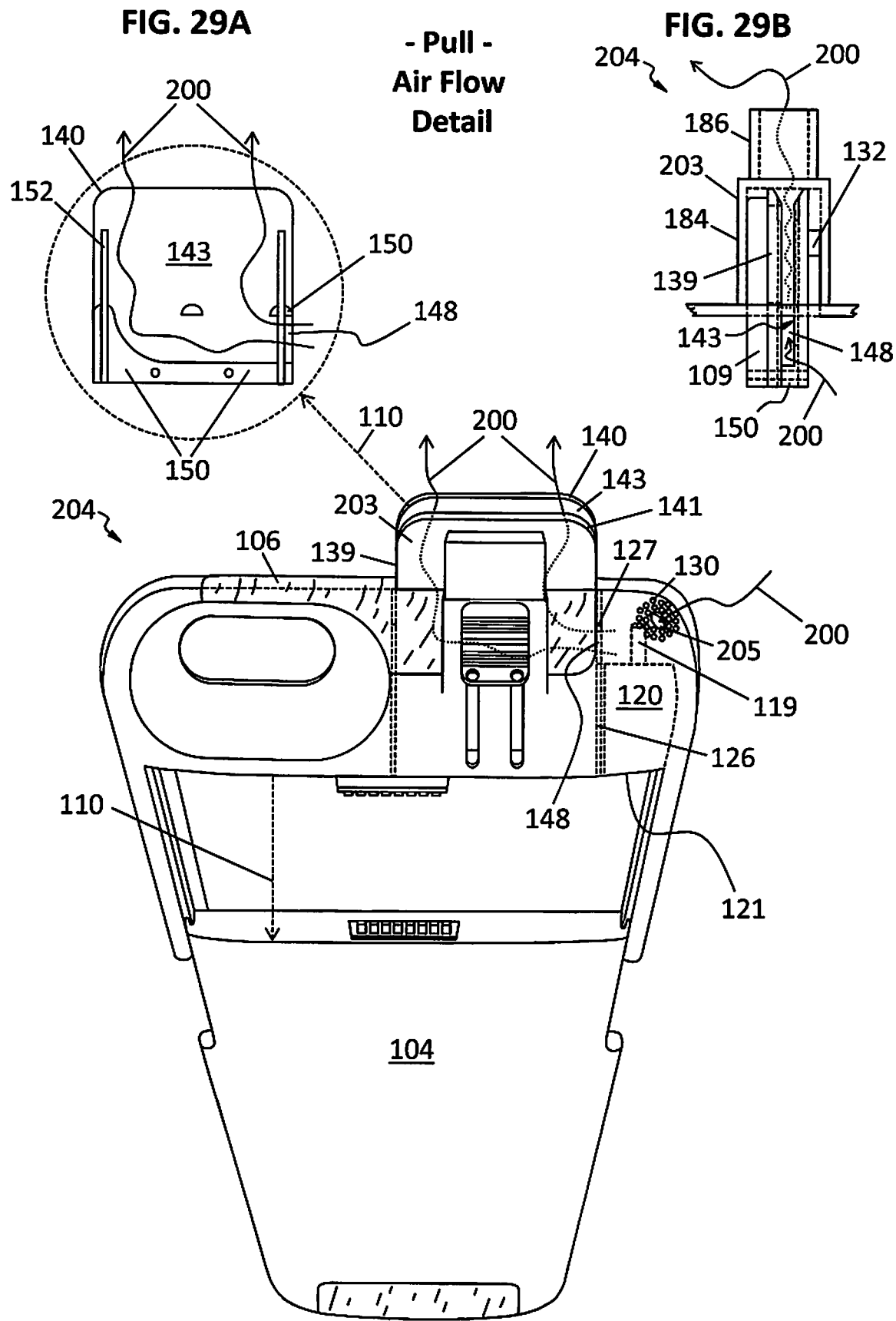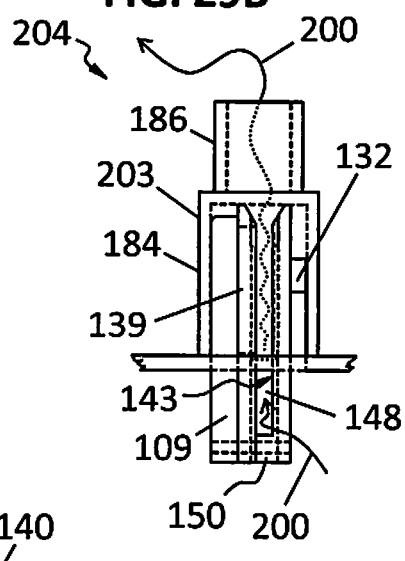

- Blow/Pull -
Spirometer

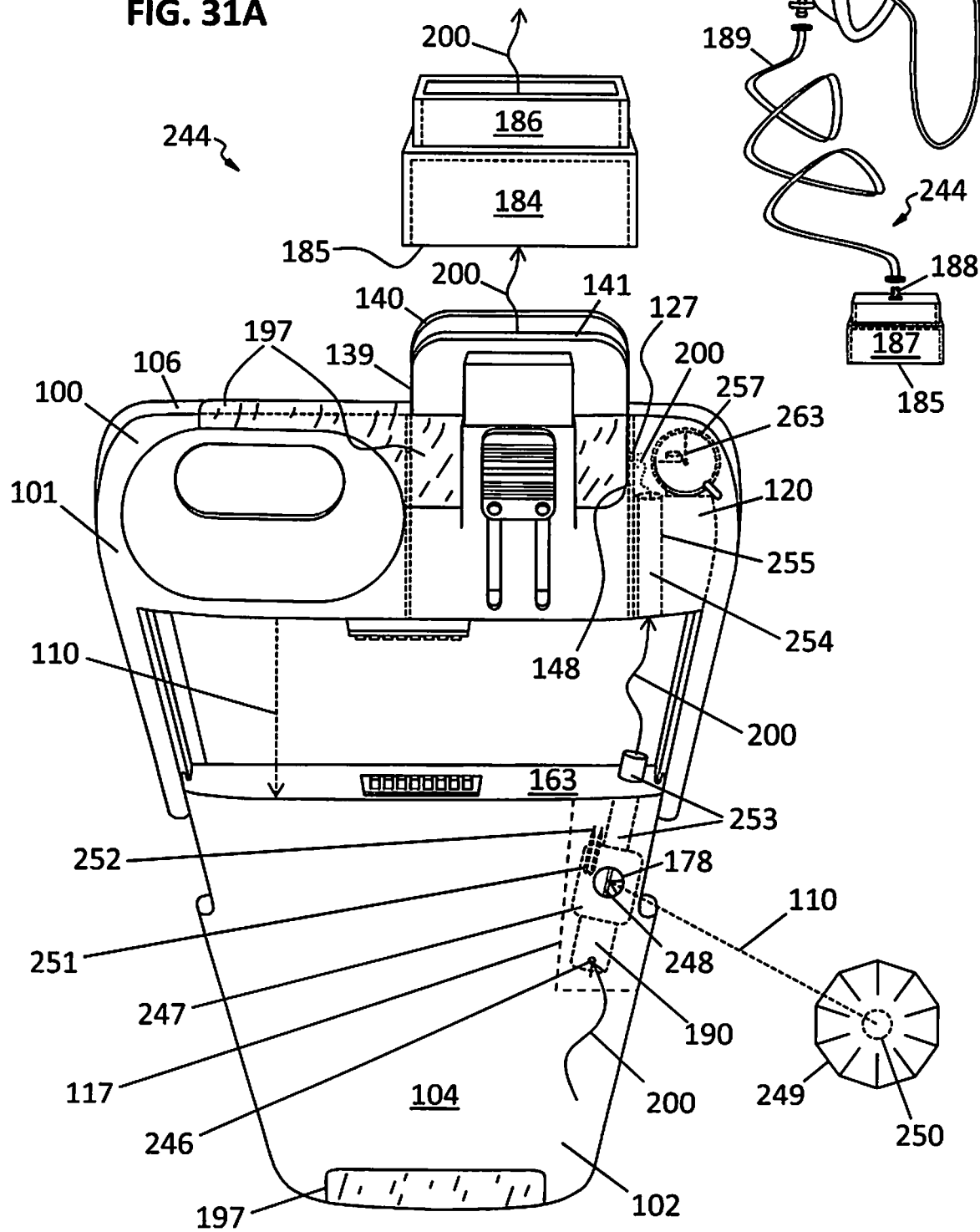

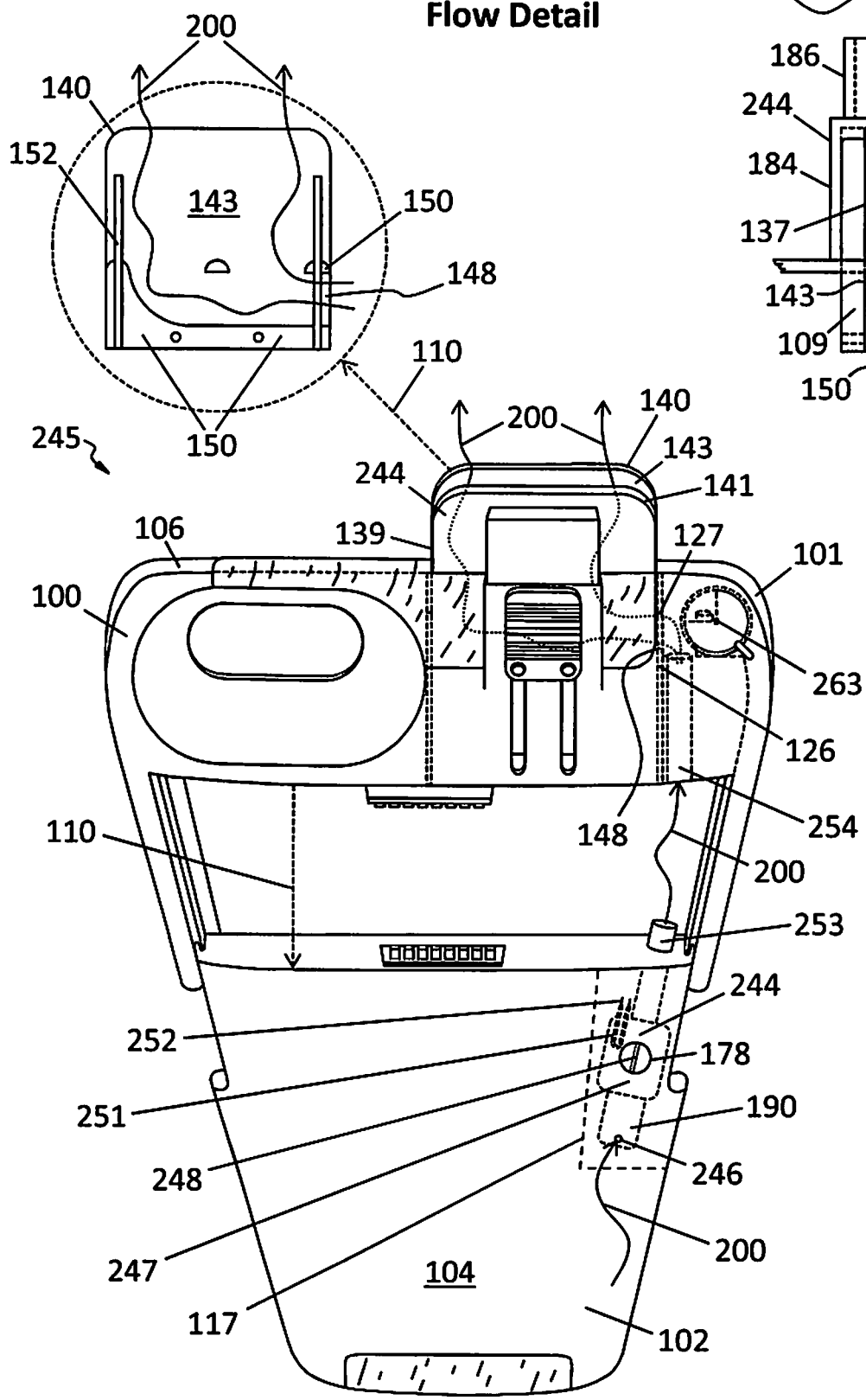

Vent On/Off

Whistle System

Stun Gun System

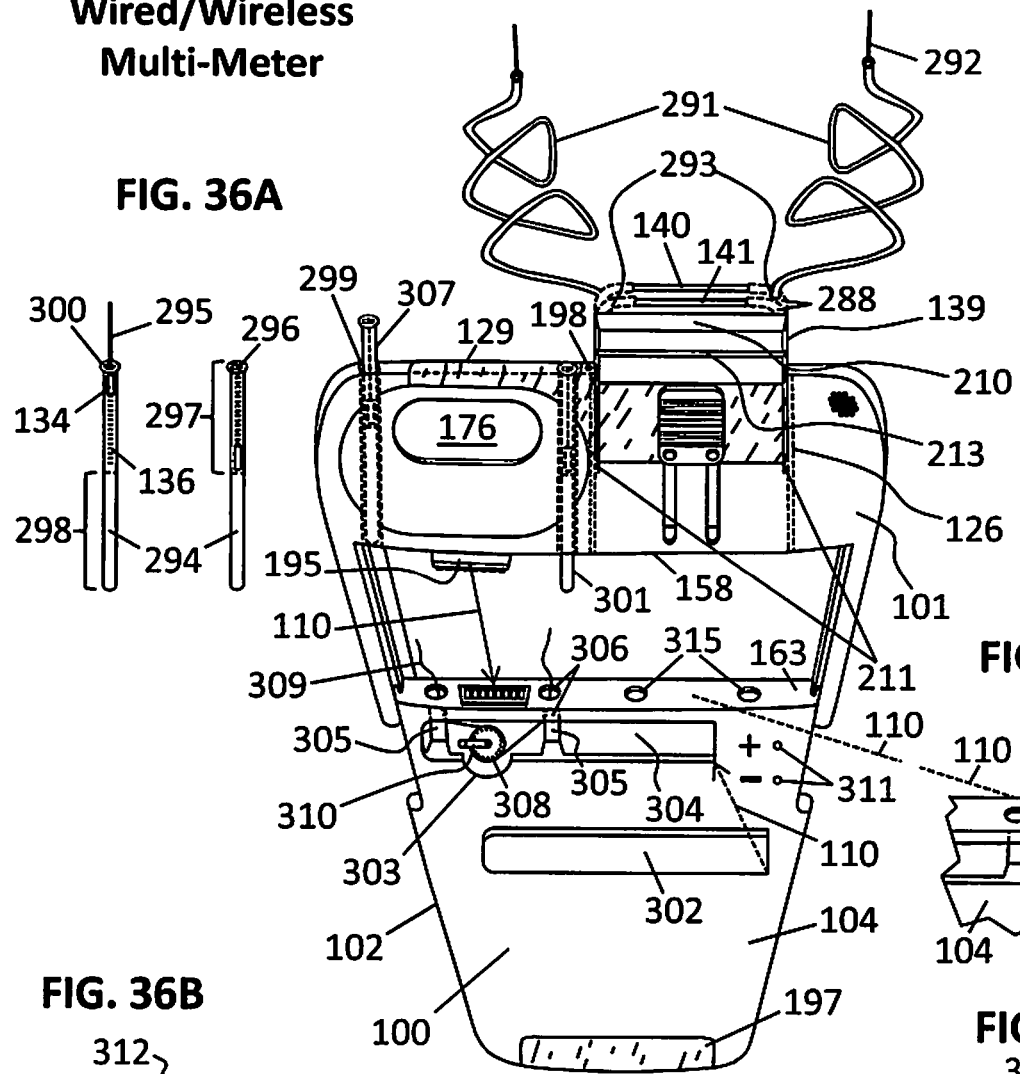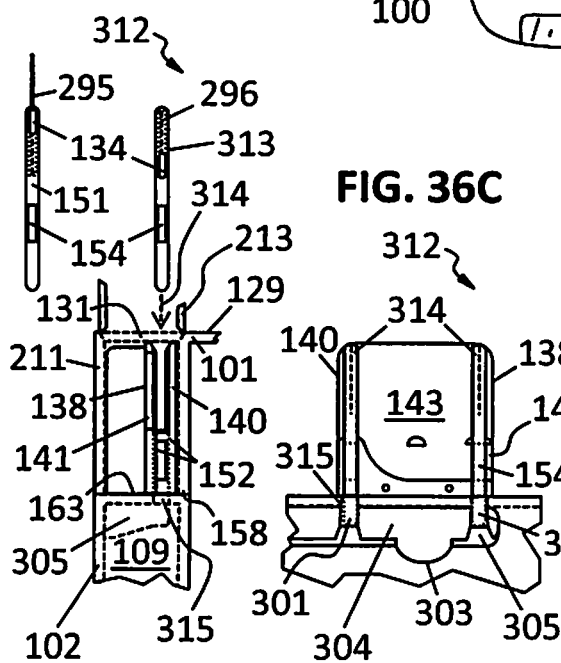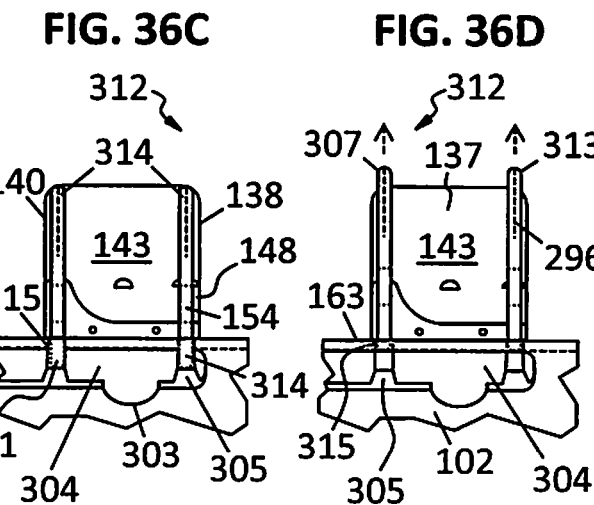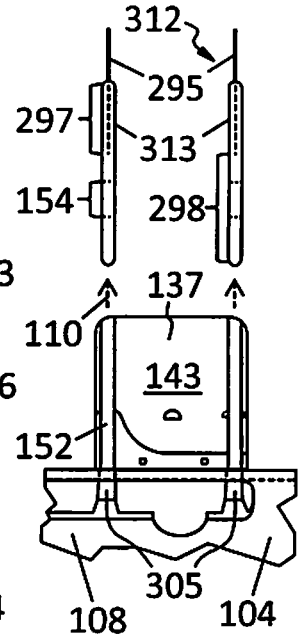

MOBILE PHONE PROTECTIVE "BATTERY CASES" THAT PROVIDE HOUSING AND UNIVERSAL HOOKUP FOR "PROXIMATE HARDWARE" COMPRISED OF AFFIXED DEPLOYABLE, AND/OR REMOVABLE STRUCTURES THAT ANALOGOUSLY EXECUTE "MULTIPLE DIFFERING PHONE APPLICATIONS"

TECHNICAL FIELD

The present invention relates to the field of wireless mobile phones and more particularly relates to the field of mobile phone protective cases and those that have backup power supplies.

BACKGROUND OF THE INVENTION

1. Field of The Invention

This invention addresses the problems of inconvenience associated with wireless mobile phones and their collaborative cross usage with an ever growing number of independent "specialized function" electronic devices. These "peripheral" standalone pieces of hardware/software exist today as specific duty devices that are chosen for their capability to perform particular computer driven tasks that are of special importance to the phone owner. Unfortunately, in order to have handy and make quick use of their features, the majority of these free standing devices require physical carry by the user that is totally separate to the carry of their phone.

More specifically, this invention centers upon the provision of novel features and design for an autonomous "Wireless Device Enclosure Assembly", hereafter also described as a "Protective Phone Case Platform" that is situated in close proximity and alignment to the platform of the "Wireless Phone" it encloses. In addition to providing the phone with protection from physical damage, the unique Protective Phone Case Platform pursues a multiple inventive focus by providing unique housing for some highly novel electrical/non-electrical "Supplemental/Peripheral Hardware" hereafter also described as "Proximate Hardware" that conveniently travels "in tandem" with the daily carry of the phone.

Proximate Hardware is defined by this invention as any "supplemental to the phone" computer related electrical hardware and/or non-computer related non-electrical hardware that is physically located and/or housed within or upon the platform of a protective case in either a fixed, deployable, and/or removable state of affixation whereby the Proximate Hardware resides "adjacent to" but "independent of" the phone platform itself. This "next door" residency ensures that the features and assets provided by the Proximate Hardware will always remain highly "user friendly" and available to the phone owner by occupying a physical location that continually stays in close "proximal contact" with said phone platform and thereby, of highest importance, does "not" require said Proximate Hardware to be carried secondarily to the transport of the phone.

Also introduced as a vital portion of this invention is a generally deployable "Multi-Applications Platform" which is the star member of the Proximate Hardware ensemble that is housed and safely stored within or upon the Protective Case Platform.

A Multi-Applications Platform (MAP) is defined by this invention as a structure of highly novel and specialized form comprising and bearing electrical and/or non-electrical Proximate Hardware that resides either as a fixed or, as in the preferred embodiment, a deployable/retractable/and/or removable structure capable of carrying and providing more than one function and/or computer driven application to the phone owner/user. The "more than one" functions or applications that are activated and performed from the Multi-Applications Platform are generally of dissimilar origin and purpose. Thusly, this unusual collective of APPS has the novel capability to render generally unrelated outcomes and services to the user while being uniquely combined, easily accessed, successfully produced, ably conducted, and conveniently utilized from the same or similar physical structure and overall design for said Multi-Applications Platform.

In the preferred embodiments, the phone case platform generally comprises upper and lower (multiple/two or more) "Enclosure Assembly Sections" hereafter also described as upper and lower body portions or body segments. Full case assembly is reached concurrent with the top (upper) and bottom (lower) component body portions of the case being slid over the ends of the phone effectively encasing it within. At that point, universal "wired" electrical connection, power, and communications are all beneficially achieved for and between the "entirety" of the case to and with the wireless phone inclusive of the case portions and the collection of Proximate Hardware they each carry. Alternatively, "wireless" communicative technology may be employed to establish some or all of the case to phone interconnectivity.

An Auxiliary Power Source in the form of a battery may also be provided and housed within the platform that comprises the Protective Phone Case. The battery is capable of powering the entire electrical package of Proximate Hardware, inclusive of the "Multi-Applications Platform(s)", that are housed within or upon the case as well as providing backup power to the phone along with universal charging capabilities for the batteries of both the case and the phone.

2. Description of The Prior Art

In the past there have been examples of supplemental hardware designed for a particular function being housed within a protective case, such as U.S. Pat. No. 9,619,623 which discloses case borne wireless finger sensors for biomedical analysis. However none have provisions within the case for adding differing modules upon upper and lower component portions of the case that offer the "plug and play" convenience of running unrelated APP hardware that is similarly coupled and housed within or upon the case whereby it undergoes instant electrical linkage and availability for either an affixed usage or a deployable/retractable usage that may be executed from within and/or upon the transportable case/phone sandwich.

U.S. Pat. No. 8,413,901 discloses a miniaturized portable credit card reader having a male signal plug which is inserted within a female jack integral to the wireless device. The slot for swiping the card is short therefore the act of physically conducting a swipe can easily suffer from rocking of the card while pushing or pulling that card through the reader causing data interpretation errors which will occur if the swiped card is not carefully swiped against and in parallel to the short bed of the reader. Also any torquing action applied to the card during the swipe will cause the reader to rotate in relation to the wireless device. Most importantly, the reader is an independent device that must be secondarily tracked and independently transported, separate to the carry of the wireless device itself, otherwise it is rendered useless if it should be misplaced or forgotten.

While using the reader, it sits unwieldly exposed above the surface of the wireless device it is plugged into and upon concluding device usage it must be unplugged and user stored and transported in a mostly unprotected manner while being carried by the user.

Comparatively, the card reader of the current invention is a deployable/retractable device that always safely resides within the case that encloses the wireless device and thereby simply can't be forgotten or misplaced which makes it always instantaneously available for deployment and usage. Its slot for swiping a credit card therethrough, or its vertical insertion into, lies in total parallel to the top surface of the phone which advantageously provides a stable vertical stop and a long surface to swipe the card against without rocking. This produces highly accurate readings with one single swipe, with no potential of torque induced rotation of the device, while endowing the user with better tactile feel and feedback as to the swipe as having been correctly and ably executed. The device also has embodiments for EMV, vertical insertion, reading and unique provisions for providing data to other readers or for novel data exchange with other wireless devices which are similarly equipped. Upon concluding use of the device it, highly importantly, is retracted back into its dedicated housing within the case where it is safely stored without the possibility of incurring damage which might take place while carried and transported within the pocket or elsewhere upon the person of the user.

Lastly, only the device of the current invention possesses the capability and the significant advantages for "cross usage" to run and execute, from one in common structure, other significant peripheral computer hardware applications such as those described in the immediate following.

Patent Publication 2014/0216136, similar to the card reader of U.S. Pat. No. 8,413,901, also discloses an independently carried device which similarly must be temporarily plugged into a wireless device such as a phone. Its purpose is to analyze the composition and qualities of a breath sample blow into the device by the user. The same deficiencies exist for its unwieldly exposure and positional instability while remaining plugged into the phone as well as the all important fact of its unavoidable disposition after concluding device usage as being a secondary independent device that must be tracked and carried independent to the phone.

Comparatively, the gas analyzation device of the current invention is conducted upon the same deployable/retractable structure as just described for the credit card data reader/data provision device of this patent application. It provides the same advantages of instant availability for deployment and usage followed by quick retraction and protected storage within its dedicated housing within the case enclosing the phone. Until it is needed once again, the gas analyzer remains in safe and consistent contact and travel with carry of the phone. This novel gas analyzer device benefits from possessing bi-directional gas flow capabilities which, unique to its design, function not only as a blow (push gas) device but also a draw (pull gas) device that produces highly useful features and unique benefits.

Neither U.S. Pat. No. 8,413,901 nor Patent Publication 2014/0216136, or their like, have any potential for combining and executing their respective applications, or other types and combinations of applications, from the same deployable/retractable "mother" structure integrally borne by the case, as does the present invention.

U.S. Pat. No. 8,971,969 describes a customizable phone shell (case) that discloses embodiments for coupling hardware components to the shell that permit the user to select amongst a list of compatible hardware to decide which hardware choice that user may elect to output.

Comparatively, the phone enclosure platform device of the current invention provides modules within the case platform which have customized bays for housing the peripheral hardware required to execute the particular application(s) desired by the phone owner. These hardware storage modules may be included within all sections of the enclosure assembly where they are all universally electrically powered and communicatively interconnected to each other and the underlying enclosed phone in immediate concert with the act of completing assembly of the case around the phone. A particular focus and emphasis of this invention is paid toward module/bay construction within the upper "topmost" section of the case which facilitates hardware storage that is adjacent to the ears and mouth of the phone user thereby enabling easy access to the hardware and convenient execution of the desired application.

The case platform is uniquely outfitted with storage modules having specialized bays which have provisions for internal passageways and external venting/ports which form wiring and gas flow conduits that enable unique "Multiple Applications Platform(s)" (MAP) to have either a deployable/retractable and/or affixed mounting within their respective bays or upon the surface of the case. The novel design arrangement of the MAP permits more than one compatible application to be conducted from the same structure.

Patent Publication 2010/0297929 discloses a wireless device having capacitive or inductive human touch detection sensors while Patent Publication 2012/0052929 discloses a case having capacitive touch sensors disposed upon the case to respond to touches by the user of the case/phone assemblage indicating user preference through their choice by touching one icon out of a host of differing icons or graphic objects.

Comparatively, the present invention employs either capacitance and/or inductance arrangements to monitor for human touch to be applied by each of the user's hands upon a pair of sensory contact areas where each contact is specifically located and affixed at opposing ends of a multi-sectioned case, and/or phone, while enclosing that phone. Full electrical interconnection is made to all electrical components located upon or within the case and, particular to each of the touch sensors, upon each end (piece) of the case in concert with completing full assembly of the case around the phone. The task assigned to these two sensory contacts is to aid in differentiating between the driver and passengers in the prevention of Texting and Driving. The two hand contacts monitor/measure pre-established thresholds for circuit capacitance and/or inductance that enable a distinct differentiation to be ascertained as to whether one, two, or no hands are being used to make simultaneous contact upon/across the two sensory contacts. Use of two separate hands is the desired and approved qualifying grasp upon the sensory contacts that permits continued use of the phone. Contact by one hand bridging across both sensory contacts or, alternatively having only one or neither of the sensory contacts receiving human touch, are all disqualifying touch arrangements that will cause the phone to be immediately blocked from having any further input upon its key board while effectively rendering the phone and its related applications in a temporarily unusable state until a proper qualifying grasp by two separate hands is established and retained by the user.

There are phone cases that combine supplemental power with, for example, onboard file storage capacity. However, no supplemental hardware specific to APP execution is coupled with an additional substantive power source, in the form of a battery housed within the protective case, that are all universally electrically connected upon reaching full assembly of the component portions of the case around the phone while being immediately capable of mutually and universally powering a variety of related or non-related supplemental hardware components on both or either of the case component portions without burdening or depleting the phone's power source but instead providing supplemental power and charging for the phone.

None utilize multiple case portions or unused "wasted" areas of the case platform as compartments for incorporating modular units designed to divide the compartments into housing for differing supplemental hardware assemblies or for their universal insertion and adjacent collective and comprehensive hookup within or upon the case platform.

None use unique design to modify and free up those areas of current case wasted space that in fact are highly desired and key physical locations due to their proximity and relative positioning to the head of the user, in particular the mouth and eyes, and are entirely collaborative with the way we hold our phones during conversations.

Most importantly, none employ a highly unique Multi-Applications Platform having a highly varied menu of highly desired and useful Computer Applications conducted from the shared auspices of the MAP's internal/external framework. A framework that itself is housed, deployed, retracted, and stored within the previously unused space of either or both of the body portions of the protective phone case. Of further importance is the fact that the electrical assets of the case, inclusive of the Multi-Applications Platform, are all powered by their own battery source and achieve system wide convenience of access and usage, electrical hookup, communications, backup power, phone security, personal user security, and share mutual charging capabilities with the phone the instant the body portions of the case are assembled around the phone thereby forming a protective enclosure that is uniquely bestowed with many varied operative assets and capabilities.

SUMMARY OF THE INVENTION

Looking forward, there will continue to be an ever expanding collection of computer applications available to the public for download upon their wireless mobile phones, tablets, laptops, desktop computer systems, or other electronic devices, that provide their users with a seemingly unending supply of choices for computer functions and services that may be chosen and utilized "as is" or be somewhat customized in accordance with the particular needs of that user.

It is common knowledge that the majority of these APPS may be downloaded directly upon the phone or device of choice and instantly used since most APPS are predominately comprised of computer programming that provides the program operative code and support necessary to run the particular application sought and preferred by the user. These types of APPS generally do not require any additional hardware since they rely solely upon the hardware assets found and housed upon the phone itself in order to execute the computer programming desired that will provide the user with the intended features and outcomes under demand.

However, for more "Specialized Duty" Applications, supplemental hardware is often needed that is extraneous to that provided by the mobile phone manufacturers on or within the platform of the mobile phones they market in mass to the consumer. In these particular instances of consumer stipulation and demand for specific phone application compatibility and usage, the peripheral provision of supplemental hardware can be absolutely vital to run or achieve the desired task for which these specialized applications are conceived and designed.

Therefore the phone owner's desire to make use of many of these "Specialized Phone Applications" gives rise to some problems related to their installation and convenient access in order to initiate and run the exact computer driven software assignment wanted since the critical hardware "operative" components may be "non-existent or otherwise unavailable" upon the phone platform per se. Contemporarily, this lack or inadequacy of necessary hardware is overcome by their secondary inclusion on or within an auxiliary "standalone" hardware platform that can be purchased and carried separately until needed and subsequently selectively interconnected to the phone by the user.

It is the presence of all of these numerous pieces of augmentive hardware that exist today as standalone devices that all inconveniently "require" separate carry to that of a phone that vividly reveals the fact that improvements in the availability, ease of usage, and safe storage of such "additive" hardware products are vitally needed and is the particular focus of this invention.

The breadth of the novel features that this invention encompasses, but is certainly not limited to, are the endowment to the phone user with the individual and/or collective assets of an autonomous protective phone enclosure in the form of a novel "Protective Phone Case Platform" that includes and supplementally provides:

novel "Proximate Hardware" matched to fulfill varied consumer needs and computer application uses that is uniquely stored, positionally deployed, activated, utilized, and then retracted back to protected storage, within or upon "Storage Modules" provided as housing within said Protective Phone Case Platform;

novel "Storage Bays" which are internal structural refinements within the storage modules that make use of wasted space within strategic portions of the Protective Phone Case Platform, in particular the case top portion, to provide protected housing that caters to the particular type and design of Proximate Hardware;

the novel targeting, inclusion, and reformatting of use for the top portion of the case whose physical location and relative positioning lends itself to providing the user with a particularly high degree of convenient availability and ease of asset usage due to the natural relationship it has and maintains with the user's head and the way the user intuitively holds their phone in an earpiece up and speaker down orientation;

a novel "Multi-Applications Platform(s)" that itself is an unique piece of Proximate Hardware that provides a base and a deployable platform for the uncommon grouping together of several key consumer desired features, functions, and computer driven phone applications that may all be conveniently activated and operated from the same unitized and/or interworking structure(s) for the reading, collection and storage of data. This unique grouping of normally unrelated APPS is chosen for their analogous hardware, and their similarity in design, cross functionality, and operational compatibilities potential that enable them to share the same base structure for storage and launch and also since they all may crucially involve the user's eyes, hands, mouth, lungs, blood, and breath and/or other traits, capabilities, and human assets possessed by the owner/operator of the phone/case assembly;

novel non-electrically activated hardware housed on the structure or case platform that is energized and activated by the user, in particular by the user's hands, mouth, lungs, and/or breath;

the novel establishment of reliable wired electrical connections, continuity, and communications for the entirety of the phone case platform inclusive of the upper and lower component portions of the case, the customized containment bays within the storage modules, and the electrical "Proximate Hardware" components, with and between the phone and all of its related electrical components. These interconnections are all dependably achieved simultaneous with completing the assembly of the case around and over the phone thereby surrounding the phone with a protective enclosure;

the novel usage of an instantaneously "Interconnected Power Source", in the form of a battery housed within the protective phone case, whose job is to power the case's full complement of Proximate Hardware located upon both the upper and lower component portions of the case, to power any and all Multi-Applications Platforms, to provide backup auxiliary power to the phone, and to provide simultaneous and/or autonomous charging capabilities for the batteries of both the case and/or the enclosed phone;

novel improvements in device security through the interlaced use of the phone's inherent personal identification security system to ensure that the authorized user, and/or his assigns, are the only approved individuals that are permitted to operate and benefit from the combination of features offered by the unique set of case borne hardware assets and the special case to phone unitization arrangements;

novel improvements and enhancements of the personal security and well being of the owner/user through the employment of electrical and/or non-electrical proximate hardware assets housed upon the case platform and, in particular, situated adjacent to or upon the Multi-Applications Platform where they may instantly be deployed or used for personal defense or for sounding an alarm and/or a corresponding call for aide.

It should thereby be understood that the Proximate Hardware of this invention is designed to provide, initiate, execute, and/or support the full parameters and scope of an increasing number of phone "Specialized Duty/Function" APPS that are desired and sought by the user yet are unable to be initiated and run by the hardware assets commonly found or currently disposed upon the phone itself.

The all important difference between said "Proximate Hardware" and conventional "Standalone Hardware" is that the Proximate Hardware assets housed upon the Protective Phone Case Platform, "always reside and remain" in nearby adjoining or adjacent contact with the Phone Case Platform and thusly are "always carried" simultaneous with the hardware assets of the phone itself. This adjacent residency reliably provides the user with continuous and instantaneous availability to the hardware assets of both Platforms.

The Proximate Hardware of this invention further distinguishes itself, and in a novel manner, from any other existing hardware that may also travel in "close proximity to the phone", by the all important fact that immediately upon completing full assembly of the component portions of the case, all of the Proximate Hardware housed upon the case is electrically and systemically connected to each other, the auxiliary battery, and the encased phone. Their state of universal connectivity and readiness permits this unique combo of assets to be instantly deployed, utilized, and then retracted and safely stored respectively from areas that are highly convenient and easily accessed, for example from the top portion of the case, by and at the will of the user. The top portion of the case as a storage medium has attributes that are particularly attractive in how it relates to the body, in particular the user's head, eyes, mouth, and hands, and how that top of the case portion is commonly held by the user in a natural position and orientation of phone usage that conforms with the phone's speaker being at the top relative to the user's ears and the microphone at the bottom nearby the user's mouth.

Additionally, it is highly relevant and important that the top portion of the case uniquely offers areas in its physical construction that are currently vacant but are ideally located and oriented for the formation of storage modules and deployment bays that will provide housing for the Proximate Hardware within their confines that are particularly handy to the user. These unused voids within the case top exist as wasted space in a world where any extra platform real estate located in such a key area of phone/case orientation that is held in natural alignment and convenient access respectively to and by the head of the user, is a highly precious and desirable commodity.

In order to enhance user workability and convenience, it is of highest significance for said Protective Phone Case Platform to be of such design as to provide quick, instantaneous, and continuous access and availability to the user for any and all of the Proximate Hardware assets found and housed anywhere within or upon the Case Platform. Although the Case Platform and the Phone are separate independent devices, it is equally important and a significant advancement for the Case Platform, and the Proximate Hardware load it bears, to exist in a cohabitating unitized relationship with said phone inasmuch as both case and phone, and their individual and/or combined hardware/computer assets, have the capability to electrically link or sync and then travel and operate as one device.

From a design perspective, every square centimeter of the case that surrounds, protects, and constantly travels with a phone and its human operator is inherently bestowed with high degree of value that simply should never be wasted but instead should undergo intense planning and design scrutiny to best make use of that coveted space in relation to providing increased functionality and user convenience.

Therefore it is also a primary focus of this invention to provide a novel "Protective Phone Case" that encloses and protects the phone while possessing the additional capability to carry and provide either internal or external housing, in the form of specialized bays within generalized storage modules located upon or within the at least two component portions of the case. Some of these containment bays/storage modules are designed and equipped with the capability to store and deploy the Proximate Hardware payload they respectively carry to the external surface(s) of said case where that hardware is best suited to function from and then retract from that deployment back to a safe "protected" storage within or upon said case until, once again, they are needed by the user.

Further novel characteristics are inherent to the current invention in the fact that the generally two piece, end over end, assembly system of the protective phone case being applied over and around the phone instantly establishes mutual wired electrical continuity and communication by and between all of the electrical assets of the phone to and with the simultaneous establishment of wired connections by and between the top and bottom portions of the case platform to all of the fixed and/or deployable Proximate Hardware assets carried within or upon either or both of those portions of the case platform and also with the battery of the case should one be present.

It is also thereby said that the preferred embodiment of the novel Protective Phone Case Platform of this invention will include and house a backup/auxiliary battery power source. However it is requested to be understood that the absence or non-inclusion of an auxiliary battery will not nullify any of the preceding or following examples, explanations, and claims of novelty for said Protective Phone Case Platform and the highly unique and useful Proximate Hardware payload(s) it carries.

In addition, upon completing mutual case/phone assembly, the establishment of an instantaneous and all inclusive state of electrical interconnectivity between the protective phone case and the mobile phone importantly permits and enables case design options and related software adaptations that make full use of whatever "security" medium and method of owner recognition that were selected and included by the phone manufacturer for inherent use upon that particular make and model of phone. Whether it be fingerprint matching, retina/eye scanning, or other forms of individualized human identification, these enhanced techniques and methods for positively establishing the identity of the current operator of the phone as being the valid owner or authorized user are beneficial to enhancing security for the overall phone/case union. That protective "proof of identity" benefit is intended to be fully used to best practice by this invention in relation to restricting use of the case's entire proximate hardware package, and in particular the Multi-Applications Platform, for the exclusive operation by either the owner and/or a select list of users that are authorized by that owner.

The establishment of full case communication with the phone's inherent ID method adds a significant deterrent to help prevent unauthorized usage of the assets of the phone/case combination, or any of their mutual contents, should they be lost, stolen, tampered with, or should other illegitimate alteration or usage be calculated or attempted.

Not only is the security of the case/phone union enhanced by employing the assets of this invention but the personal security of the user is also improved by employing some of the different types of electrical and/or non-electrical proximate hardware combinations that can be stored and deployed by and from the novel Multi-Applications Platform(s). Since the MAP is generally mounted within the top portion of the case, the security measures it carries can be conveniently accessed, handily activated, readily manipulated, and expediently utilized directly against threats or for quickly sounding an "at risk" alert and request for immediate help.

The scope of this invention addresses several key problems and/or undesired ramifications of having auxiliary or secondary hardware that is independent and non-integral to the platform of the mobile communicative device itself.

Since add-on hardware located on a standalone platform is in effect a secondary piece of equipment, it must be purchased, powered, interfaced, carried, and kept track of by the user while existing totally independent to the mobile device, for example a cellular phone. Due to the auxiliary hardware being physically autonomous to the mobile phone, it is very easy to simply forget and carelessly leave said hardware behind, thereby temporarily misplacing it or totally losing it.

Therefore, the difficulty for always having the secondary hardware available when it is needed will always remain a particularly frustrating concern. For it to be of any value, you must remember to always "take it with you"!

This becomes an even more difficult and confusing issue if the user elects to utilize a number of unrelated Specialized Applications that are each important to that particular phone user. Each of these specialized APPS can require carrying an additional piece of auxiliary hardware in conjunction with the phone itself. Thereby, a difficult to manage situation often arises since all of these supplemental pieces of hardware either have to interface with the phone directly, through wired connection, or indirectly, through a wireless connection. In either instance, since the auxiliary hardware is not integral to the phone platform itself, it always requires the user to carry any or all of these device(s) directly on their person or somewhere nearby in order to avail their usage.

Some of the wired mobile versions of auxiliary hardware devices, such as computer data readers and breath analysis devices, are often subsequently temporarily attached as separate hardware pieces to the phone that are unwieldy, protruding, bulky, or otherwise clumsily placed into service since they must be attached and removed with each instance of usage that thereby subjects them to damage, misplacement, or outright loss.

Also, there are wireless versions of data readers or breath analysis devices that are either not meant to be portable or, even if designed as mobile devices, still have the same "secondary carry, availability, and trackability" deficiency issues as the wired versions of both devices.

Other conventional examples of either attached or portable auxiliary paraphernalia or hardware devices are the extraneous pieces of equipment needed for:

monitoring and analyzing various biomedical states and conditions indicative of the overall or specific areas of health relevant to the particular phone user undergoing the testing determining parameters of breath composition and quality that measure levels of blood alcohol and degrees of halitosis measuring and improving lung capacity or other health enhancements through use of spirometers/inhalers/nebulizers/aerosol dispensers or diffuser systems sensing explosive gases sensing dangerous levels of poisonous gases such as carbon monoxide detecting drugs providing and proving personal identification through means such as such as validation of fingerprint or signature carrying cards on your person that offer personal identification information or to conduct personal or business financial transactions providing substantive additional data memory and storage testing and monitoring of the blood glucose levels within the body restricting the capability to Text and Drive analyzing electrical circuitry providing devices of personal pleasure repelling personal endangerment attacks signaling devices many other current and forthcoming types of secondary "supplemental to the phone" equipment and devices Other problems arise in the fact that a number of differing types of auxiliary hardware often require special ports or passageways that supply access to the interior and/or the exterior surface of their platform, such as specialty cameras, recorders, sensors, and air venting.

Powering and/or recharging all of these auxiliary devices is also a significant concern.

Since we carry our phone with us a majority of the time, the logical solution would be to have a means made available to the user for conveniently mounting and carrying any additional desired hardware components with or upon the phone platform rather than independent of it.

Such efficiency is delivered through the novel case design provided by the present invention whereby the hardware and the related application(s) are always available to the user anytime the phone itself is carried. Costs can be minimized, interface options enhanced, and very importantly, by inclusion of an autonomous battery source, additional electrical storage capacity can be carried that can power any and all of the additive "supplemental hardware" as well as provide backup power and recharging capability for the phone itself.

The construction of a protective case generally provides the user with simple quick installation and hook up through single or multi-piece case components that slip over or around the phone thereby partially or totally encasing the cellular device.

Any auxiliary hardware favored by the user often receives direct wired connection, concurrent with the temporary attachment of the secondary platform it resides upon to and with the mobile cellular phone through an access port of the case, or it may link wirelessly with the mobile phone(s) it serves.

During the phone insertion process within the case, some electrical connections can be established through the phone's generally female data/power/charge port sliding over and engaging an aligned generally male data/power/charge plug of the case. The case's male member integrally projects from a strategic surface of the case that parallels the path of insertion of the phone. Their mutual interface instantly establishes a stable wired electrical union between the two devices inclusive of a secure battery interconnection and reliable data transfer capabilities while importantly providing simultaneous charging potential for the respective batteries of both the phone and the protective case.

In any instance, the supplemental extra power capacity is a highly relevant, useful, and handy feature for the phone owner/user. Concurrent charging of the case's onboard battery as well as the battery of the enclosed phone can be simultaneously accomplished as one endeavor rather than two separate charging cycles that often require two separate sets of charging cords and related equipment.

One significant deficiency of that just described conventional arrangement for connecting an auxiliary case borne backup battery source with the phone, its hardware assets, and its own battery is the fact that "no provisions" are made for "universally connecting and powering" any supplemental hardware that might be added, housed, or stored "anywhere upon the case platform". Also, and very importantly, no provision is made for the electrical linking of the independent body segments that comprise the case.

That fact is particularly relevant since "anywhere upon the case platform" would be inclusive of "on and between individual pieces of the case platform". Since most rigid cases involve multiple pieces in order to fully encase the phone, the lack of universal electrical connectivity, continuity and communication between all portions of the case delivers an impediment to full functionality for the case platform to act as an all encompassing base for which to house and/or deploy any auxiliary supplemental hardware desired by the phone owner/user from being physically located and/or housed anywhere upon the full expanse of the case platform that "best" serves the hardware's purpose, function, and ease of availability to the user.

That significant deficiency in connectivity and full usage of the entirety of the case platform to base auxiliary hardware is a focused objective addressed by the current invention and is at the center of attention for the provision of a viable solution.

The inventive focus for which this patent application seeks novel rights and protection is the unique aspects of protective phone case construction and capability that are partially summarized in the following statements but are not to be construed in any manner as being limited to their contents.

Design inadequacies for conventional protective cases that this invention addresses:

the coupling of an additional power source with the unique onboard provision of a spatial compartment(s) as storage and staging module(s) within particular areas and/or body segments of the protective case platform that are beneficially located in relation to the user's head and the enclosed phone and its operative exterior surface controls and/or accessories;

the comprehensive inclusion of specialized apertures/slots/vents/openings located upon the exterior of the case platform that communicate with bi-directional communicative passageways to and between the various spatial compartments, and/or the adaptive staging modules within those compartments, where said spatial compartments exist to physically position and house any or all of the desired supplemental hardware;

the strategic use, development, and refinement of storage bays or modules as housing for additive "Proximate Hardware" within space within the case that was previously overlooked and wasted even though that unused space is physically situated within highly valued real estate of the protective case platform that is ultra convenient and particularly easily accessed by the phone user;

the planned universal wired and/or wireless hookup options for the insertion and housing of the various user desired additive, performance based electronics, computer chip sets, supportive CPU's, and/or other supplemental hardware circuits, that are all to be comprehensively and physically included within and/or upon the case platform and require universal interconnectivity and power that are all automatically accomplished in concert with completing case over phone assembly;

the alignment and assembly of the case pieces portions around the phone device so as to establish instantaneous case to phone device electrical interface(s) concurrent with the physical mating of novel male/female provisions for instantaneous case portion to case portion electrical interface(s) that thereby establish full "A to Z" electrical interface(s) between the phone and the entirety of the case inclusive of any and all of its case portions and their Proximate Hardware payloads;

the unique protected storage of various supplemental "Proximate Hardware" components that require subsequent select movement to a new position or positions relative to their desired exposure and/or operative disposition upon the surface of the case exterior, and their selective reversal back to "protected" storage within the case;

the unique design and operative arrangement for the analogous combination of two or more pieces of supplemental "Proximate Hardware", that are normally of independent construction and of unrelated end purpose, into one solitary "Multi-Applications Platform". That feat of unitization is novelly accomplished in a manner so as to successfully deliver on the respective individual operative end goals for that package of combined Proximate Hardware objectives while predominantly utilizing the same physical structure and hardware elemental composition for the "Multi-Applications Platform" while, and all importantly, sharing precious and highly limited real estate within and/or upon the portions of the case that are best suited for the user to access and execute the functions of the combined "Proximate Hardware" payload;

the physical disposition and provision for any and all of the "case mounted" supplemental hardware and/or related systems with system wide instantaneous hookup options whereby the supplemental hardware can be universally powered by either the phone's battery or the additional power supply provided by the battery contained within the case which also has the capability to selectively provide direct wired supplemental backup power to the phone and its related power system all while sharing the same mutual charge port for providing simultaneous charging capabilities for the respective batteries of both the phone and the protective case;

the lack of utilizing the top portion of the case of a telescoping two piece case system for housing hardware assets that can instantly be used or deployed to enhance or actively defend the personal security of the phone owner/user in emergencies or to sound a call for help;

the lack of interlaced device security between the phone and the case platform to prevent unauthorized usage of the proximate hardware assets housed upon the case.

Overall device security for the case platform can be effectively enhanced by linking and utilizing the phone's onboard user identification hardware/equipment which would eliminate the expense and waste of having duplicate security assets. The cross application of phone borne security hardware with the case is particularly beneficial for the initiation and allowance of a specialized grouping of unrelated programs that are inherent to and available for selective activation from the "Multi-Applications Platform" that is housed and borne by the case. For example, a novel Credit Card system where the user can elect to either make a purchase or receive a payment can greatly benefit from a capability to accurately identify an authorized owner/user. This provides an important level of security for either a preliminary identification step taken for receiving initial permission to activate the Credit Card APP, or other desired APP from that specialized grouping, or for providing valid identification at the point of receiving transaction approval or rejection.

The overlying guiding premise of this invention for employing a simple common sense arrangement for using the protective case as a storage and/or operational platform for housing the required supplemental "Proximate Hardware", additional CPU's, supplemental operative or data storage chips, a "case dedicated" autonomous power supply, or other desired computer hardware assets/functions in order to successfully execute and run a multitude of "Specialized Applications", yields extraordinary convenience and utility to and for the owner/user of a mobile phone or other wireless device.

Since the phone undergoes integral enclosure and attachment to and within the case, instant access to the specialized hardware and APP(S) content carried by the case is guaranteed since anywhere the phone goes, the case and its related Proximate Hardware, APP content, and support will assuredly follow thereby providing consistent and convenient APP availability to the user.

The interior lying modules located within this new real estate provided by the spatial compartments within the case platform can be designed and manufactured with infinite configurations specific to providing ease of access, housing, and electrical hookup of the Supplemental Hardware required specific to the execution and running of the various Specialized Application(s) desired by the user. The platform based compartments and the configuration of their particular modular design offer secure positioning, anchorage, housing, and protection for the supplemental hardware components.

Some of these mostly interior lying modules/compartments would be provided with passageways or ports that interconnect and communicate with the exterior surface(s) of the protective case. The inclusion of passageways are, for example, for reasons of allowing insertion of a data plug that would complete electrical union with the Proximate Hardware or to serve as bi-directional air flow tracks or portals for the device user to blow into in the instance of breath analysis or as "sniff" passages when small samples of ambient air are pulled in and analyzed, or as pathways for deployment and retraction of the Proximate Hardware structure, or for providing other avenues of passage, connection, or positional movement.

Some of these passageways/openings/ports can be supplied with doors or hatches that act as protective seals that can be selectively open or closed in correlation with either the deployment or the retraction and storage of their respective Proximate Hardware structures.

To provide accurate air analysis and sampling, the modules/compartments that communicate with these exterior "air transference" passageways will have built in air flow "venting" that would prevent the compartment from being airtight and thusly having dead air space that would make it difficult to obtain uniform and accurate air sampling. The vents would improve air analysis within the module by lessening air flow resistance thereby facilitating a more uniform flow and accurate air/gaseous sampling across any of the sensory devices employed.

Additionally, and very importantly, the layout and confluence of air passageways will be designed with bi-directional flow capabilities that provide the user with a choice for executing an accurate sampling technique that is both convenient and congruent with differing air analysis goals.

For accurate analysis of ambient air requiring an active "non-static" air flow to be induced across the sensors of a detector, a small "squirrel cage" wheel, or other air flow inducement device, may be strategically located within the air flow system that can be spun by a finger or mechanically spun to induce a "sniff" type air test or monitoring. To enhance access by the finger of the user, the wheel would normally have a small portion of its knurled circumference, for example in the form of a "toothed" arc, exposed above the exterior surface of the case. Also bi-directional hand or mechanical air pumps or bulbs may be employed and coupled with air tubing of various lengths to support remote sampling.

A planned program of intermittent air sampling may be employed for reasons of personal safety, such as for carbon monoxide monitoring or for sensing air quality overnight while sleeping for the presence of smoke indicating the potential breakout of a fire. Such a personal alarm system might also couple the proposed fire and gas detection with an onboard motion detector and be switched on before going to sleep to alert the phone owner of an intruder while at home or on the road within a hotel room.

Other non-limiting examples of additional features of the Multi-Applications Platform or the Proximate Hardware in general include:

1) providing sensors for determining user hand position upon the phone for the Prevention of Texting and Driving;
2) providing adaptable gas flow passageway(s) for devices, present and future, that employ or have the need for inducing "Blow" gas flow through the device for sensing, monitoring, measurement, or analyzing human lung/breath makeup and content that indicate self induced states such as blood alcohol volume or the presence of drugs or for normal occurring health factors such as oxygen/CO2 content, blood sugar/glucose levels, blood serum and hemoglobin, lymphatic function, dehydration, degree of halitosis, disease predicators, or other health issues that may become discernible in the future from detailed sampling of the human breath;
3) providing adaptable gas flow passageway(s) for devices, present and future, that employ or have the need for inducing "Pull" gas flow through the device for sensing, monitoring, measurement, or analyzing the detailed breakdown of ambient air for noxious gases or the physical location of drug stashes, or other issues of personal well being;
4) providing adaptable bi-directional gas flow passageway(s) for devices, present and future, that employ or have the need for inducing "To and Fro" gas flow through the device for sensing, monitoring, measurement, or analyzation that provides real time "Blow Exhale/Pull Inhale" sensory measurements showing human breath volume, force, or speed of air flow by diverse types of spirometers having varied programming that corresponds to particular health check set ups with exacting analysis goals, and other health related objectives of lung/breath capacity and capability;
5) providing credit card data "reading" capabilities inclusive of a magnetic stripe and/or EMV electronic chip;
6) providing direct phone device to phone device transfer of credit card data;
7) the duplication and convenient provision of data "source" capabilities for a credit card possessing either a magnetic stripe and/or EMV electronic chip;
8) providing a removable standalone card that can be used as a source of credit or ID, such as a drivers license/ID or other card design and purpose, and then be reinserted, attached, and stored;
9) providing pleasurable recreational activities through the provision of an electronic cigarette in the form of a personal electronic vaporizer and/or the provision of lung/health treatments via spirometers, inhalants/nebulizers, and/or the provision of pleasing or health enhancing aerosols, herbal or other vaporizers, and aromatherapy diffuser devices and systems;
10) providing an adjustable four-position air vent closure cover;
11) providing convenient disposition and protected housing for a unique "dual use" system for combining an EMV/ID card with an USB interface computer memory storage device where both may be removed from the case and utilized as independent devices while carried as one convenient and personally totable platform;
12) providing a deployable/removable Blood Glucose Test System;
13) providing an emergency non-energized whistle to alert others of your physical position enabling rescue;
14) providing a deployable high charge stun device for personal emergency protection;
15) providing structural means for deploying a electrical conducting test probe or probes for either direct contact with electrical targets/subjects, or indirectly through subsequent attachment of extendable wired test probes, where different facets of electrical significance are read, measured, and/or analyzed such as a Digital electrical multi-meter;
16) providing a wireless test probe system stored within the MAP in the form of sliding gas retention sidewalls;
17) providing enhanced device usage security by preventing unauthorized usage of the case's hardware assets;
18) providing personal protection alarms for endangerment issues of smoke, intruder, panic, or other alerts;
19) providing and extendable light source on or within the interior rectangular shape of the deployed Multi-Applications Platform that thereby provides a focused light beam perpendicular to the top of the case/phone unit;
20) providing a "directional" microphone located within the MAP that is deployable from the top of the case/phone unit for obtaining high quality audio recordings that would be specifically important and valuable for documenting professional interviews and group conversations.

"Specific purpose" Proximate Hardware components are generally driven and controlled by specialized software APPS that are written to provide the user with specific uses and services and then controlled and processed by the CPU of the phone itself. However, for controlling more complex and sophisticated Proximate Hardware payloads, the protective case may be outfitted with auxiliary computer processing capabilities that interfaces with and supports the phone's CPU or may run independent to the phone's CPU thereby providing standalone operability for the case.

Since a phone can be elementally described as a box that is stuffed to the max with electronic components, adequate electrical component real estate and room to house additional electrical circuitry and related components is a critical and limited commodity for a phone. The box defining the platform of a phone only has so much volume and housing capacity while the many varied APPS and features that require specialized supportive hardware, continues to escalate.

There is a very real and tangible need for a source of supplemental space that will house hardware that caters to the individual phone owners desire to customize and choose the specialized features, APPS, and related additive supportive hardware, that best suits their particular needs and desires.

With proper planning and design, the platform of the protective case is very well suited to provide that extra box and the precious additional real estate necessary to house some of the supplemental hardware desired by many phone users thereby becoming the auxiliary growth platform of the future for new specialized and customizable APPS.

With inclusion of extra battery capacity to power the supplemental hardware and provide backup power for "on the go" recharging of the phone, the case can provide an assured platform for handling forthcoming growth and unanticipated new APPS that address the latest consumer needs by housing "cutting edge" advancements in new hardware that make the case a "smart device in and of itself" while encompassing and protecting another smart device, the cellular Smartphone!

While still adequately fulfilling the conventional functions of a protective phone enclosure, the protective case platform can morph into a specialized electronic box that slips over or otherwise encases the main or mother electronic box, the mobile phone, while maintaining and powering highly reliable hard wired interfacing for communications between the two devices.

The case platform, and the novel modular "Proximate Hardware" load that it strategically houses and carries within, remains consistently positioned adjacent to the encased mobile phone. It is through that overlapping positioning between the devices that the novel provision of vital electrical interface(s) between the top and bottom portions of the case and any of the hardware assets that are selectively chosen to be included and disposed upon or within said case are able to instantly avail themselves to and benefit from mutual wired point or points of interface and cross communication to and with the adjacent mobile device while said mobile device remains integrally enclosed, surrounded, and/or physically contained and protected within said casing. These interface points permit the transmission of back and forth circuitous signaling to, from, and between said casing and said enclosed mobile device while remaining physically bundled and traveling together as a unit in concert with the users' ever day needs and desires. Alternatively to a hard wired system, some or the entire intercommunications package conducted between the phone and the protective case may be performed wirelessly.

The capability to utilize wired intercommunication between the case and the underlying phone is significant due to the long term dependability of wired interconnections. The capability for using either wired or wireless methods of interfacing remains available, however one of the significant advantages of utilizing a Smartphone case prepared with wired modular compartments is that component physical interconnections can easily access a simple system of wired power and conductor rails or conductor ribbons that run end to end within the case and can thereby offer instant tie in for component insertion and removal anywhere along their length much like that of a breadboard.

Since the current size of mobile phones and their related graphic displays has trended toward becoming larger, the protective cases encompassing them have grown in size as well. This advantageously provides more space on the case platform, especially since battery technology is making steady strides toward reduction of size and weight relative to their power storage capacity, to a degree that the backup battery provided with the case may gradually be reduced in size, and in particular, a reduction in overall length that would free up additional housing compartmental space for additional modular housing within the case for new supplemental hardware of the future.

One counterbalance to the conundrum presented by the desire to reduce battery size for spatial gain with the undesirable associated loss of power storage capacity is the fact that system battery life is more easily extended by advancements in processor efficiency rather than improvements in the batteries themselves. For example, predicted advancements in piezoelectric transistor materials, or other materials and methods, could yield processors that consume 100 times less power that would translate to an increase in battery life that would permit much smaller batteries. Such a reduction in battery size would open substantial and highly significant amounts of new space for supplemental hardware to be housed within newly available sections of the cases' extensive battery compartment.

Additional benefits are derived by providing alternative choices for either interfacing with the underlying phone via either wireless options such as Bluetooth or, very importantly, via a direct hardwire universal "quick connect" interface that is less quirky and less subject to interference when multiple devices are in use that provides superior dependability for correct function and overall APP/Hardware reliability.

Since physical space will always be a limiting factor and a precious commodity for a mobile phone platform, there will always be increasing levels of difficulty on how much technology can be crammed within a Smartphone.

Plus the cellular phone platform designed for public release and usage is not always the best medium for adding customized components that might cater to end user groups of smaller volume for the housing of more specialized APP/hardware combinations that are selected and customized to fulfill the specific interests and desires of that particular phone owner/user.

In the future the case platform will further become the landlord and bearer of extra physical real estate that is multipurpose in function and, all importantly, becomes integral to the phone itself upon the phone's insertion and retention within the case.

This ensures that all supplemental hardware of the case always remains continuously available to the user by eliminating separate hardware pieces that are burdensome to track and retain possession. Also, in some instances, it may be beneficial for the case hardware and its related applications to remain functional even while the phone is removed from the case and said case stands independent to the phone.

As battery size decreases and newly freed space with the protective case becomes available, the sophistication of the layout of the circuits and hardware to be contained and housed by the protective case enclosure may mimic and minimally approach that of the cellular phone itself.

"The new electronic box"!

BRIEF DESCRIPTION OF THE DRAWINGS

In partial representation of the preferred embodiment of this invention, FIGS. 1A and 1B respectively show top and bottom portions of a protective battery case for a mobile phone. Also introduced are component pieces of electrical hardware that compose an important part of the invention in the form of a multi-function structure that is capable of being cyclically deployed and retracted from the phone case as desired by the phone owner.

FIG. 1C shows an exploded enlargement of an electrical multi-conductor ribbon and its interconnection to the electrical components located within the bottom portion of the case.

The FIG. 3A representation is shown without a phone while depicting a partially assembled backside vertical perspective of the two piece case system along with a fully deployed Multi-Applications Platform. Also illustrated at either end of the case are some sensory areas provided to prevent Texting and Driving by detecting the relative positioning, or lack thereof, of the phone user's hands upon the case/phone platform.

FIG. 3B is a plan view of a circuit board bearing an exemplary electrical proximate hardware arrangement for operational control of the pair of hand contact sensory areas at opposing ends of the case.

FIGS. 4A-D portray a top/end perspective view of the top portion of the protective phone case. Visual demonstration is given of the step by step progression of a unique Credit Card Reader system in the form of a Multi-Applications Platform as it is stored, deployed, retracted, and stored again from within its containment bay(s) that is generally provided within said top portion of the case.

Figure 4A:
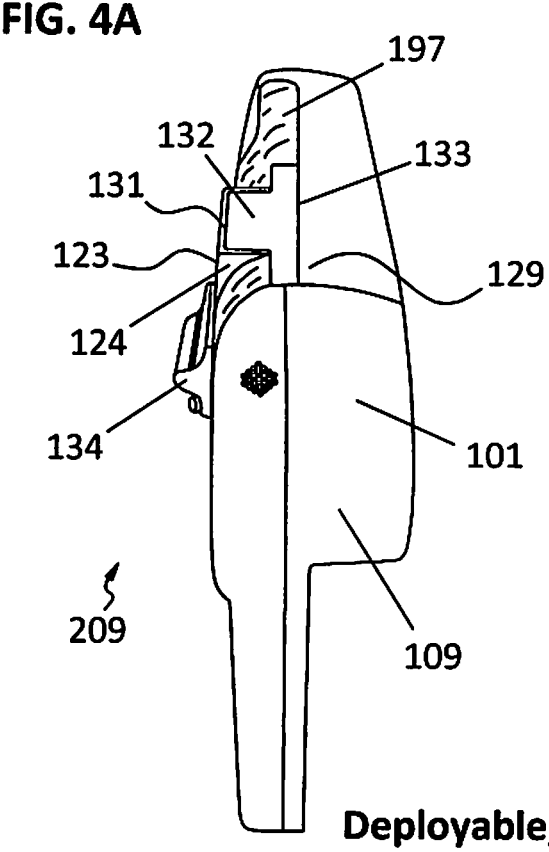

FIG. 4A shows the containment bay lid closed and the Multi-Applications Platform tucked unseen beneath said lid while safely stored within the top portion of the case.

Figure 4B:
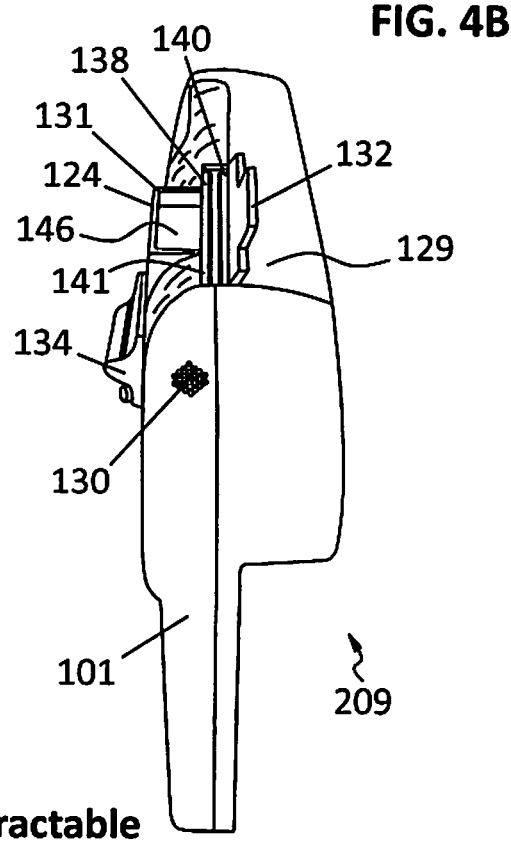

FIG. 4B shows the lid fully open with the very top of the underlying Multi-Applications Platform being viewable through the hatch opening.

Figure 4C:
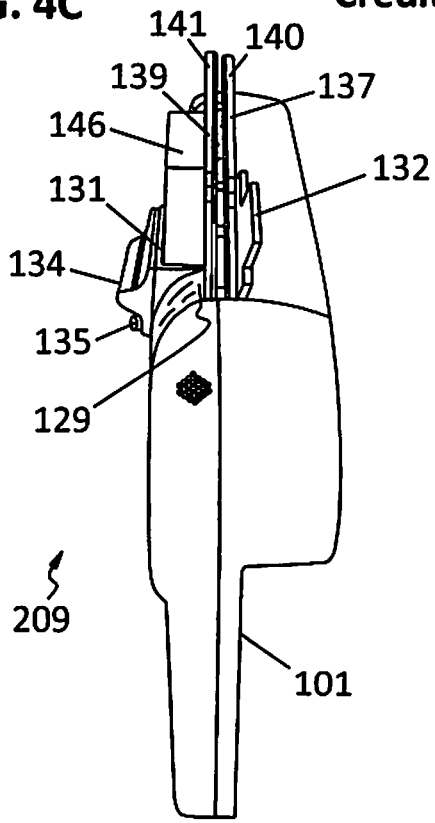

FIG. 4C shows the full extension of the now fully deployed Multi-Applications Platform.

Figure 4D:
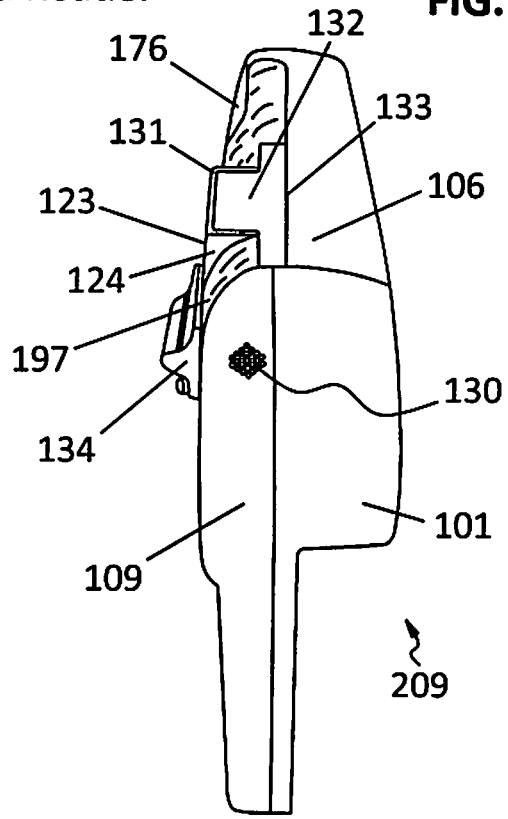

FIG. 4D shows the lid closed over the hatch after the Multi-Applications Platform has been retracted back into storage and thereby prepped for redeployment.

Figure 5A:
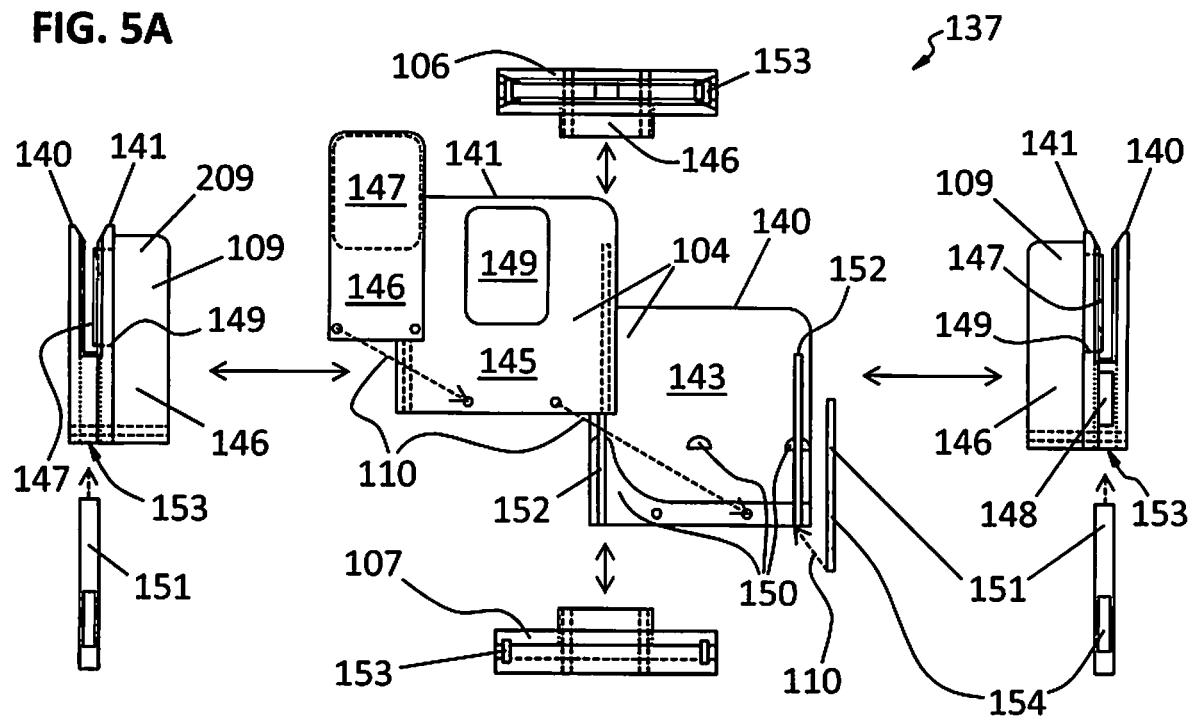
Figure 5B:
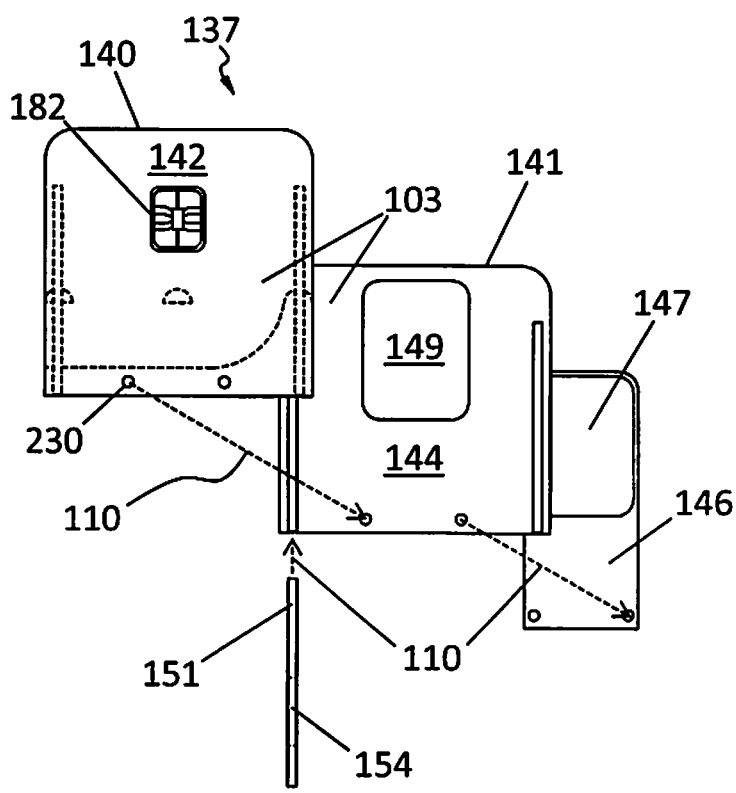
Figure 5C:
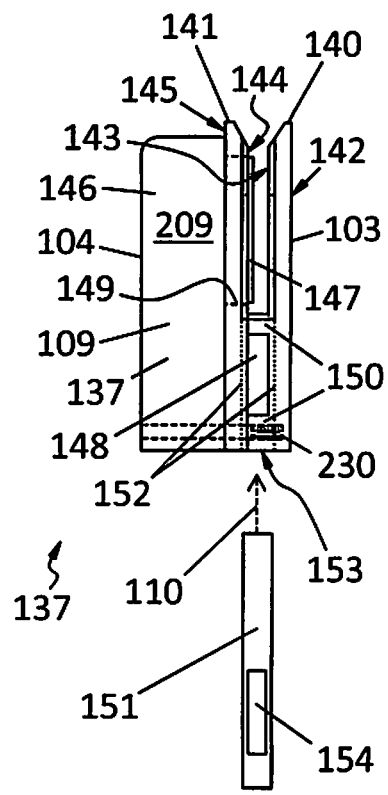

FIGS. 5A-5C depict the Multi-Applications Platform in greater detail.

FIG. 5A shows plan views of the structure if viewed from the rear or the backside of the case for a partially exploded side view in the middle of the drawing and a corresponding top view, a bottom view, and both end views.

FIG. 5B similarly shows an exploded view of the structure if viewed frontally from the phone side of the case.

FIG. 5C shows a detailed enlargement of an end view of the structure.

FIGS. 6A-11A, 6B-11B, and 6C-11C demonstrate in detail the stages and automatic transformations undergone when a user elects to choose between the preferred embodiments for using the structure as either a gaseous analyzer/sampler or a credit card data reader.

FIGS. 6B-11B relate plan views from the backside of the case while FIGS. 6A-11A and 6C-11C respectively relate both of the associated end views.

Figure 12A:
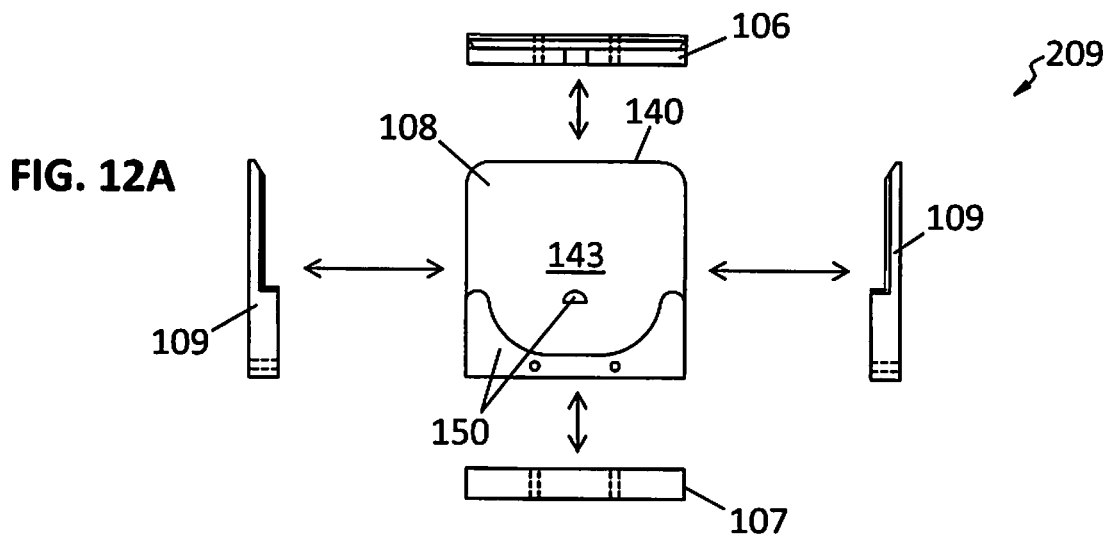
Figure 12B:
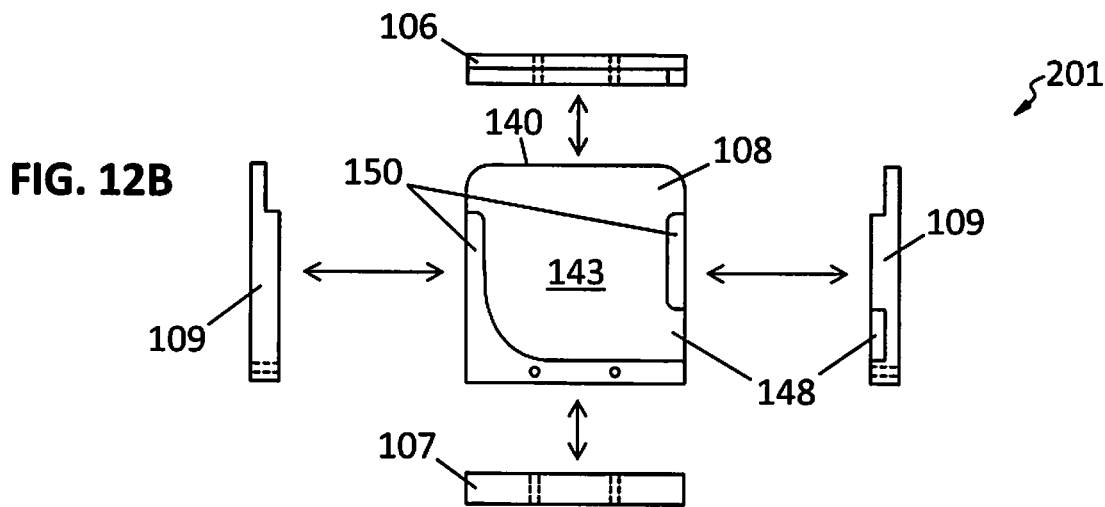
Figure 12C:
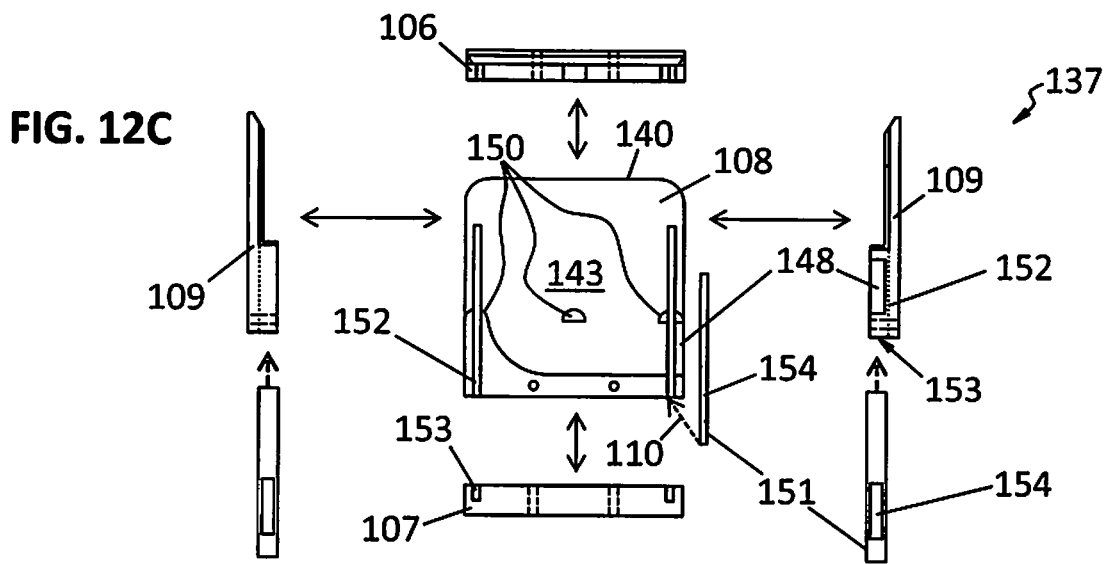

FIGS. 12A-12C demonstrate a specific configuration, construction, and shaping for a key wall component of the structure in order to provide the best mode of operation for using that structure as either a credit card reader, a gas analyzer, or both. The wall shaping and overall design offered in 12C is preferred for the universal operation of the many varied functions featured for this device.

FIG. 12A shows a wall configuration specific to a credit card reader.

FIG. 12B shows a wall configuration specific to a gaseous analyzer/sampler.

FIG. 12C shows the preferred embodiment that follows the intended design for using the structure as a multi-function device capable of performing both credit card reading and gas analysis and other varied functions from the same basic structure. This multi-purpose design employs an automatic slidable wall provision that was previously detailed in 6A-C through 11A-C.

FIGS. 13A-13D represent plan views for a disposable mouthpiece that is used to fit over the top of a fully deployed Multi-Applications Platform. Its purpose is for maintaining sanitary conditions between multiple users of the same MAP while analyzing personal breath samples of differing individuals.

FIGS. 14A-14D show another set of plan views that relate to the design of the MAP cover for applications that tend to be more commercial in nature. The cover is designed with an enclosed top and an integral port for the attachment of test tubing that can substantially extend the mobility and range for remote pulling of air test samples while also improving the positional comfort of the person conducting the testing.

Figure 15A:
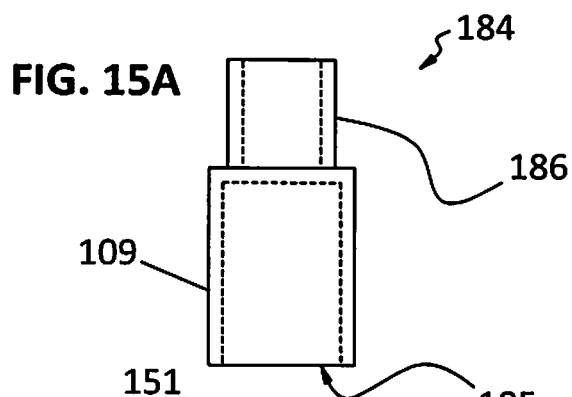
Figure 15B:
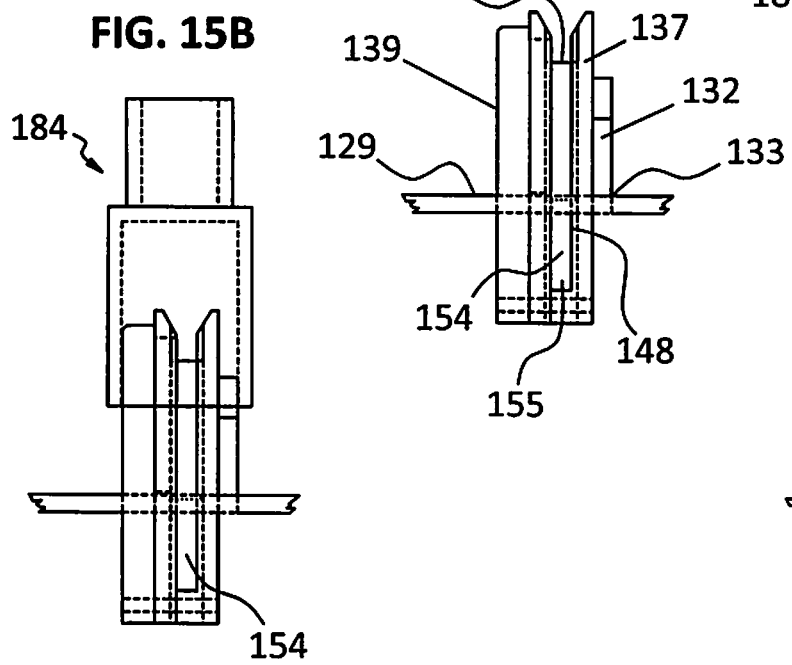
Figure 15C:
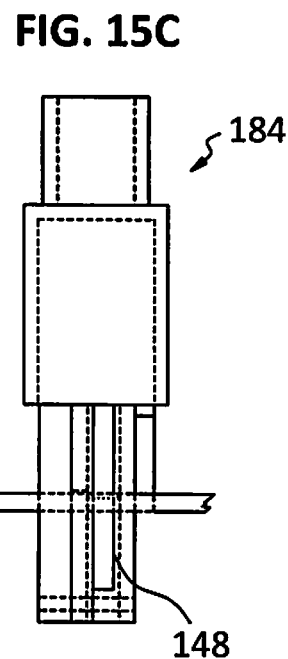
Figure 15D:
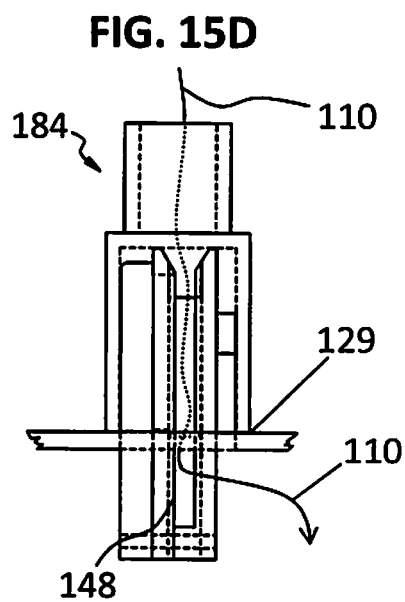

FIGS. 15A-E give visual description of the corresponding fit and sealing capability of the disposable mouthpiece, and/or the cover for pulling a gaseous sample, as it is initially aligned in FIG. 15A and progressively lowered in FIGS. 15B and 15D over the fully deployed Multi-Applications Platform and the open hatch lid. FIGS. 15B and 15D both illustrate a transparent "for explanatory reasons only" sidewall that enable viewing of the underlying MAP as the mouthpiece/cover is lowered.

Figure 15E:
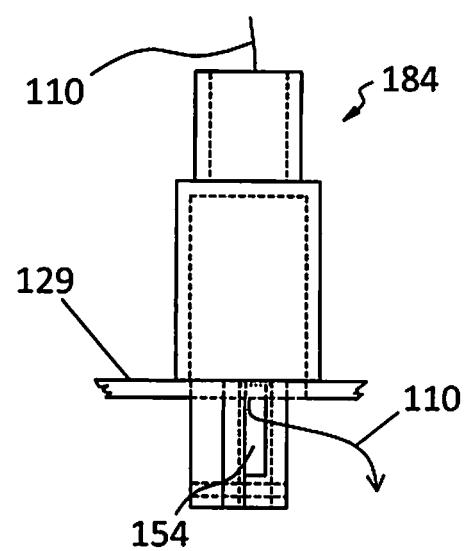

FIGS. 15D and 15E specifically show the mouthpiece/cover reaching a final vertical stop and sealing against the top of the case and thereby creating the desired in/out pathways that the bi-directional flow of gases must follow in passing in either direction through the unitized mouthpiece cover and Multi-Applications Platform.

FIGS. 16A and 16B depict the top portion of the case that contains the novel storage modules and custom component containment bays along with the Closure Retention Flange.

FIG. 16A is a perspective view of the new form and design given to the previously wasted space within the conventional top portion of a two piece case.

FIG. 16B shows a transparent "for explanatory reasons only" case top that allows unobstructed viewing of the compartmental modular design and configuration of the empty containment bays within the top portion of the case.

Figure 17A:
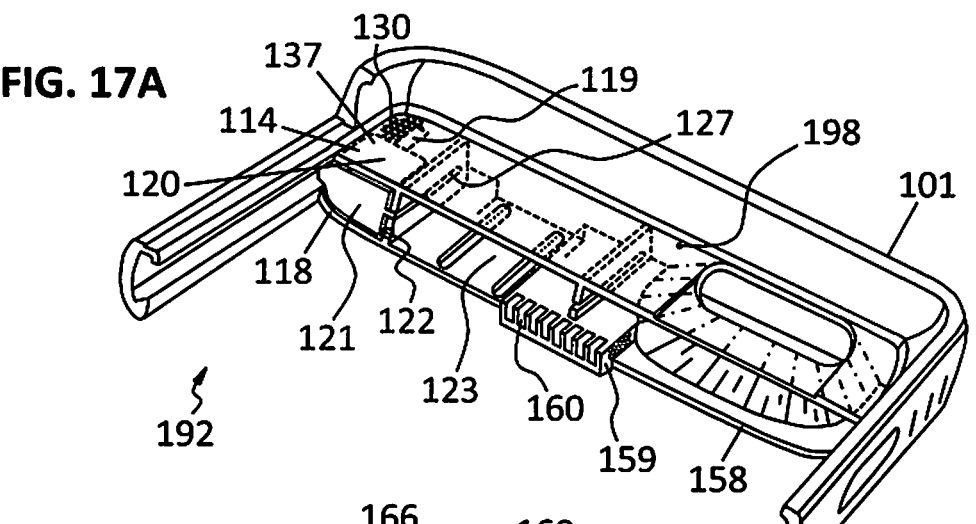
Figure 17B:
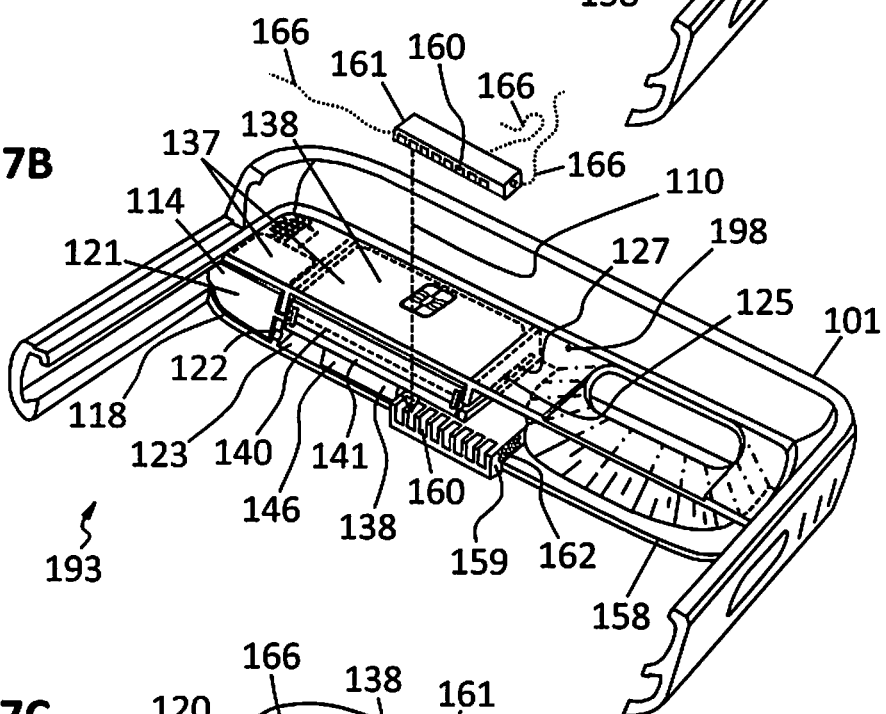
Figure 17C:
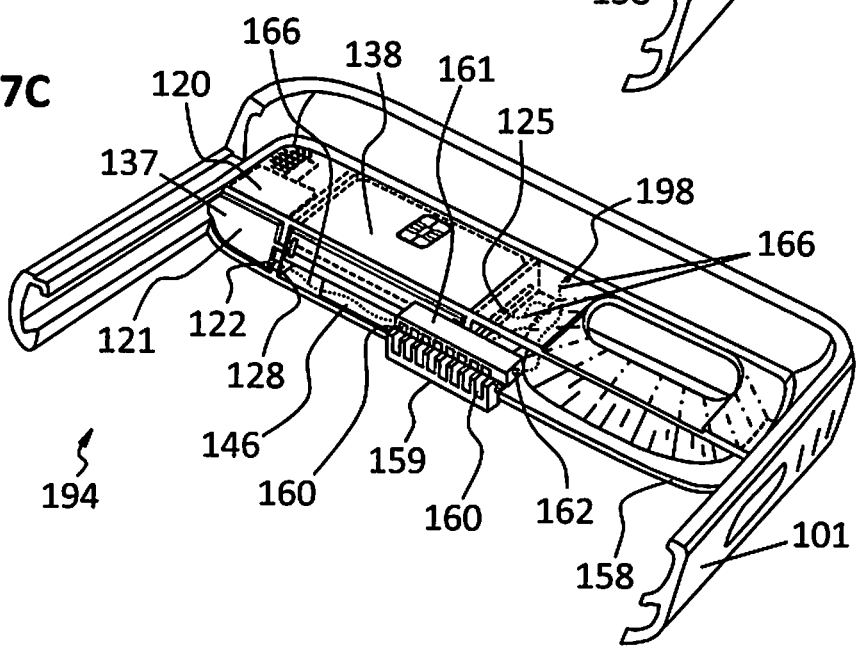

FIGS. 17A-17C show the progressive filling of the available bays within the top portion of the case with unique electrical hardware components.

FIG. 17A shows the gas analyzer housing/plug, and the gas sensor it houses, after placement within its assigned bay adjacent to an air vent cluster.

FIG. 17B depicts the deployable/retractable Multi-Applications Platform after placement within its assigned bay adjacent to the gas analysis bay.

FIG. 17C shows the fully assembled case top portion and the respective wiring and connection terminals for the individual hardware pieces running to and connecting with an exemplary electrical interface block.

Figure 18A:
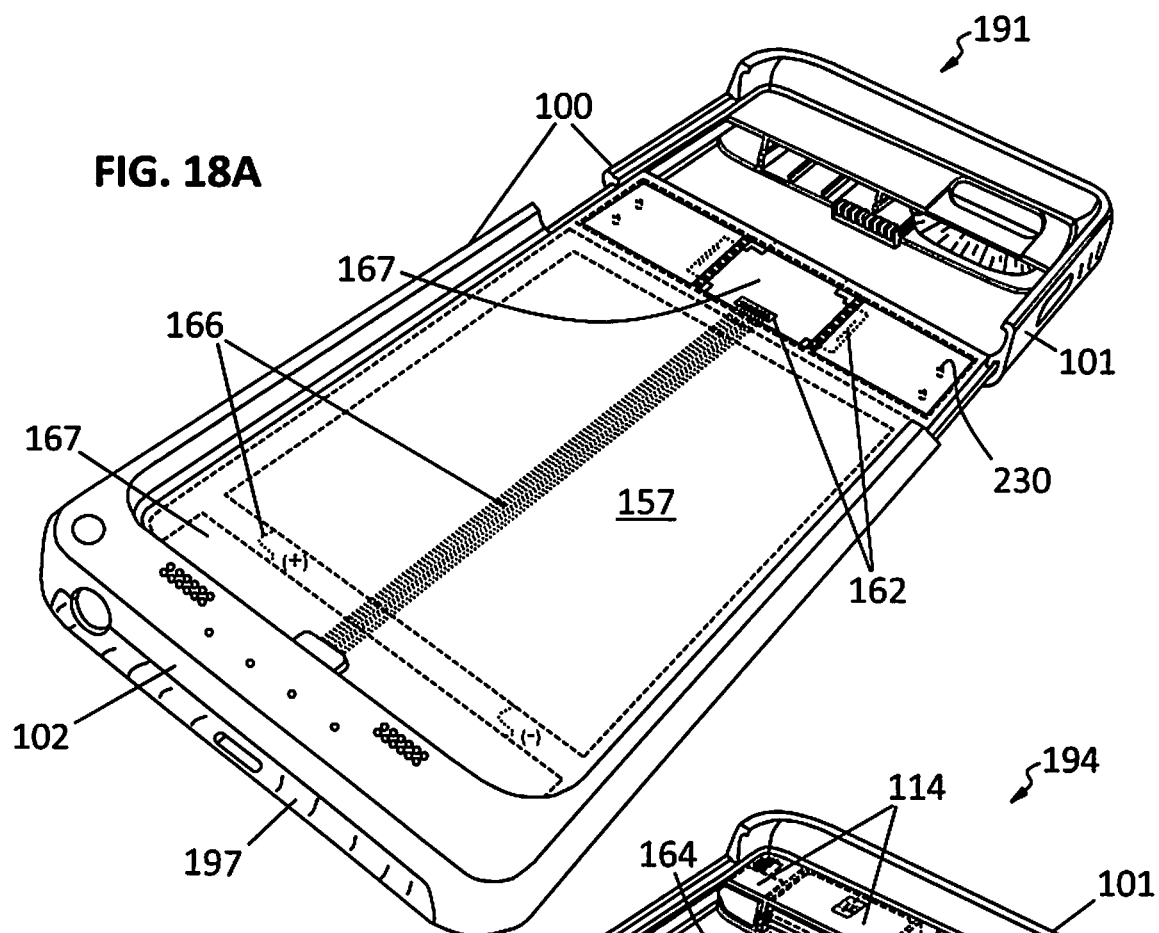
Figure 18B:
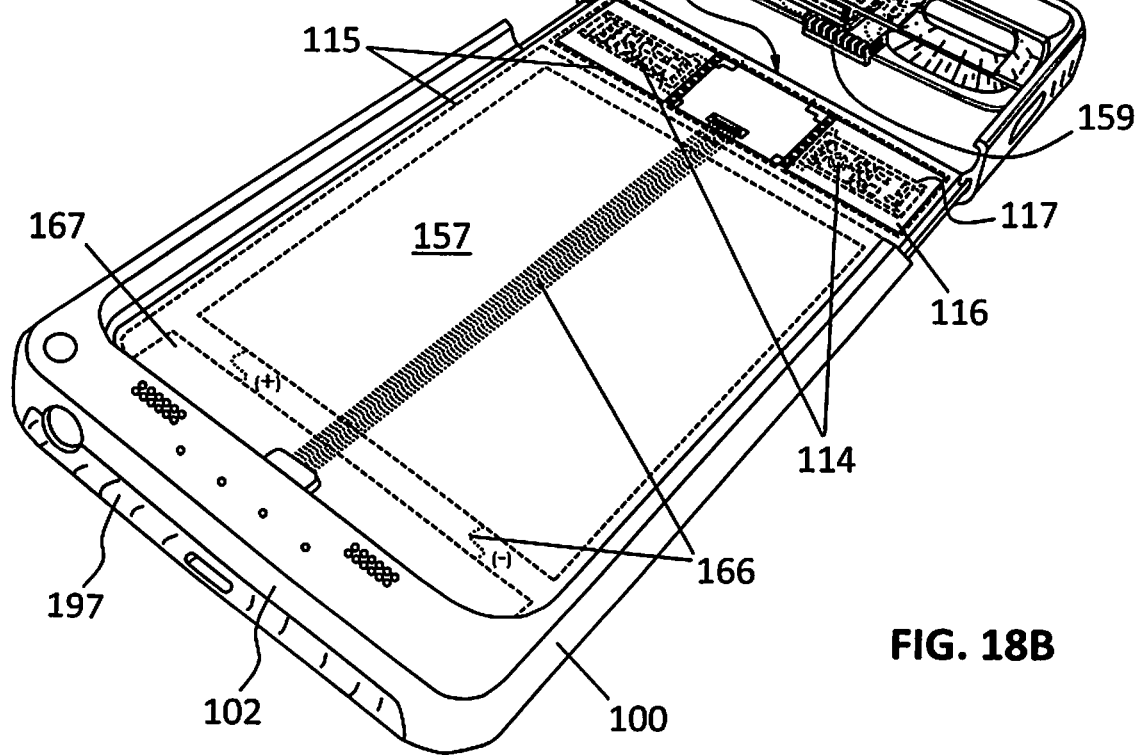

FIGS. 18A and 18B show full case representations where the top and bottom case portions are in end to end alignment but are not currently in a fully assembled state where they would totally butt up in a closed position relative to one another which would thereby establish electrical continuity between each case portion and the respective Proximate Hardware loads they each bear.

FIG. 18A shows an end perspective view of the empty containment bays within the top case portion that is similar to that depicted in 16A.

The transparent viewing perspective of FIG. 18B is similar to that depicted in 16B and illustrates a fully prepped protective phone case that is representative of the preferred embodiment of the current invention where the bays of the top and bottom case portions have been loaded with Proximate Hardware and their electrical connections independently established.

Figure 19:
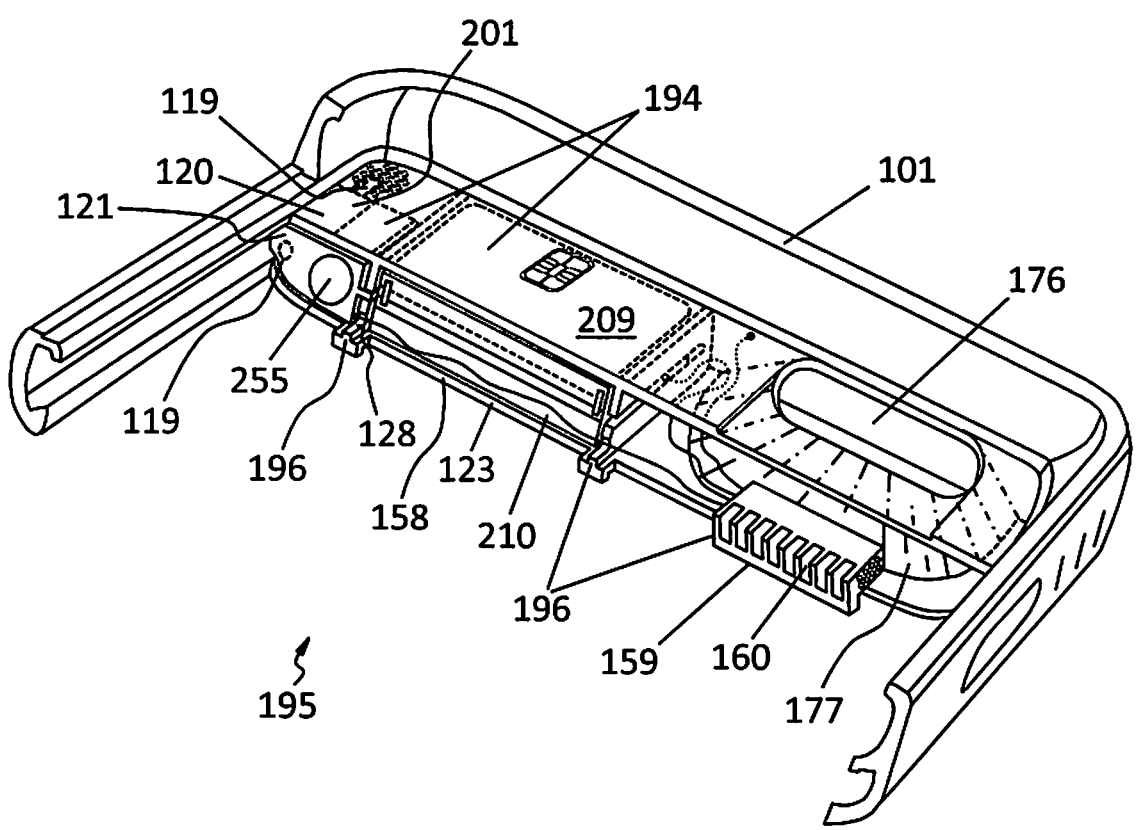

FIG. 19 shows a preferred relocation of the Closure Retentive Flange from its previous position on the case top portion. This relocation is for reasons of acquiring additional valuable space within the credit card reader bay for increasing the width of the credit card reader housing to the full width of its containment bay.

FIGS. 20A-20D depict the new preferred full width design for the Credit Card Reader of the deployable Multi-Applications Platform that is enabled by the relocation of the male retentive closure projection in FIG. 19.

Figure 20A:
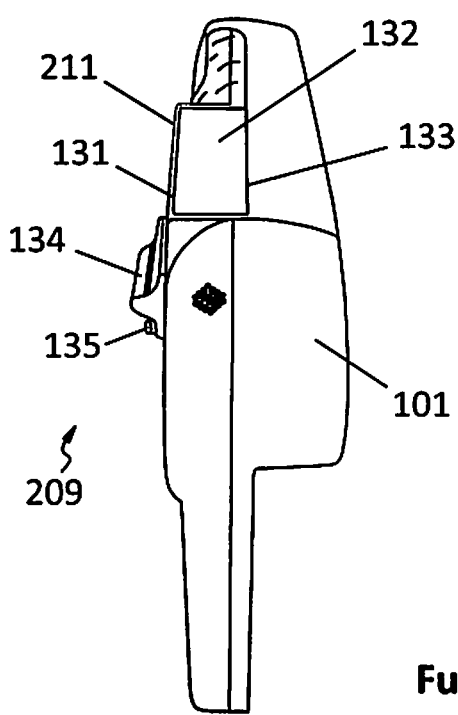

FIG. 20A shows the containment bay lid closed and the Multi-Applications Platform tucked unseen beneath the lid while safely stored within the top portion of the case.

Figure 20B:
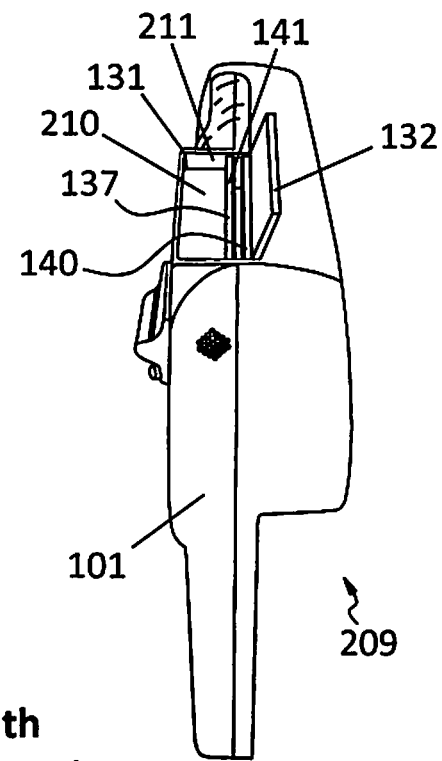

FIG. 20B shows the lid fully open with the very top of the underlying Multi-Applications Platform being viewable through the hatch opening.

Figure 20C:
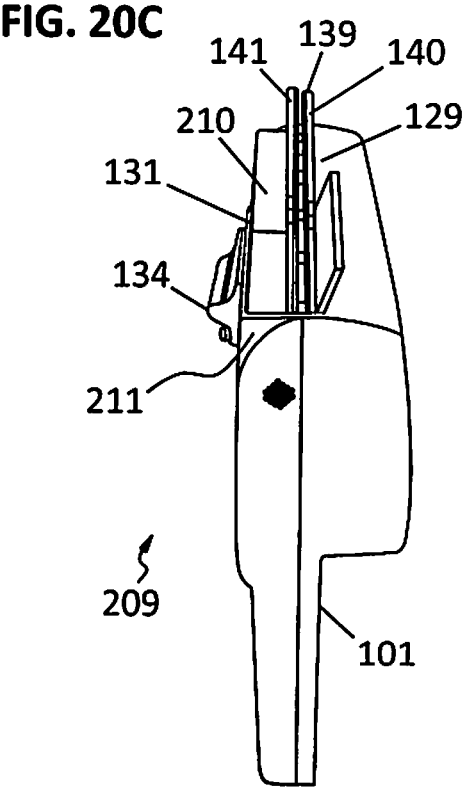

FIG. 20C shows the full extension of the now fully deployed Multi-Applications Platform that displays a full width card reader housing.

Figure 20D:
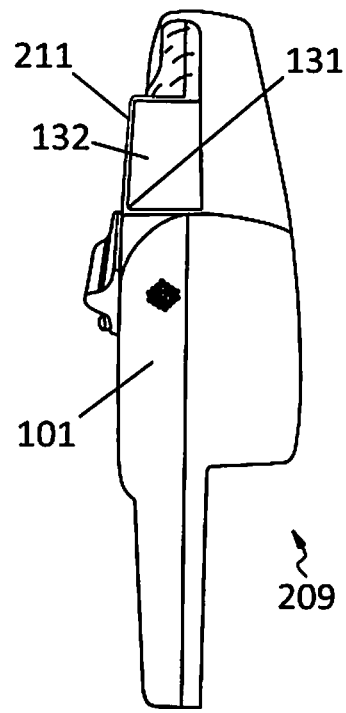

FIG. 20D shows the lid closed over the hatch after the Multi-Applications Platform has been retracted back into storage and thereby prepped for redeployment.

FIG. 21 shows a vertical full length perspective of the backside of the case illustrating the MAP borne credit card reader system deployed from the case top portion. Also illustrated within and upon the case bottom portion are housing for a deployable/retractable credit card and/or EMV source, a deployable/removable standalone EMV source, and a deployable/removable "multi-use" EMV and USB Memory Stick "combination" that is also commonly known as a jump, flash, or thumb drive. A replaceable/extendable/disposable lancet/blood glucose test strip system is also described for inclusion as an option similar to the removable "multi-use" USB drive/EMV drive. The case bottom portion is better suited and recommended for housing other generally larger electrical proximate hardware iterations that would benefit from being stored, deployed, and/or removed from the greater expanse provided by and within the bottom of the case.

FIGS. 22A-22D show the respective front and backside views of the top case portions for two similarly equipped phones that are both outfitted with Multi-Applications Platforms that each carry credit card EMV chips. Collectively the depictions illustrate how one phone that is intended for use as the credit card reader can be flipped over and inverted to the other phone and then both laid parallel on a flat surface whereby the deployed Multi-Applications Platforms upon the top portions of each phone can be aligned and temporarily mated.

Figure 22A:
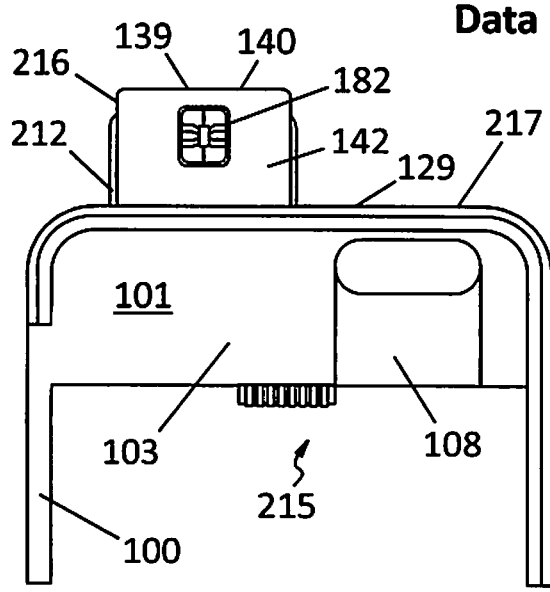

FIG. 22A is a table top perspective of the front "phone side" view of one of the top case portions and is meant to be illustrated as the reader phone since its display screen would be facing upward towards the owner that is viewing the phone's display screen while conducting the monetary or other data transfer.

Figure 22B:
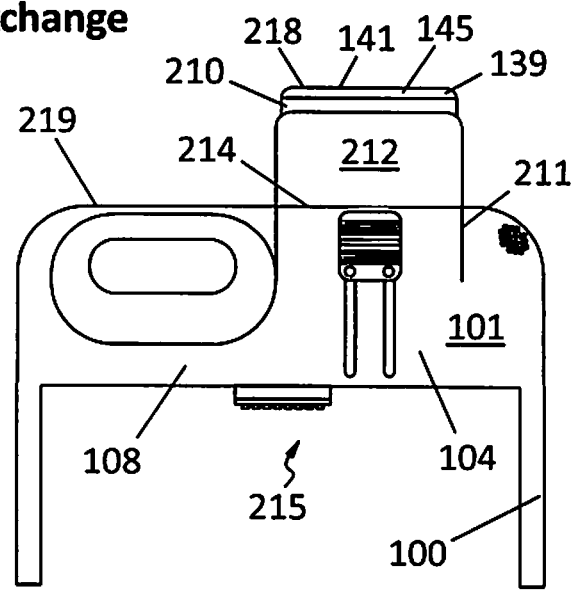

FIG. 22B is a tabletop perspective of the back "case side" view of the top case portion of a second phone where its display screen and EMV chip would temporarily be facing downward and not viewable and is meant in this illustration as the "source" phone to be read as the data provider.

Figure 22C:
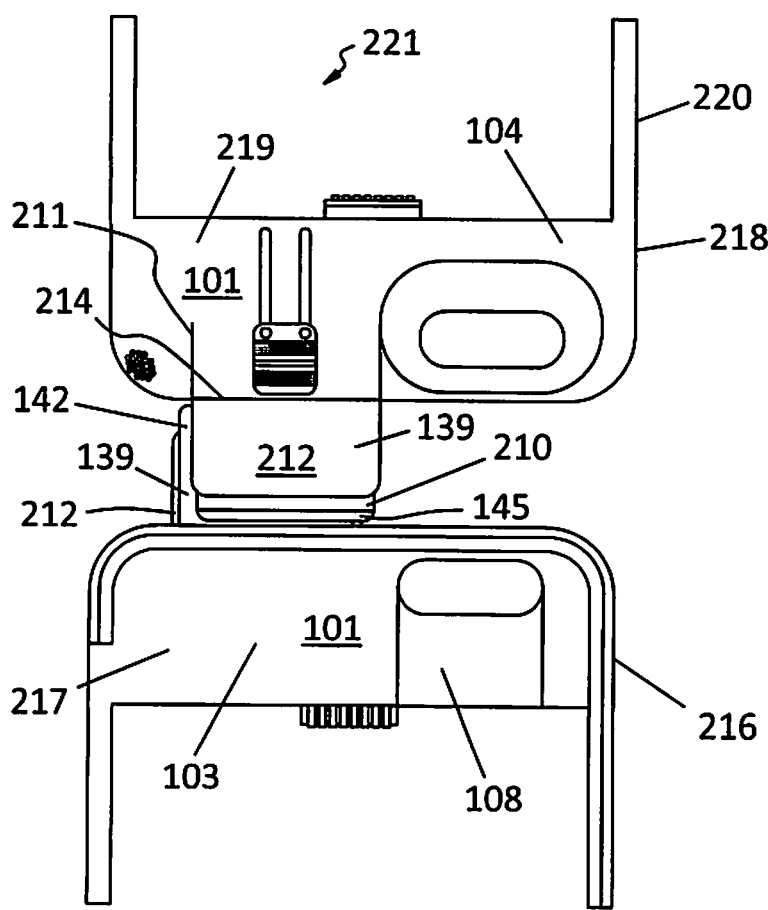

FIG. 22C is shown as a table top illustration of the mutual interlocking between the two phones.

Figure 22D:
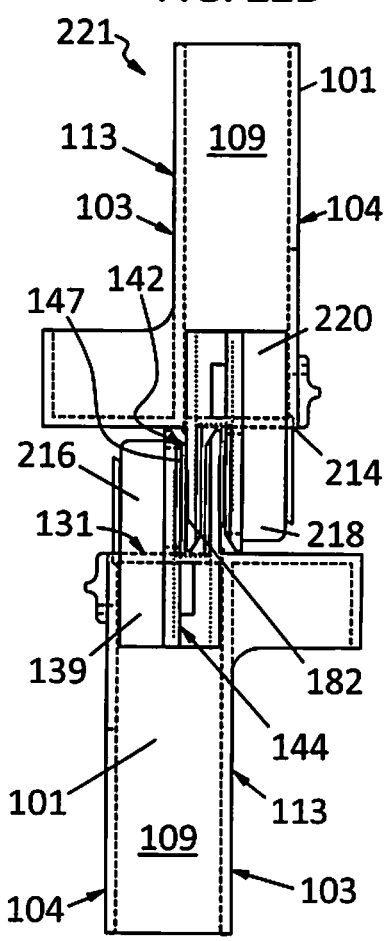

FIG. 22D shows a detailed end view of the mutual interlocking between the respective structures of the data reader of 22A and the data source of 22B.

The FIGS. 23A-C and 24A-C depict the relationships for the wall structure and other custom components for the Multi-Applications Platform of this embodiment for deploying a double wall card reader and then the subsequent retraction of one wall thereby leaving the remaining wall in the deployed position to act as an EMV chip card. This embodiment also employs a double lid "cellar door" design for opening a hatch with the objective of facilitating the deployment of a single wall "data sourcing" credit card.

FIGS. 23A-C represent respective phone side, end, and case side views of a currently deployed double wall (Walls 140 & 141) credit card reader integral to the Multi-Applications Platform.

FIGS. 24A-C represent respective phone side, end, and case side views of a deployed single Front Wall 140 of an EMV Chip card that was selectively converted by the user from the double wall deployment depicted in FIGS. 23A-C.

FIGS. 25A-I are a continuation in detail of the design arrangement shown in FIGS. 23A-C and 24A-C. FIGS. 25A-I additionally portray structural detail and device positioning in a step by step transformation and methodology for achieving the deployment of a double wall card reader and the subsequent retraction of one wall and, most importantly, the capability to totally remove that single wall credit card from the device and then replace it at the discretion of the user.

In FIG. 25A, the double wall assembly is in a retracted and safely stored position within its storage bay integral to the top portion of the protective case platform. Also shown in 25A is an inset that shows some critical component relationships and structural differences from earlier embodiments in the form of a pivoting thumb pad and related spring influenced structures where the user can elect to release the EMV single wall from its union with the remainder of the MAP.

FIG. 25B shows the thumb pad having been pushed vertically by the user thereby achieving full deployment of the unitized double wall assembly.

FIG. 25C shows the top portion of the pivoting thumb pad having being depressed, seesawing its opposing end outward in tandem with retracting an angled end of a locking plunger from its seat within Front Wall 140.

FIG. 25D shows Back Wall 141, and its attached card reader housing, both having been retracted back within the storage bay by the influence exerted by the user in pulling downward on the thumb pad.

FIG. 25E shows the depressed thumb pad having been released with the consequent spring influenced return of the locking plunger to a resilient positioning where its angled end is partially extended from Back Wall 141.

FIG. 25F shows the optional stage of the process whereby the user can elect to completely remove the, single Front Wall 140, EMV Credit Card out of the top of the of its containment bay via the double lid hatch opening, for use as a reduced size, hand held credit card comparable to any credit card that you would remove from your wallet or purse and use autonomously.

FIG. 25G shows that same single Front Wall 140 after being aligned and reinserted back through the double lid hatch where it is directed into collective realignment by the combined deflective guidance of Sidewall 144 of Back Wall 141 and the rest of the encompassing confines of the walls that comprise the interior of the tunnel within the top of the card reader containment bay.

FIG. 25H shows the thumb pad being pushed vertically once again thereby engaging its angled locking end of the resilient plunger back against and into the receiving interlocking notch of single Front Wall 140, with the consequent interlocking and re-unitization of the double wall (MAP) card reader structure.

FIG. 25I shows the reverse pull of the thumb pad downward by the user thereby influencing the return of the whole unitized double wall assembly back to a fully retracted and safely stored position within its designated storage bay that is integral to the top portion of the protective case platform.

FIG. 26 is a backside vertical perspective view of the case and the deployed MAP device which illustrates a user induced "Blow" flow of air as it passes through and out of the MAP across a gas sensor. Also shown is a disposable mouthpiece that provides the user with a choice to either place and seal their lips directly over the extended portion of the Multi-Applications Platform or to apply and use a new sanitary mouthpiece every time an individual other than the owner desires to have a breath sample analyzed.

FIGS. 27A and 27B illustrate more detailed perspectives for the design of the total "Blow" air flow system and the specific pathways that the air must travel due to the physical construction for the deployable Multi-Applications Platform that was previously vividly detailed in FIGS. 5A and 5B.

FIG. 27A shows a backside view of the entire case platform as well as a corresponding inset that depicts partial structural detail of the MAP.

FIG. 27B shows a see through end view of the disposable mouthpiece while telescoping over the MAP and relates the air flow detail as it passes through their combined structures and perpendicularly out the bottom of the MAP.

FIGS. 28A-C show design arrangements causing a reverse "Pull" flow of the air/gas being sampled.

FIG. 28A is a backside vertical perspective view of the case and deployed structure that demonstrates the bi-directional air flow capability of this invention whereby an induced "reverse" flow of air useful for "Pulling" an ambient gaseous sample for analyzation can be generated directly upon the MAP by the lips and mouth of the user.

FIG. 28B illustrates an alternate gaseous pull arrangement where a specialized MAP cover with a connector port, air tubing, and a hand or mechanical air pump system are provided for stimulating a pulled air sample when use of the mouth cannot be employed due to either the extended duration of a sampling or the unknown or noxious nature of the gas or gases being sampled.

FIG. 28C shows use of a hand or mechanical air pump connected via air tubing and a specialized adapter to a hole within the air vent cluster of the case to stimulate the same direction of air flow as in 28A and 28B. However, to effect that same direction of induced air flow, the pump in 28C is configured to cause a push of air through the tubing while the pump in 28B initiates a pulling of the air sample.

FIG. 29A and FIG. 29B illustrate more detailed perspectives of the structural relationships along with the exacting reverse air flow pathways that form the unique "Pull" air sampling technique of this invention.

FIG. 29A and its related "structural detail inset" show the "reverse" air flow being deflected and guided by the simple wall shaping integral to the MAP where flow is drawn laterally into the bottom of the MAP and out the top.

FIG. 29B shows a see through end view of the disposable mouthpiece while it covers the MAP and the related "reverse" air flow detail.

Figure 30:
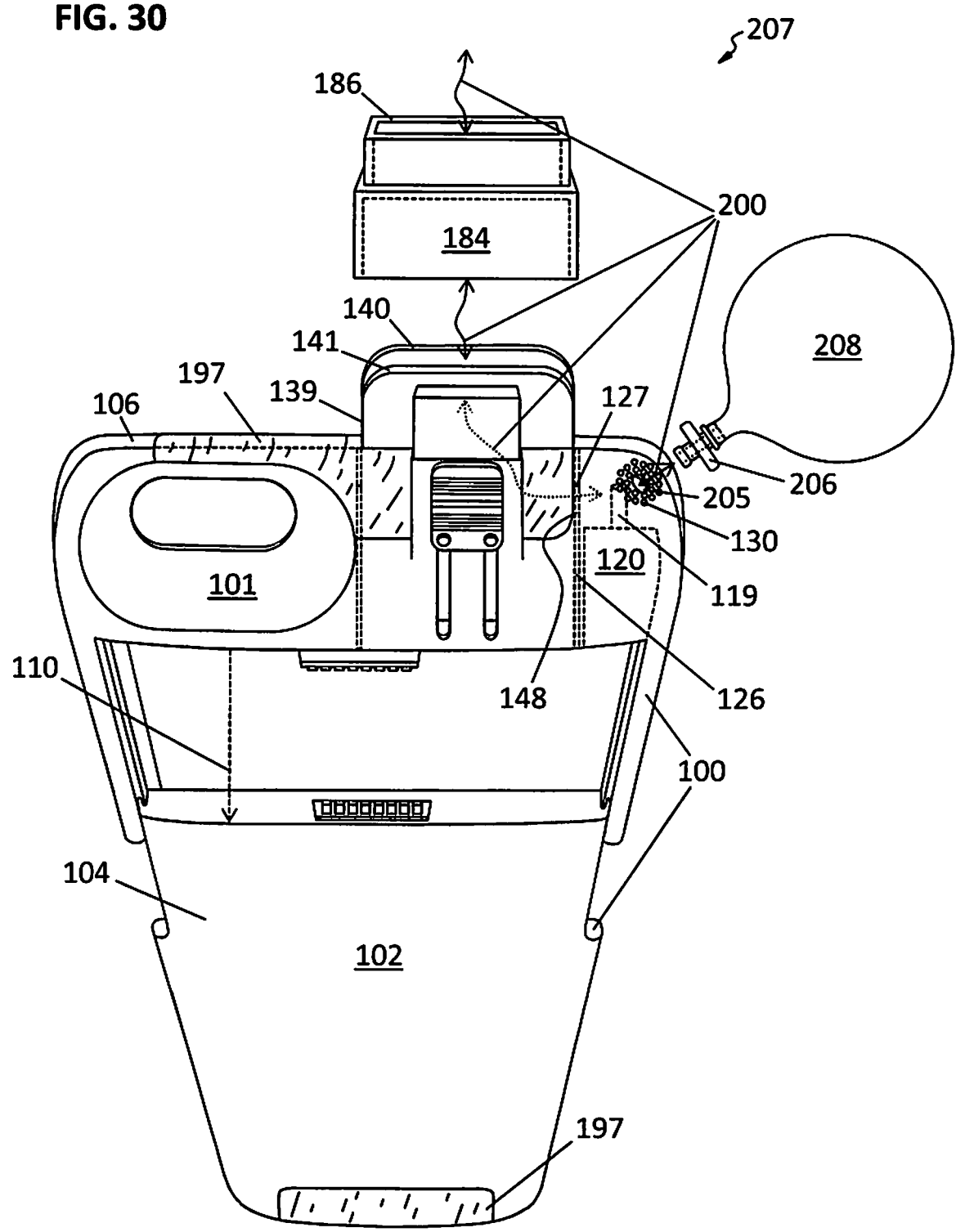

FIG. 30 illustrates a health related embodiment in the form of a Spirometer that measures lung capacity. This arrangement employs a bi-directional "Push/Pull" capability for inducing, guiding, measuring, and/or analyzing the flow of air across in-line air/gas sensor(s).

FIG. 31A shows an embodiment of an electronic vaporizer/nebulizer inhalant arrangement of this invention that incorporates a reverse air flow pathway similar to that illustrated in FIG. 28A other than the vent cluster located upon the surface of the case would generally require the capability to be selectively shut off while employing the vaporizer/nebulizer inhalant usage option.

FIG. 31B illustrates use of the multi-use gaseous funnel, cooperative air tubing, and a therapeutic mask to be worn over the face of a person receiving a nebulizer treatment.

FIGS. 32A and 32B illustrate detailed perspectives of the reverse air flow pathway unique to the electronic vaporizer/nebulizer inhalant embodiment that occupies both the top and bottom portions of the case.

FIG. 32A, and related inset, show structural detail and guidance of the "reverse" flow of air/vapor as it enters the case at the air inlet in the case bottom portion and exits directly out the top portion of the case through the MAP top.

FIG. 32B shows a see through end view of the disposable mouthpiece that telescopes over the MAP and the related "reverse" air/vapor flow detail and the alternate "top of the cover" exit point.

FIGS. 33A-33D depict embodiments of a vent cluster "closure cover" system utilizing either an exterior located closure cover or the preferred interior located closure cover. 33D shows an alternate design for an exterior vent closure system equipped with four available positions that dictate respective open or closed positions for a side by side vent cluster and vent hole arrangement.

Figure 33A:
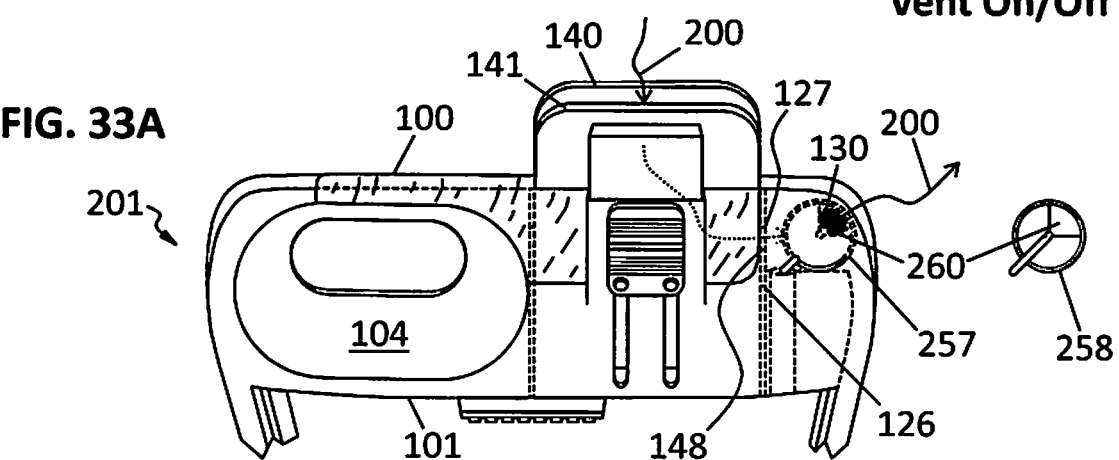

FIG. 33A shows an open position for the closure cover to permit user induced blow air flow to exit the case via the vent cluster.

Figure 33B:
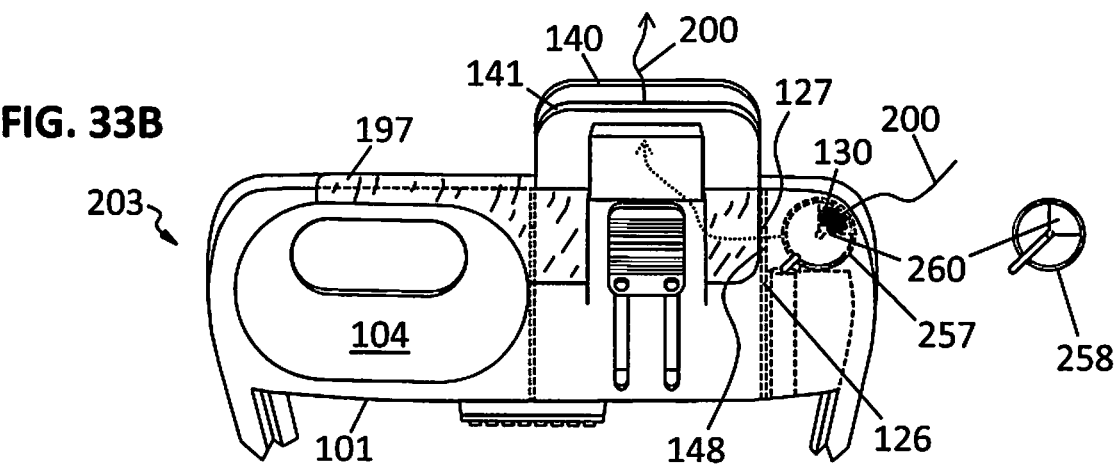

FIG. 33B also shows an open closure cover that permits a pulled air sample to enter the case via the vent cluster and pass through the interior of the MAP and exit directly out its top.

Figure 33C:
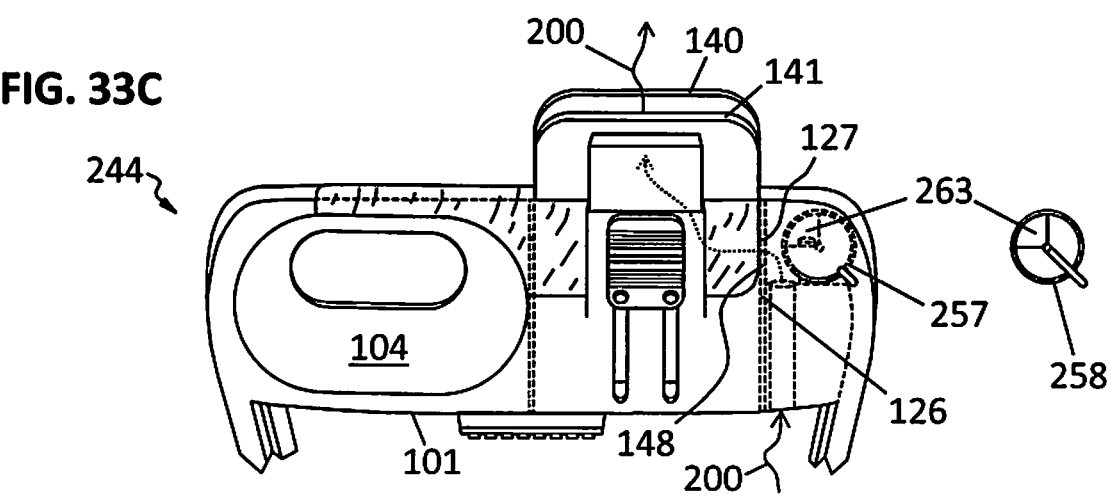

FIG. 33C shows a closed position for the closure cover that forces air to be drawn through the air inlet of the inhaler device when the user's lips draw directly upon the MAP or, alternatively, upon the disposable mouthpiece depicted in FIG. 32B.

Figure 33D:
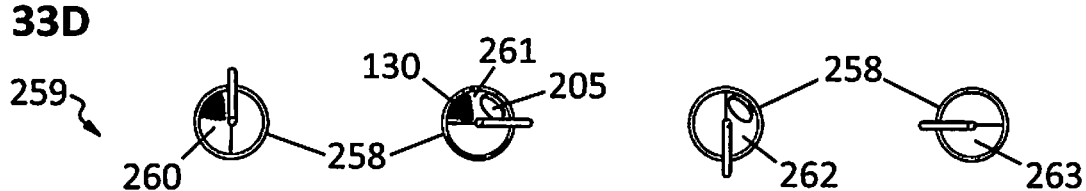

FIG. 33D employs exterior located vent closure covers that are configured for four positional selection and rotation between either an open vent cluster only position, and an open vent cluster and adapter hole together position, an open vent hole only position, and a closed position totally blocking both the vent cluster and the adapter hole.

Figure 34A:
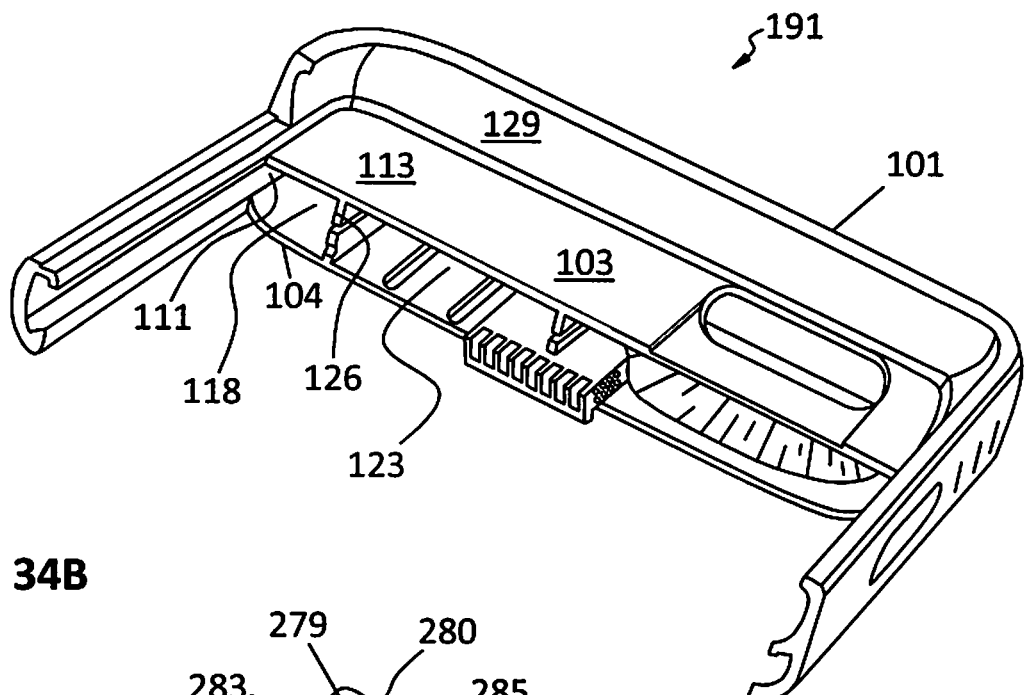
Figure 34B:
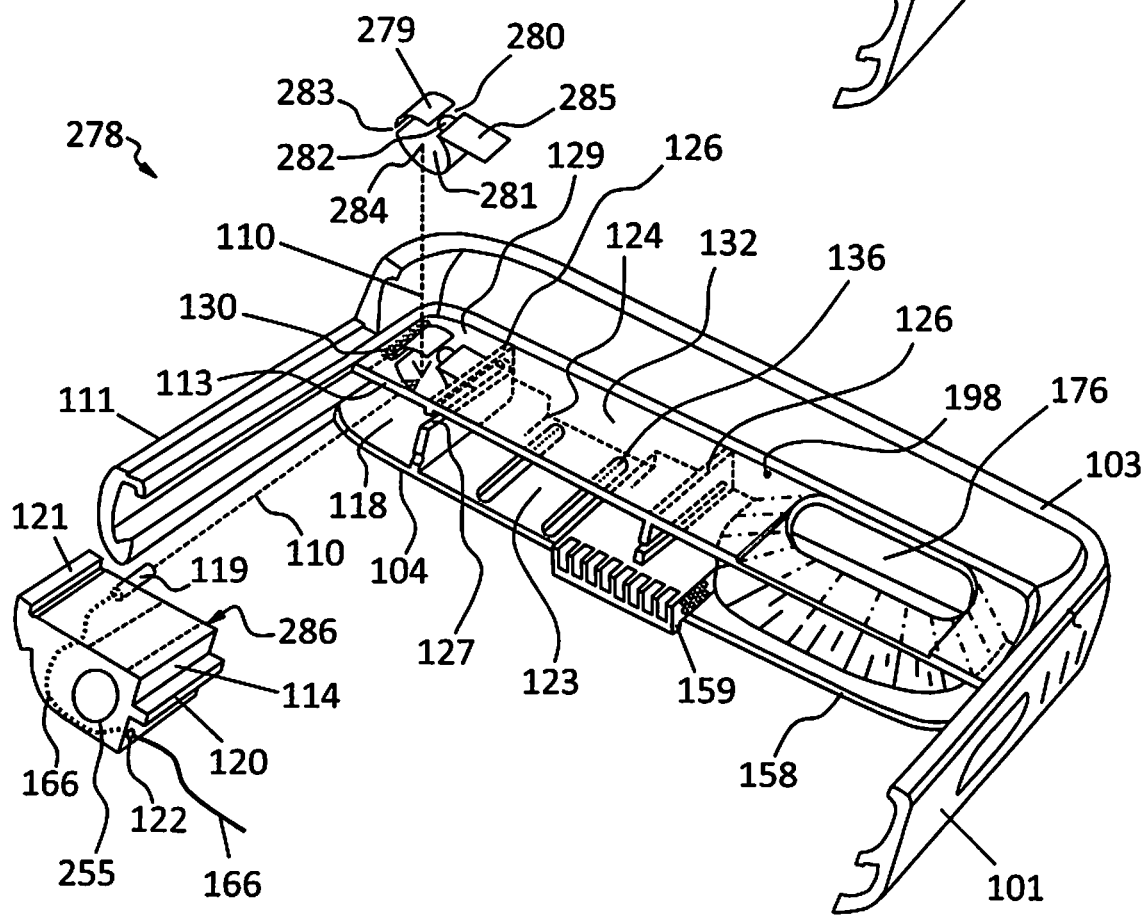

FIGS. 34A and 34B illustrate an improvement disposed in the bottom recess of the gas analysis bay in the form of an emergency whistle for alerting others to a problem, a state of endangerment, or sounding a call for help by the phone owner/user or, alternatively, to be used as a pet or animal call.

FIG. 34A is a phone side perspective view of the top portion of the case with empty bays and the wall of the phone bed appearing in natural solid form that thereby blocks interior viewing of the underlying containment bays and in particular the gas analysis bay.

FIG. 34B shows the wall that comprises the phone bed as being transparent or having been removed so as to enable visualization of the integral molded structure that will be formed during manufacture within the bottom of the gas analysis bay that will accommodate and/or form, affix, and comprise a non-electrical whistle device powered by human breath.

Figure 35A:
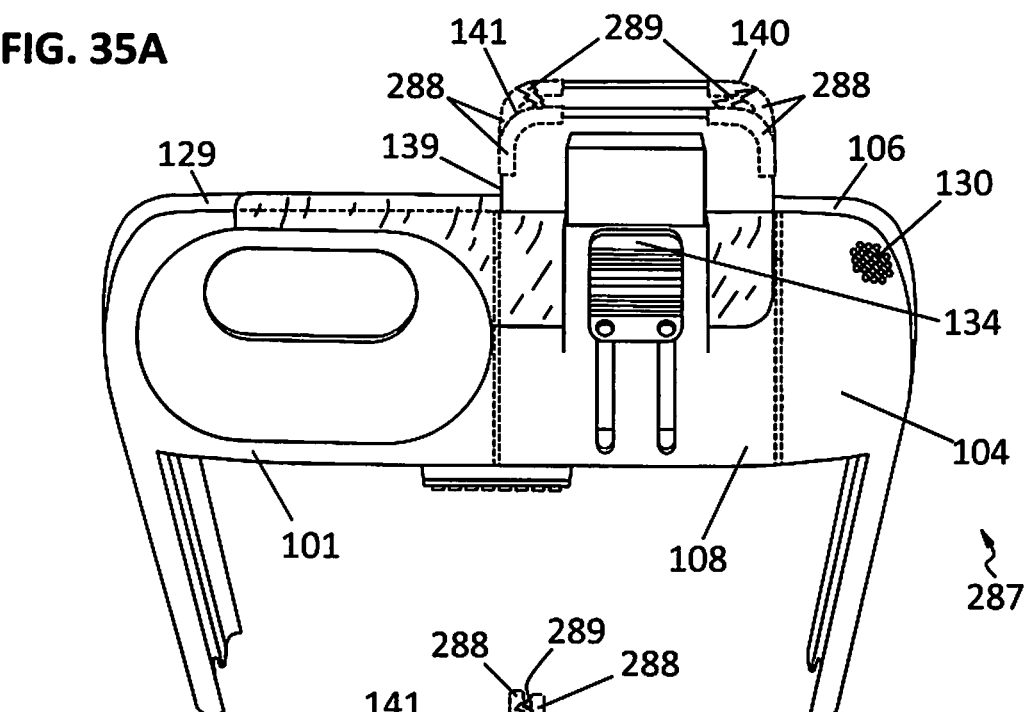
Figure 35B:
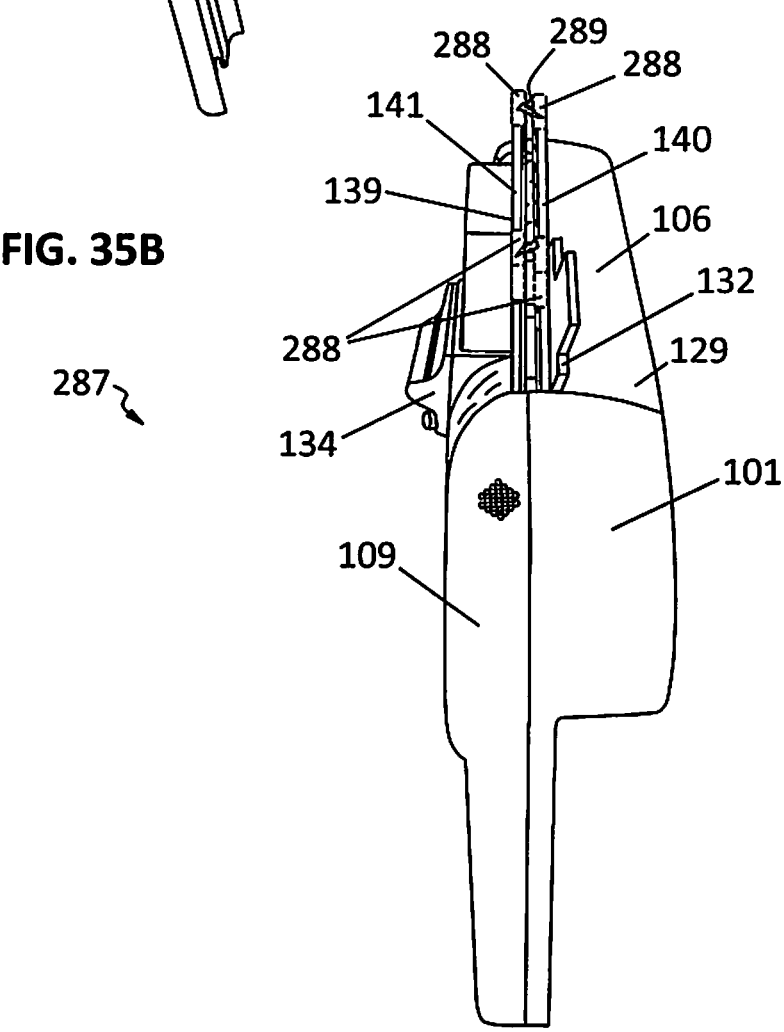

FIGS. 35A and 35B collectively show an embodiment for a personal security and protective device in the form of a pair of electrodes that are disposed upon Walls 140 and 141 of the deployable structure whereby they can be deployed, activated, and discharged against the body of a hostile or otherwise aggressive person or animal to repel an endangering attack.

FIG. 35A is a case back side/top side view of the Multi-Applications Platform and the electrodes.

FIG. 35B is a case side/top side view of the electrodes and the air gap formed between the electrode pair or pairs.

FIGS. 36A-36F illustrate arrangements for a Multi-Meter device for analysis of electrical circuitry.

FIG. 36A shows a backside/topside perspective view of a two piece case having a wired set of electrical probes that can be attached to and used in conjunction with the Multi-Applications Platform. Also shown is a probe storage system that is exclusively created within custom bays within the top portion of the case for quick storage and easy retrieval for a wired or wireless set of probes that possess extendable tops. FIG. 36A also details a unique set up and use of a deployable viewing stand leg arrangement as an aide for removing the electrical probes from storage.

FIGS. 36B-36F illustrate an extendable wireless probe that is a analogous reiteration that builds upon the basic form and construction of the sliding gas retention sidewall introduced in FIGS. 5A and 5B and whose operation and function was detailed in FIGS. 6A-11A, 6B-11B, and 6C-11C. FIGS. 36B-36E detail step by step depictions of a system of storage and retrieval for the electrical probes within and from the MAP of the two-piece case platform.

FIG. 36B shows end views of probe bodies with extended and retracted probes. The probe body having the retracted probe is shown in alignment with the top of the MAP and is thereby prepared to be inserted down through the open hatch into the guidance tracks of the MAP and continuing downward until the tops of the probes become flush with the top the MAP below.

FIG. 36C shows a cut away side view of the retracted MAP that has been pictorially isolated by having the top case portion removed from the top half of the drawing. The bottoms of the stored probes are shown as having being received within the cavities of the cases bottom portion beneath the viewing stand leg.

FIG. 36D shows the ejection process having begun where a finger of the user can be used to displace the probe ends and propel the probe bodies upward a short distance.

FIG. 36E shows the two probes having been totally removed from the MAP and their finger pads having moved upward thereby extending the tops of the probes for use in a manner consistent with conducting electrical testing and circuit analysis.

FIG. 36F shows a side view of a cutout section depicting the thru-hole arrangement that is to be utilized with the SGRS test probe arrangement that is stored and removed from the MAP. More importantly, FIG. 36F shows the reverse horizontal orientation required for the viewing stand leg and its related underlying structures in order to accommodate use of the SGRS test probe arrangement.

Note: It is hence forward to be understood that all of the drawings referenced within this specification which have an alpha letter following the figure numeral, are to be considered as drawings that are specifically interrelated. It is also to be understood that should the master figure numeral be utilized singularly by itself anywhere within the specification, then it should be additionally recognized that description is being made and given for each and every drawing described within that related family of drawings having the same master figure numeral. For example, if FIGS. 1A, 1B, and 1C are utilized as numbered references to the drawings, then use of the singular term FIG. 1 anywhere within the specification would be inclusive of description given for FIGS. 1A, 1B, and 1C.

DETAILED DESCRIPTION OF THE EMBODIMENTS

Figure 2:
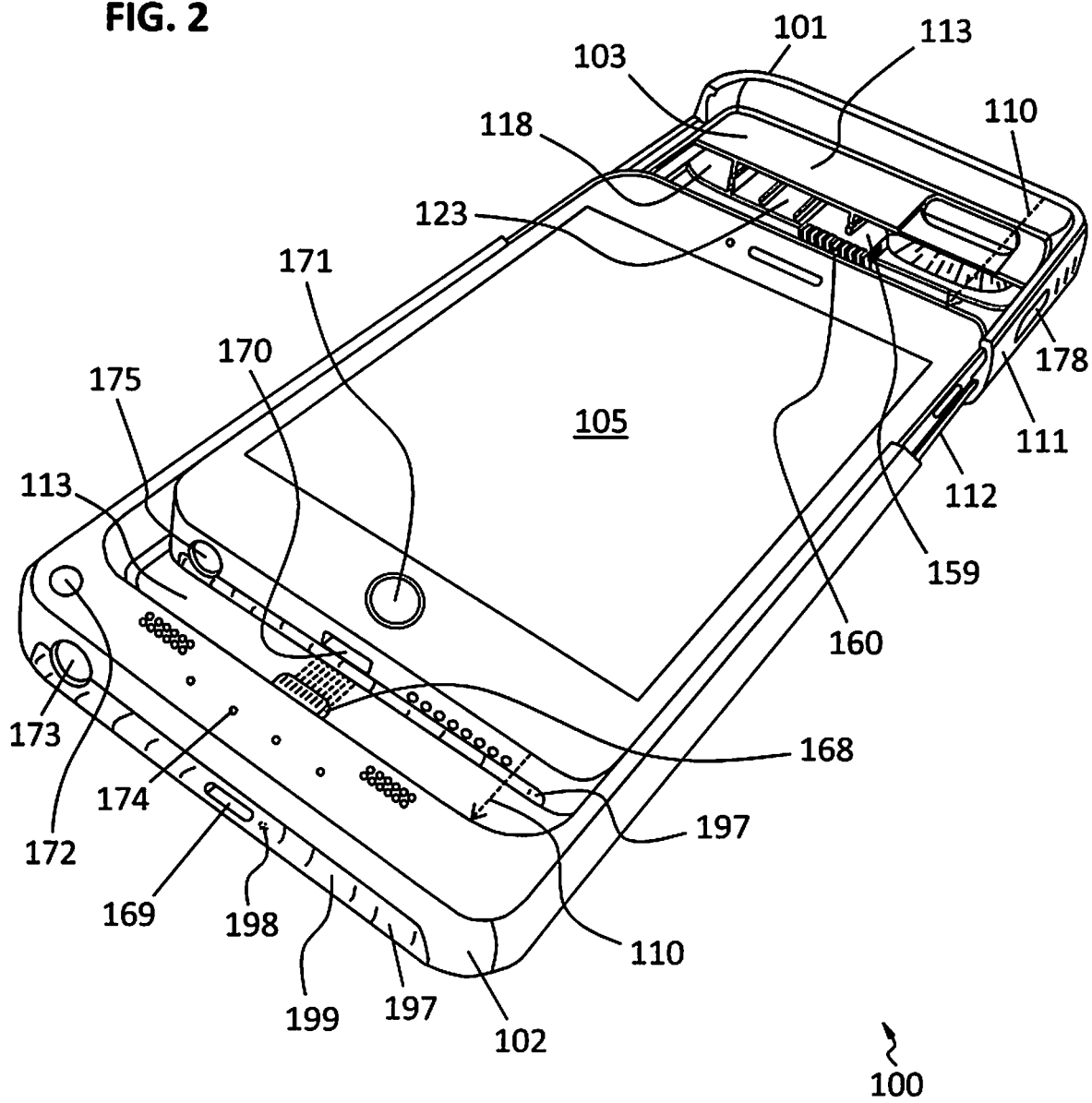
FIG. 2 depicts partial insertion and enclosure of a wireless phone within the two individual protective case portions. Their current pre-connective status aptly demonstrate the electrical interfaces that will occur by and between each case portion to each other and to the enclosed phone upon completing full assembly.

Looking first at FIGS. 1 and 2, a Protective Phone Case 100 is provided as a modular platform for housing "additional electrical hardware" capable of executing the particular electronic tasks that are important to many phone users while also providing housing for an auxiliary power source that will energize and run any and all of these extraneous tasks. The particular strength and value of providing housing for "additive hardware" upon a case/phone unitized platform is that the auxiliary hardware consistently travels with the phone and therefore is always available to the phone owner/user.

In a partial representation of the preferred embodiment of this invention, FIGS. 1 and 2 respectively show a Case Top Portion 101 and a Case Bottom Portion 102 that comprise a Protective Phone Case 100 for a Mobile Phone/Device 105. A Case Retentive Flange 159 is depicted that performs conventionally in aligning, connecting, and the binding together of the two portions of the case in a retentive fashion. Exclusive to this invention, the retentive flange also has the additional function of importantly serving as a male electrical interface with and between the top and bottom portions of the case platform which are all subsequently electrically linked to the encased wireless phone or other wireless device. A supplemental locking mechanism of a design known to the art may be provided for the assured maintenance of the abutted state between the case portions or for ease in electing their inter-componential release.

Also introduced are component pieces of "additive" electrical hardware called Proximate Hardware 114 that comprise an important part of the invention. Proximate Hardware 114 is defined as any peripheral "supplemental to the phone" computer related electrical hardware and/or non-electrical hardware that is physically located and/or housed within or upon the platform of a protective case in either a fixed or a deployable state of affixation whereby the Proximate Hardware continually resides in proximal contact to the phone in a manner and physical location that is "adjacent to" but "independent of" the phone platform itself. The proximate hardware is generally controlled by the phone's CPU and/or it may be supplemented or independently controlled by a CPU integral to the case.

A vital portion of this invention involves a particular piece of Proximate Hardware in the form of a multi-function structure that is capable of being cyclically deployed and retracted from the top of the phone case as desired by the phone owner. That novel multi-function structure performs multiple analogous uses for the phone owner from the same structure and is thereby named the "Multi-Applications Platform 137". For sake of brevity, Multi-Applications Platform 137 is henceforward to be additionally recognized and called either MAP or MAP 137 or by the full unhyphenated name, Multiple Applications Platform 137. Two of the primary analogous uses slated to be executable from the MAP are a Credit Card Reader System 209 capable of instantly taking a payment by the insertion and reading of any conventional credit card and a Blow Gas Analysis System 201 that is initiated by the phone owner/user by blowing a breath sample through the top of the deployed MAP and having its constituent components examined, identified, and/or amended for reasons such as having medical treatments rendered.

The invention of MAP 137 is the unlikely conception and the not before marriage of convenience and utility for and between the novel capability to selectively deploy a variety of "specialized duty" Proximate Hardware 114 applications with the planned disposition and provision of credit card data reading capabilities in combination with the formation of exacting internal gas/air flow passageways within the MAP that precisely route any subject gas for the detailed analysis of its content or its general passage through the system. Most importantly, both of these unrelated functions that are highly desired by the phone user public are collectively conducted from the same deployed structure while being accomplished from the most convenient, damage resistant, and accessible location to the user, the top of the phone.

The plan is to locate the more frequently used "Special Applications" electrical hardware, that are to be actively engaged by the user, conveniently upon the top of the upper portion of case where they may be selectively deployed at the will of the user whereas the more sporadically used, non-critical, or supportive hardware is to be located within storage modules upon the lower case portion. These arrangements collectively permit more combinations of user applications to be run from the MAP then would otherwise be possible due to the very limited space available to house all of the individual hardware pieces within and/or upon the upper portion of the case. The collective gains realized from MAP usage importantly provide savings in space and weight in combination with greater and more varied utility and immediate convenient access. Any device or devices, electrical or non-electrical, present or future, that would benefit from safe storage and then selective deployment/extension and instantaneous usage and then reversed and retracted back into protected storage subsequent to finishing usage, are potential hardware applications that would greatly benefit from being situated, disposed, and executed from the deployable Multi-Applications Platform atop the protective phone case.

Briefly viewing FIG. 3, the MAP is unobtrusively stored and electively positioned from dual standpoints. While retracted and stored, it is completely contained within the confines of the case top portion. While deployed, the MAP extends vertically in line with the top of the phone which importantly permits the user of a MAP application to quickly interrupt that usage and place the phone against their ear or head in a normal manner without encountering obstruction by the MAP in order to answer a phone call or to quickly view the display and/or execute any other phone access issue or orientation that might normally be required of the phone user. Also, with the MAP positioned parallel to and directly above the case top portion, the whole case/phone unit may be placed upon any flat surface without incurring damage to the extended MAP.

Returning to FIGS. 1 and 2, the preferred embodiment will generally make use of a two piece/portion of case as shown in FIGS. 1A and 1B. These two case portions have a slidable partial overlap and interlocking physical design that engages, telescopes over, and covers a Mobile Phone 105 from its two ends as specifically shown in FIG. 2.

For purposes of clarity, when a two piece case is described it is from the perspective of the end user where there are only two case pieces for that user to assemble over the mobile device in order to form the outer protective case. From a manufacturers' perspective, that two piece case is often actually three or more molded pieces so that a cavity may be created within the case to house an Auxiliary Battery 157.

Now focusing on FIG. 2, for better visualization and understanding of the phone envelopment procedure, the two interlocking elemental pieces that comprise the platform of the Protective Phone Case 100 are a Case Bottom Portion 102, which envelops the phone from the microphone/mouthpiece end of the mobile phone and a Case Top Portion 101, which completes the encasement from the top speaker/earpiece end of Mobile Phone 105.

The bottom portion of the casing is generally designed as the substantially longer and thereby the larger component of the two piece case design. This is due to the fact that it in addition to supplying the majority of the surface area for providing a glove like fit over the encased phone it also must provide an extensive amount of space for the creation of an internal cavity for housing a backup power supply within its casing.

To begin the insertion process, the backside of the mobile device is longitudinally laid within a cooperatively shaped receiving cavity upon a Case Phone Bed 113 that is accessed from the Case Front Side 103 of the Case Bottom Portion 102. The phone becomes encased within the bottom portion as it is slid downward as indicated by Directional Arrows 110 while also establishing a substantive degree of intimate surface contact between the phone and said casing. Consequent to that slight downward movement, the female Phone Charge Port 170 of the mobile phone engages over and receives a male shaped member of a Case Interface Plug 168 integral to the case.

The male Case Interface Plug 168 is selectively located within the bottom end of the casing so that it projects and aligns with the insertive path of the phone indicated by Directional Arrow 110 and thereby facilitates the physical engagement and interlocking between the female over the male portions of the charge port and charge plug respectively of the phone and the casing. The phone has now received and undergone a stable wired electrical interconnection between itself and an intermediary Control Circuit Board 167 for the case that is in direct connection to the Auxiliary Battery 157 which are both mutually housed within the bottom portion of the case as depicted in FIG. 1B.

Viewing FIGS. 1 and 2, the top portion of the casing now finishes off the assembly as it is inserted over the top end of the phone and moved downward as indicated by Directional Arrow 110 toward a butt connection with the bottom portion of the casing. Subsequent to and as a result of that downward insertive process, partial telescopic interlock is established between the Outer Alignment and Connection Rail 111 of the Case Top Portion 101 and the Inner Alignment and Connection Groove 112 of the Case Bottom Portion 102 simultaneous with complete envelopment of the newly enclosed Mobile Phone 105. Phone user access to the underlying control buttons of the phone are provided through a Case Cutout 178.

Briefly adding viewing of FIG. 3 to FIGS. 1 and 2, concurrent with the assembly process between the top and bottom case portions, a Case Retentive Flange 159 integral to the Bottom End Wall 158 of the Case Top Portion 101 is automatically inserted within a Case Retentive Slot 164 integral to the Top End Wall 163 of the Case Bottom Portion 102. The Case Retentive Flange 159 carries a resilient set of Flange Interface Conductors 160 that are inserted within and dock with a complementary resilient set of Slot Interface Conductors 165 which are integrally disposed within the Case Retentive Slot 164 within the Case Bottom Portion 102.

The Slot Interface Conductors 165 are indirectly linked to the male Case Interface Plug 168 located at the bottom of the case via an Electrical Conductor Ribbon 166 that generally runs the length of the case bottom portion. The electrical conductor ribbon is fitted with a female Socket Interface 162 at both of its ends where each undergo cooperative fit onto male Pin Interface 162 arrangements provided upon two separate case control circuit boards that are independently located at the upper and lower ends of the Case Bottom Portion 102. Alternatively, the conductor ribbon may have taps placed anywhere along its length to provide infinite locations for providing points of interconnection to the conductor ribbon to and with any nearby proximate hardware.

Each of the two circuit boards just described provide the computer logic control circuitry specific to the hardware they service while they complimentarily contribute to the overall operational requirements for the case/phone unit. The upper circuit board provides hard wired electrical connection to the Slot Interface Conductors 165 that are integrally disposed within the Case Retentive Slot 164. The lower circuit board carries hard wire connections for both the male Case Interface Plug 168 and the female Case Charge Port 169.

Now viewing FIG. 1B, and more specifically, the exploded enlargement shown in FIG. 1C. For mounting purposes, the male Case Interface Plug 168 is generally mounted upon a third smaller Control Circuit Board 167 since this male plug must be physically located so that it may align and mate within the female Phone Charge Port 170 of the enclosed phone on an physical level that is elevated above the level that the bottom Control Circuit Board 167, the Case Charge Port 169, and the Auxiliary Battery 157 all reside upon. This smaller circuit board generally overlaps and interconnects with the larger circuit board of the bottom case portion by either plugging directly into the Socket Interface Row 162 connectors integral to the bottom end of the Conductor Ribbon 166, or as shown in FIG. 1C, via an intermediary located Interface Block 161.

It should be understood that all of the previously described circuit boards have been identified in the drawings with the same numerical reference of Control Circuit Board 167 due to the redundancy for all circuit boards as similarly being platforms and guides for the physical mounting, orientation, and electrical layout and interconnection of the various electrical circuits/assemblies they each bear.

Circuitous interconnection with the case electrical system has now been achieved by a direct link between the case computer Circuit/Logic Boards 167 located at the upper and lower ends of the case bottom portion. The circuit boards now link the enclosed Phone 105 with the Case Platform 100 via the preceding insertion of male Case Interface Plug 168 within the female Phone Charge Port 170. Immediately upon the individual case pieces becoming fully assembled over the cellular phone from its two opposing short ends, full electrical continuity and communication between the top and bottom case portions, the electrical hardware they respectively carry, the auxiliary case's battery, the phone's battery, and the mobile phone will all be collectively established. A charging cable for the case can now be plugged into the Case Charge Port 169, whereby the case's Auxiliary Battery 157 and the phone's battery can be charged with the same single charge cord. A grouping of LED Charge Level Indicators 174 and a Power Switch 172 are provided to respectively monitor battery condition and to selectively turn on and establish interconnection between the charging system and the case's battery and/or to the phone's battery. A case Jack Access Hole 173 permits the user to plug in any devices having a headphone plug, directly within a Headphone Jack 175 integral to the phone. A Home Button 171 is provided upon the phone that is equipped with finger identification technology that importantly precludes usage of the phone, as well as any usage of the phone/case unitized assembly, by anyone other than the phone owner or their authorized assigns which will be described forthcoming in more detail.

Still viewing FIG. 1B, Storage Modules 115 having specialized Containment Bays 117 are provided on the Case Bottom Portion 102. Access to their internal structure is provided through the opening or removal of Storage Module Lids 116 that are transparently depicted in the drawings as being provided and disposed on the flat surface of Case Phone Bed 113 on the Case Front Side 103. The purpose of these storage modules and containment bays is to house the various supplemental Proximate Hardware 114 packages necessary to execute and run the various phone applications of particular interest to the user.

Now focusing on FIG. 1A, in the preferred embodiment the smaller top portion of casing is also selectively and novelly used as a platform for housing unique supplemental hardware combinations in the form of the Multi-Applications Platform 137 whose construction will be highly detailed forthcoming. One reason for the preferred status for the top portion of the casing is it is ideally located for housing some important hardware designs that are operationally best suited for being located at the top of the phone. Another reason is to take strategic advantage of some otherwise unused space.

Conventional design iterations for the top portion of the case involve a substantive amount of wasted space. It is only wasted space due to the fact that, previous to this invention, the true value and importance of this space has not been foreseen, acknowledged, and scrutinized as key areas of very limited real estate where highly useful and valuable modular housing can be created for locating supplemental Proximate Hardware 114 product solutions that are uniquely suited to provide exceptional function and operability at the top of the phone. Physical areas upon the case which are preferable for housing novel computer APP "combinations" that will take full advantage of that valued space and even extend and expand it through design modifications of "common to the industry" case platforms into forward looking housing for ever evolving "supplemental to the phone" product iterations of current and future ilk.

The initial creation of this wasted space relates directly to the fact that in consideration of the plastic parts that are to be produced by the manufacturing process of plastic injection molding, thick areas of plastic are avoided due to factors of undesired weight, excess material cost, and lengthened cooling time and/or part imperfections due to uneven material contraction during cooling. The mold maker carefully designs pathways for the mold to open and close that are congruent with part production yet avoids problematic thick cross-sections within the molded part. Thereby parts are astutely and correctly designed with spatial voids, otherwise described as vacant hollowed out areas, which result in consistent reproducibility of quality parts.

It is the plan of this invention to make use of these voids within the top piece of the case, and actually expand and make improvements within them, to create and house unique Phone APP "combinations" that will be highly desired by the user.

In this instance "Case Waste is converted into Case Space"!

Still viewing FIG. 1A, it is thereby the plan of this invention for Storage Modules 115 to be created within the top portion of the phone case that will provide custom housing to contain "supplemental to the phone" hardware packages or systems within their confines. Customized Containment Bays 117 are provided with the storage modules which are essentially housing refinements capable of handy yet safe storage and containment of whatever additive hardware that might be needed to support whatever computer driven APP or function that is deemed useful by the user.

In further analogous description:

The Case Platform 100 is the House (Encompassing everything within)

The Storage Modules 115 are the Closets within the House (Providing Gross Compartmental/Housing)

The Containment Bays 117 are the Customized Drawers/Shelving within the Closet (Providing Precise Positioning and Refined Compartmental/Housing)

A Gas Analysis Bay 118 adjacent to a Card Reader Bay 123 are the two essential customized Containment Bays 117 created within Storage Module 115 of the Case Top Portion 101. These two bays collectively house the important two substructures that comprise the mainstay of this invention, the Multi-Applications Platform 137. Of these two substructures, one is generally mounted in a stationary format while the second substructure generally utilizes a mounting that permits the substructure to be deployed and then retracted at the discretion of the phone owner/user. The first MAP substructure is a Gas Analyzer Housing 120 that is stationarily mounted within the Gas Analysis Bay 118 where its external shaping acts as both an insertive and retentive structure that additionally forms an Airtight Plug 121 for and within the end of Gas Analysis Bay 118. Airtight plug function is inclusive of sealing, gripping, and limiting the depth of insertion within and against both the Outer Alignment and Connection Rail 111 and a Guiding Plane Slot 127. The second MAP substructure is a Card Reader Housing 146 that is endowed with a "user selectable" type of deployable and/or retractable housing within and from the Card Reader Bay 123. These two componential substructures make up and encompass the main Multi-Applications Platform 137 whereby they each cooperatively function with one another while being compatibly controlled and analogously utilized from the same parent structure yet produce mostly unrelated functions and outcomes.

Adding viewing of FIG. 3A to FIG. 1A, in order to provide a clearer mental picture of the Multi-Applications Platform 137 and have a better total visualization for its overall construction and potential for design variability, the main components that further comprise the two just described MAP substructures will also be defined and included in the drawings at this time. The generally stationary portion of the MAP substructure previously identified as the Blow Gas Analysis Device/System 201 is generally further comprised of a Gas Analyzer Housing 120 and a Gas Analysis Sensor 119. The generally moveable portion of the MAP substructure previously defined as the Credit Card Reader Device/System 209 whose position is electively chosen by the user through finger manipulation of a Thumb Pad Drive 134 as being either deployed or retracted, is generally further comprised of a Credit Card Reader Housing 146, a Credit Card Reader Head 147, a Card Reader Front Wall 140, and a Card Reader Back Wall 141. These additional descriptions aptly define the basic composition of the MAP that with minor componential additions and/or slight design variations, in particular to the credit card reader device portion, can be adapted to provide and execute a variety of products, devices, and different Computer Applications, with varied functions and features that can be adaptable and cater to the desires and wants of the phone consumer public.

Specifically looking at FIG. 3A, this representation is shown without a phone while depicting a Case Back Side 104 vertical perspective view of a partially assembled two portion (piece) Protective Phone Case 100 system. This viewing angle offers further pictorial description of the Multi-Applications Platform 137 that is currently in a state of full Deployment 139 with respect to its dedicated custom designed containment bay(s) within strategically devised and located hardware storage module(s) within the top portion of the case. Storage modules for housing the MAP and other Proximate Hardware 114 payloads may be integrally provided upon and within either or both the Case Top Portion 101 and the Case Bottom Portion 102.

Also illustrated at either end of the case are some sensory strips in the form of a pair of Hand Contact Sensory Areas 197 that are included for detecting the relative positioning, or the lack thereof, of the phone user's hands upon the case/phone platform thereby creating a Hand Contact Sensing System 199 pertinent to defeating Texting and Driving. The conception and design for the hand contact areas and the detailed plan for preventing Distracted Driving due to Texting while Driving has previously been provided within Provisional Patent Application No. 61/929,161 filed on Jan. 20, 2014 and the PCT International Patent Application No. PCT/US 15/00012 filed on Jan. 20, 2015.

Viewing FIGS. 1, 2, and 3, the examples shown primarily center upon demonstrating the location and relative positioning of the hand contact sensory areas upon both ends of the case and how they each receive electrical interconnection with and between their respective upper and lower portions of the case. The case itself establishes full electrical interface and communication to and with the underlying phone as the case portions are centered and closed over the ends of the phone thereby enveloping it within a protective enclosure.

Located on the Back Side 104 and Top 129 surfaces of the Case Top Portion 101 is a Hand Contact Sensing System 199 comprised of a first Hand Contact Sensory Area 197 that has an integral Electrical Interface Terminal 198 that achieves continuity with the case electrical system via Electrical Conductor Lead 166. The opposing end of Conductor Lead 166 has direct connection with the resilient Flange Interface Conductors 160 integral to the Case Retentive Flange 159 or it may receive indirect offset connection to the retentive flange via side located Socket Interfaces 162.

Full case interconnection and continuity is subsequently established between the top and bottom portions of the case via the Case Retentive Slot 164 that houses a set of resilient Slot Interface Conductors 165 that receive and interface with the resilient Flange Interface Conductors 160 integral to the Case Retentive Flange 159. The Slot Interface Conductors 165 are further interconnected with a Texting and Driving related Proximate Hardware 114 package affixed upon an upper located computer Control Circuit Board 167 by an Electrical Conductor Lead/Ribbon 166 which are all mutually situated and housed within the Case Bottom Portion 102 as depicted in FIGS. 3A and 3B.

Also located at the opposing lower end of the case is a second "complementary" Hand Contact Sensory Area 197 situated upon the back side and end of the Case Bottom Portion 102. The lower Hand Contact Sensory Area 197 also has an integral Electrical Interface Terminal 198 that achieves continuity with the Texting and Driving related Proximate Hardware 114 package and the case electrical system via a similar Electrical Conductor Lead 166 that is interconnected to a lower located computer Control Circuit Board 167, Auxiliary Battery 157, and the remainder of the electrical hookups and interconnections within the case bottom portion as depicted in FIG. 1B.

Viewing FIG. 3A, since housing space within the Case Top Portion 101 is such a limited commodity, the Proximate Hardware 114 electrical package (computer circuit board and related hardware) required to run and operate the Hand Contact Sensing System 199 fundamental to preventing Texting and Driving is generally situated within the Case Bottom Portion 102 where it is housed within a Storage Module 115. In the example shown in FIG. 3A, the proximate hardware package that supports operation of the hand contact sensory system is depicted as being centrally located within the middle module of the three modules shown. The remaining two modules are available to house other proximate hardware packages that would provide operative support for other phone applications from the deployable MAP within the case top portion. For example, one module may hold the proximate hardware package pertinent to the gas analysis system while the remaining module may house the proximate hardware package required for the credit card reader.

The hardware package particular to the hand sensory system is generally comprised of transistors, resistors, and a battery source which are all interfaced in hard wired continuity with the Hand Contact Sensory Areas 197 situated upon each case portion and with the CPU circuitry of the phone and/or the case as collectively illustrated in FIGS. 1, 2, and 3 and more particularly depicted in the exemplary views shown specifically in FIGS. 1B and 3B.

At this point, it should be described and understood that upon the manufacturer completing the molding of the front and back pieces that together form a clam shell cavity for storing the auxiliary battery within the Case Bottom Portion 102 per the conventional techniques known to the art, all of the electrical hardware that is to be encased within the case bottom portion has to inserted before the alignment and snapping together of those two clam shell portions that will mutually combine to form Case Bottom Portion 102. A brief explanation will now be given for an exemplary assembly procedure for the case bottom portion.

A pair of female Socket Interface Connectors 162 is provided at opposing ends of the Conductor Ribbon 166. Attachment of the female socket connectors to their respective upper and lower circuit boards is made and the conductor ribbon and interconnected circuit boards are secured in place by fasteners inserted through unthreaded holes 235 on the respective circuit boards and tightened into threaded holes of the case. The circuit boards each carry preformed female multi-conductor interface ports that terminate flush with the exterior ends of the case whereby external access is provided to both of those ports. The preformed interface port located at the upper end of the case bottom portion is the Case Retentive Slot 164 interface while the interface port located at the lower end of the case bottom portion is the Case Charge Port 169 interface. Also positioned and connected to the circuit board of the case bottom portion is the Case Interface Plug 168 which is the male interface for connection to the encased phone 105.

The auxiliary battery is now inserted and interconnected with the positive and negative terminals provided on the lower circuit board. The two clam shell case halves may now be snapped together forming a completed Case Bottom Portion 102. The case now exists in a manufactured form that is ready to be sold to the phone owner and assembled over their phone as two independent interlocking case portions.

Viewing FIG. 1B, circuit boards for other proximate hardware packages may be added as needed from the Case Front Side 103 through removal of the Storage Module Lids 116. These storage module lids are provided flush with the Case Phone Bed 113 and may be selectively opened or removed to gain access the underlying storage modules 115 inclusive of the middle storage module where the circuit board carrying the hand sensory proximate hardware was previously installed. The middle Storage Module 115 is shown with its Storage Module Lid 116 as having been previously removed. The remaining two storage modules are shown in the drawings with their respective lids in place but are exemplarily depicted as being transparent.

Additional Hardware may be added internally onto the open half of the middle circuit board on the side opposite to the where the hand sensory proximate hardware was installed by use of an integral row of Socket interface Connectors 162. Also, the middle circuit board is provided with ends or wings that project laterally into both of the remaining storage modules. The lids to those two modules may be selectively opened whereby additional proximate hardware circuit boards having rows of Pin Interface Connectors 162 may be inserted within the storage modules where they are clipped into the mating row of Socket interface Connectors 162 integral to the middle circuit board. These new additive circuit boards may now be fastened to and enclosed within the case by insertion of screws within Unthreaded Holes 235 on the circuit boards which are then tightened and the module lids subsequently re-installed or closed.

It is requested to be understood that all of the male pin and female socket arrangements shown in the preferred embodiment have the same Reference Numeral (162) since their male/female orientations on their particular hardware components are not limiting factors and may be reversed without consequence. It is also requested to be understood that the proximate hardware circuitry examples depicted in the FIGS. 1B and 3B is provided only as non-limiting illustration of how hand sensor #1 and hand sensor #2 may be generally interfaced with a power source in the case and the CPU of the phone and/or a CPU of the case. Other componential electrical hardware, software, and electrical arrangements known to the art may be provided and utilized as alternative or replacement methods and systems for providing the desired proof and verification of a qualifying hand contact, phone orientation, and/or approved handling and placement of the phone by a user, and in particular, by the driver and/or any passengers mutually immersed and traveling within the same vehicle.

After assembly of the top and bottom portions of the case over the phone, both of the hand contact sensory areas are placed in full electrical communication with the T&D proximate hardware within the case and the electrical hardware within the enclosed phone. These hand contact sensory areas are provided as vital hardware components to enable the software programming to detect improper phone handling and orientation should it be attempted by a user that is also actively operating a vehicle and thereby block keystroke input while that carrier vehicle is sensed as being in motion. The phone and/or the case's computer processing capabilities are subsequently employed to run the T&D software and disable use of the phone in compliance with the restrictive plan for the T&D Application.

An abbreviated general description for how the T&D preventive technology works is that during the periods of time that the vehicle has been sensed and verified as being in motion at a pre-described rate of speed, all phone users that have phones equipped with the T&D preventive technology of the present invention and whom are mutually traveling within that same moving vehicle are required to be able to perform two physical actions simultaneously in order for the phone T&D software to permit the entry of keystrokes.

Firstly, each phone user must hold their phone in a mandated landscape orientation. Secondly, while retaining the phone in the prescribed landscape orientation, they must utilize, and thereby occupy, both of their hands in establishing and maintaining hand contact upon both of the hand sensory areas located at opposing ends of the phone in order to be allowed to enter keystrokes while under the restrictive auspices of the texting and driving preventive software. Should they fail to perform either of those physical actions concurrent with the detection of vehicle motion, a blocking action will be immediately issued that prevents further text entry.

Only the passengers will be able to meet these performance identifying challenges since a driver must also have a hand available to steer the vehicle. Should the driver attempt to place their phone either directly or indirectly upon the steering wheel in the attempt to type text concurrent with guiding the vehicle, vibration detection technology is provided that utilizes the phone's onboard accelerometer to immediately interrupt keystroke entry and place a blocking state upon the phone until the phone is removed from the steering wheel and the two physical conditions for phone use are once again fulfilled.

To further prevent any attempt to regain use of the driver's phone while the vehicle is in motion, the Texting and Driving software is additionally equipped with a programming provision that would immediately issue an umbrella command for enacting a continued blocking state upon the phone of the user should that user attempt to circumvent the T&D technology by disassembly and removal of the case portions from the phone. Any disassembly or breaking of the respective electrical conductor mated interfaces between the Case Retentive Flange 159 and the Case Retentive Slot 164 will trigger the enactment of an immediate blocking status for the phone.

Also, as depicted in FIG. 2, the Hand Contact Sensory Areas 197 may be independently furnished and directly disposed upon the phone in order to further provide, augment, and enforce the mandated consistent hand contact upon the sensory areas in order to operate the phone/case unit while the vehicle is in motion. The additional hand contact sensory areas furnished integral to the phone may be used either in collaboration with the case or independent to and totally without the case and the case's integral Hand Contact Sensing System 199.

Very importantly, the T&D preventive provisions offered in this phone/phone case arrangement requires absolutely no adaptation or additions to the vehicle itself and thereby may be utilized within any vehicular type, make, or model. The technology uniquely protects the public from any user that seats themselves behind the controls of any vehicular platform and begins to enter keystrokes while that vehicular platform is in motion. Importantly, there are no restrictions placed upon the phones while utilized outside of the vehicle.

The provision and use of this unique onboard phone technology can thereby prevent the profound societal problem of an operator of any vehicle from having their attention diverted away from proper observance of the roadway due to the commission of the potentially deadly act of Texting While Driving. An act that may prove lethal not only to themselves and their passengers but also to any and all persons, young or old, while traveling the roadways of the world.

Viewing FIGS. 1, 2, and 3, strategically located internal walls are provided, generally at least two, which define, separate, and distinguish the boundaries of and between the Gas Analysis Bay 118 and the Credit Card Reader Bay 123. One of these internal boundary walls forms one side of the Gas Analysis Bay 118 while the side of the protective phone case itself frames the remaining boundary of the gas analysis bay. The expanse of the Credit Card Reader Bay is formed between a second internal boundary wall in combination with the first boundary wall that is shared in common with the gas analysis bay. These two internal walls importantly act as Guiding Plane Walls 126 that serve to guide and restrict the movement of the deployable/retractable MAP substructure comprised of a Credit Card Reader Device 209. A Case Tunnel/Pathway 124 is created within that limits the travel of the deployable portion of Multi-Applications Platform 137 to being vertical and parallel to the long axis of the phone/phone case unitized assembly. Electrical interconnection is established for the deployable/retractable substructure of the MAP via a Credit Card Reader Interface Terminal 125 and corresponding Electrical Conductor Leads 166. These electrical leads are permitted to travel freely within a Guiding Plane Slot 127 integral to the Guiding Plane Wall 126 in tandem with user induced finger force upon a Thumb Pad Drive 134 that influences movement of the deployable/retractable card reader substructure of the MAP at the user's discretion. Travel of the Thumb Pad Drive 134 is dictated by the corresponding travel of generally Threaded Fasteners 135 within Guidance Tracks 136. The Threaded Fasteners 135 first pass through unthreaded holes integral to Thumb Pad Drive 134, through Guidance Tracks 136, through Card Reader Housing 146, through Card Reader Back Wall 141, and finally into a Threaded Hole 230 integral to Card Reader Front Wall 140 where they are fastened therein. The Guidance Tracks 136 in which the fasteners travel are cut into the Case Backside 104 and run parallel to the intended travel of the deployable MAP.

The Gas Analysis Housing 120 is the stationary substructure of the Multi-Applications Platform 137 and carries a Gas Analysis Sensor 119 within that acquires system electrical interconnection via a gas analysis housing Electrical Interface Terminal 122 and corresponding Electrical Conductor Leads 166. The duty of Gas Analysis Sensor 119 is to be an inline filter to examine and analyze the passing flow of air/gas that is being introduced into the deployed MAP in accordance with its programmed objectives before that air/gas exits laterally out of the Gas Analysis Bay 118 via a multi-hole Air Vent Cluster 130 integral to Case Top Portion 101. The gas sensory device may comprise either a resistor stick design or a more sophisticated fuel cell design that produces more reliable and accurate analysis results or any other gas sensor technology that would benefit from having inline protected positioning with the gas analysis flow stream while remaining strategically, efficiently, and handily stationed within the top portion of the case/phone unit.

Turning to FIGS. 4A-4D, a top/end perspective view of the Case Top Portion 101 of Protective Phone Case 100 is shown where a step by step progression is depicted for the entirety of the Multi-Applications Platform 137 deployment/retraction cycle. Positioning of the MAP is elected at the discretion of the phone user through the application of hand force upon a Thumb Pad Drive 134 by the user's thumb or fingers in order to induce movement of the Multi-Applications Platform 137 within and from its dedicated storage inside of Credit Card Reader Bay 123.

In FIG. 4A the MAP lies stored in a non-viewable Retracted 138 position at the bottom end of Case Tunnel 124 within Credit Card Reader Bay 123.

In FIG. 4B the user is able to selectively apply finger pressure upon the Thumb Pad Drive 134 and initiate closely guided upwards movement of the MAP specific to the internal surfaces of the walls that comprise Case Guidance Tunnel 124. The top of the MAP immediately contacts the underside of a Case Lid 132 that covers a Case Hatch 131 where it incrementally pushes the lid open as the lid rotates about its integral Lid Hinge 133. The top of the MAP, inclusive of its integral Credit Card Reader Housing 146 and Credit Card Reader Walls 140 and 141, are now just becoming visible through the top of the open Case Hatch 131.

In FIG. 4C, sustained upward finger pressure by the user continues to drive the MAP vertically as it climbs out of Credit Card Reader Bay 123 through Case Hatch 131 until reaching a fully Deployed 139 MAP position above the Top 129 surface of Case Top Portion 101.

FIG. 4D shows the MAP coming full circle whereby the cycle has been completed and the MAP has been fully retracted back through the Case Hatch 131 and into Case Tunnel 124 of Credit Card Reader Bay 123. The Case Lid 132 is subsequently closed by the user's hand thereby sealing the top of Case Hatch 131. FIG. 4D features the identical stored reiteration of FIG. 4A where, once again, the MAP becomes newly prepped whereby it remains ready to repeat the deployment/retraction cycle.

Viewing FIGS. 5A-5C, detail is shown for the components that comprise the substructure that is the deployable portion of the Multi-Applications Platform 137. FIG. 5A shows plan views of the substructure if viewed from the rear or the Case Back Side 104 for a partially exploded side view that is centered in the middle of the drawing. Also shown are a corresponding top view, a bottom view, and both end views. FIG. 5B is a Case Front Side 103 exploded view where the MAP components have been flipped opposite to that of the Case Back Side 104 exploded view in the center of FIG. 5A. FIG. 5C is an enlarged End View 109 of the deployable MAP substructure that, with its greater amount of component detail, will be discussed first.

Specifically looking at FIG. 5C, shown are two MAP walls, a first Front Wall 140 that is located adjacent to the Case Front Side 103 and a second Back Wall 141 that is located adjacent to the Case Back Side 104. These two walls are positioned parallel to one another with a spatial gap between them that is generally conducive for the insertion or sliding of a conventional credit card between their mutually aligned surfaces. A Credit Card Reader Housing 146 is provided to store and position the electrical hardware and related structures that support the reading and taking of data from an inserted or swiped Credit Card. The Credit Card Reader Housing 146 also has a Credit Card Reader Head 147 that is designed with resilient suspension of said head to said housing. Back Wall 141 has an Alignment Hole 149 whereby Credit Card Reader Head 147 can be inserted there through the Back Wall 141 where it will contact any inserted or swiped credit card and be slightly displaced by that credit card due to its resilient suspension within said hole.

Still looking at FIG. 5C, specific sidewall identities are respectively given for Walls 140 and 141 that will be useful in understanding forthcoming description of MAP form and function. Specific to Front Wall 140 nearest the Case Front Side 103 is Sidewall 142 which is the surface of the card reader that faces outward toward the front of the case where the phone lies in protective encasement. Directly opposing is Sidewall 143 that faces the interior of the card reader. Specific to Back Wall 141 that is nearest to the Case Backside 104 is Sidewall 144 that faces inward to the center of the card reader. Directly opposing is Sidewall 145 that faces outward toward the Case Backside 104. Sidewall 145 also faces and butts up against Card Reader Housing 146.

Now viewing FIGS. 5A-5C, special Wall Shaping 150 that is integral to Sidewall 143 of Front Wall 140 is illustrated where upon full assembly, said shaping forms and defines the spatial gap between Front Wall 140 and Back Wall 141 as well as determining the boundaries of an air flow track that laterally exits the card reader via Gas Passageway 148 of the MAP card reader substructure. The air flow pathway formed within the deployable MAP card reader substructure aligns and cooperates with the stationary MAP gas analysis substructure for monitoring and analyzing the content of the passing flow of gas. How this relationship works between the two MAP substructures that together provide not only a credit card reader but also form and provide specific bi-directional air flow passageways with varied air flow functions, will all be further described and explained in forthcoming detail.

It should also be noted at this point that special Wall Shaping 150 may be, alternatively, integrally located upon Sidewall 144 of Back Wall 141 and still provide the inter-wall spacing and air flow guidance characteristics desired. However the preferred embodiment is as depicted in the drawings.

Also shown in FIGS. 5A-5C, is an MAP component called a Sliding Gas Retention Wall 151 that has an integral Orifice for Gas Passage 154. Two identical Sliding Gas Retention Walls 151 are provided and inserted vertically within Apertures 153 near the ends of the assembled MAP that lead to longitudinal Tracks 152 generally running the height of the MAP. The shape of the gas retention sidewalls are similar to the cross section of the apertures where half of each track lies upon the respective inward facing sidewalls of the MAP. Sidewall 143 of Front Wall 140 carries a portion of said track and Sidewall 144 of Back Wall 141 carries the remaining portion that, upon full componential assembly of the MAP, butt up to special Wall Shaping 150 and form Tracks 152. The wall shaping also importantly provides the spacing between Front Wall 140 and Back Wall 141 that is consistent with proper credit card insertion and reading. Tracks 152 also bisect Wall Shaping 150 of Sidewall 143 as illustrated in the exploded view at the center of FIG. 5A. The purpose of providing the Sliding Gas Retention Sidewalls 151 relates to the following.

It was earlier said there are two main computer driven functions that will be executed from a deployed MAP. Both a Credit Card Reader 209 device and a personal Blow Gas Analysis 201 device are made available for instantaneous use by the phone owner. The Gas Retention Sidewall 151 is provided for reasons that are more in line with improving function between cross uses of the MAP rather than being an outright necessity for the two dissimilar functions to be workable. In order for a credit card to be swiped or vertically inserted (dipped) within the top of the deployed MAP, the gap between the two walls comprising the MAP must be open for the credit card to reach the Credit Card Reading Head 147. The existence of a totally open gap along the sides of the deployed MAP runs contrary to easily achieving a complete seal by the mouth and the lips of the user over the top of the MAP during the process of blowing a gas sample. Therefore the purpose of the Sliding Gas Retention Sidewall 151, from this point forward to be synonymously called the SGRS or SGRS 151, is to block the interior gap between Walls 140 and 141 and make it easier to achieve a full seal of the lips over the deployed MAP. When the SGRS is in its raised position, its integral Orifice for Gas Passage 154 is in an aligned position with the Gas Passageway 148 formed within the MAP. The user's lips may be placed over the top of the MAP and a breath sample dispelled down through the MAP that currently has sealed sides due to the presence of the raised SGRS. The breath sample continues downward where it is deflected laterally by Wall Shaping 150 and exits the MAP through the mutual alignment of the SGRS Orifice 154 with the MAP Gas Passageway 148 thereby together creating an Open Gas Passageway 155. After exiting the MAP the breath sample continues its lateral flow across an in line Gas Analysis Sensor 119 and exits the Case Top Portion 101 via Air Vent Cluster 130.

The following provides simple description and reasoning for the inclusion of the SGRS pair and their related function:
By including the SGRS, a 360 degree MAP mouthpiece is formed for blowing a gas sample
Without the presence of the SGRS, the MAP mouthpiece is open on both sides to accommodate cross functionality in also serving as a credit card reader.
Inclusion of the SGRS pair enables a best practice scenario for both of those functions to operate.

Without the SGRS, the user would have to be more diligent in sealing their lips around the MAP all the way down to the top of the phone case. Otherwise, some of the blown gas sample might be leaked and lost. Use of the SGRS is the best of both worlds since it provides optimum functionality for both MAP features. With that said, it should be understood that use of the SGRS is really not a necessity to ensure that there is no leakage as there will be more than an adequate volume of the blown air sample that will still reach and cross the gas sensor in order to render an accurate analysis reading. It is only through the desire to produce the best device possible that the SGRS is included. Since both the SGRS component cost and additional MAP construction cost are highly negligible, its addition is a sensible option especially since it automatically functions and positions itself in tandem with the deployment and retraction of the MAP respectively from and within the top of the case and therefore has no operational learning curve. Another effective sealing option, which has the additional benefit of rendering an improvement in sanitary usage, is the inclusion of a disposable cover and mouthpiece for direct application over the MAP. This option is shown as an additional embodiment of the invention that will be covered forthcoming.

Description will now be given for the automatic positioning of the SGRS 151 in tandem with analogous cross usage of the MAP/CMAP between a gas analyzer and a credit card reader. When the MAP is first deployed it is automatically set to be used in the gas analysis mode. The Sliding Gas Retention Sidewall 151 is in a raised "gas leakage prevention" position whereby it blocks the interior spatial gap between Walls 140 and 141 and thereby facilitates the achievement of a seal of the user's lips over and around the MAP. In order to permit a credit card to be swiped sideways in parallel with the top of the case, the spatial gap between the Map walls has to be restored by the lowering of the SGRS that had been blocking that gap.

FIGS. 6A-11A, 6B-11B, and 6C-11C demonstrate in detail the stages and automatic transformations that occur when a user elects to choose between the preferred embodiments for using the structure as either a gaseous analyzer/sampler or a credit card data reader. FIGS. 6B-11B relate plan views from the backside of the case while FIGS. 6A-11A and 6C-11C respectively relate both of the associated end views. In particular, the figures depict and relate the automatic positioning of the SGRS in tandem with cross usage of the MAP. All of the drawing figures are purposefully abbreviated in structural detail in order to show only the components necessary to understand each of the step by step stages. The figures depicted in each stage are meant to convey the current positioning of the SGRS 151 within the MAP 137 relative to the Top 129 of the case top and the Top End Wall 163 of the case bottom portion. In order to conserve space the Top End Wall 163 of the case bottom is not included in all of the figures even though it is present in actuality. Supporting detail for any components that are described but not included in the abbreviated drawings can be found in FIG. 3A, FIG. 4, and FIG. 5.

Looking first at FIGS. 6A-6C, all three figures show an MAP that currently occupies a Retracted 138 position beneath the Top 129 of the case. Directional Arrows 110 indicate the upwards movement of the MAP that is about to be initiated and powered by the force of the user's thumb upon the thumb pad drive. The SGRS 151 is currently situated in a raised position within its Tracks 152 where the bottom end of SGRS 151 is flush with the bottom of the Retracted MAP 138.

FIGS. 7A-7C show user effected incremental upward movement of the MAP that pushes open the Case Lid 132 that is integral to Top 129. Just becoming viewable from the top of the case are the tops of the two card reader walls, a Card Reader Front Wall 140 and a Card Reader Back Wall 141.

FIGS. 8A-8C show user forced vertical movement as having been completed resulting in a fully Deployed MAP 139 above the Top 129 of the case top portion.

FIG. 8C shows the top of SGRS 151 blocking the gap between the two walls of the MAP that comprise the card reader while the Orifice 154 integral to the SGRS is reliably aligned with the Gas Passageway 148 of the MAP Card Reader thereby creating an Open 155 Gas Passageway for the user to blow a gas sample. Up to this point, the stages undergone have accomplished deployment of the MAP in tandem with the accompanying SGRS set that have been pre-positioned to block the sides of the card reader and thereby enable the user to employ the MAP as a gas analyzer. All that remains in order to take a gas sample is to initiate the corresponding software support programming and then place the user's lips over the MAP and "blow" a gas sample for analysis. Upon completion of the sampling the user would then retract the MAP and close the lid and the MAP would be prepped for the next call for usage at the discretion of the phone user. The additional stages represented by FIGS. 9A-9C, 10A-10C, and 11A-11C would not be needed for gas analysis usage.

However if the reading of a Credit Card is the desired application for use of the MAP then the stages just discussed and represented by FIGS. 6A-6C, 7A-7C, and 8A-8C would be exactly the same and the user would then proceed from that point in pursuing use of the credit card reader. Since a credit card cannot currently be swiped or inserted within the MAP since the sides of the card reader are currently blocked by the SGRS set then the SGRS set must be removed, or better said, lowered out of the way from interfering with the Credit Card reading option of this invention. At that point, the corresponding credit reading software program could be initialized and the card reading option continued per the following.

FIG. 9B shows either a Horizontal Oriented 179 or a Vertically Oriented 181 Credit Card as having been aligned and prepped for being hand guided by the user in a downward direction corresponding to Directional Arrow 110. The bottom of the credit card will first make downward displacing contact with the tops of the SGRS 151 set that are each disposed within their own Track 152 of the MAP. The credit card will be pushed further downward until the credit card bottoms makes flush contact with the Top 129 of the case as shown in FIG. 10B. FIGS. 9A and 9C and FIGS. 10A and 10C represent the corresponding end views and results from credit card movement within the MAP but for reasons of limited space and better clarity within the drawings, do not depict the two orientations of the credit cards shown in FIGS. 9B and 10B.

FIG. 10B shows the purposed downward credit card movement has displaced the tops of both of the SGRS downward to a point of being flush with the case Top 129 in concert with the bottom of the credit card itself. If the horizontal oriented card has been utilized, then the Magnetic Stripe 180 is ready to be swiped laterally for reading and removal. If the Vertically Oriented Credit Card 181 has been used, then its integral EMV Chip 182 is already behind the card reader head and needs to remain there until the transaction has been completed whereby the card can be removed. At the point of the desired credit card transaction(s) being completed, it is time to once again retract the MAP. Before that retraction is executed it is important to visualize the current position of the bottom ends of the SGRS set and their integral Orifices 154 as having changed positions and now being extended below the MAP.

FIGS. 11A-11C show the Top End Wall 163 of the case bottom portion and the directional Arrow 110 that is indicative of the MAP travel that will occur as the both the MAP and the extended SGRS set within the MAP, will together be driven downward toward and against Top End Wall 163 in concert with the user applying downward force on the thumb pad drive in order to retract the MAP into storage. This action will not only retract the MAP back into storage within its containment bay of the case top portion but it will also importantly result in the SGRS set reverting back to their original raised position within the MAP earlier depicted in FIGS. 6A-6C, as the MAP is lowered onto the SGRS set while they are being restrained from further downward movement by contact with the surface of the Top End Wall 163.

At this point all that remains to complete the cycle is for the user to flip the lid closed as all components have come full circle in returning the stored MAP and related components to the same initial stored position they originally occupied at the start of the cycle. Also, it should be noted and better explained that there are no gas passageways in any of the end views depicted in FIGS. 6A-11A due to Wall Shaping 150 always blocking that side of the MAP. Gas passageways are only formed by the wall shaping on the end views of the MAP that are depicted in FIGS. 6C-11C. It should also be further understood that in FIGS. 10C and 11C, since Orifice 154 of SGRS 151 is now extended below the MAP and is currently in misalignment with Gas Passageway 148, that correspondingly the opposing top end of the SGRS is now covering the passageway and thereby Blocking 156 the Gas Passageway 148 of MAP 137. There are no ill consequences to this misalignment and blocking of the passageway since the MAP is being currently utilized as a card reader and the status of the gas passageway as being open or closed has no bearing on the card reading operation. Should the gas analysis option be desired once again, then the MAP is simply retracted and redeployed thereby resetting alignment of the orifice with the gas passageway and allowing effective bi-directional passage of gas from MAP 137.

FIGS. 12A-12C demonstrate a specific configuration, construction, and wall shaping integral to a key wall component (Wall 143) of the MAP substructure in order to provide the best mode of operation for using that particular substructure as either a credit card reader (FIG. 12A), a gas analyzer (FIG. 12B), or both (FIG. 12C). The design in FIG. 12C is the recommended, the best, and thereby, the preferred embodiment of this invention due to its cross usage compatibility between the card reader and gas analyzer options of MAP usage. The depictions offered in FIGS. 12A and 12B are mainly for comparative purposes to further demonstrate the differences, significance, and advantages of the SGRS design shown in FIG. 12C.

FIG. 12A shows Wall Shaping 150 upon Sidewall 143 of Front Wall 140 specific to a credit card reader whereby there is no gas passageway provided at the bottom of the MAP and no SGRS. Upon assembly of the two walls comprising the MAP, the integral wall shaping shown in this arrangement enables the gap between the two walls that comprise the MAP card reader to remain fixed in an open position on both sides of a fully deployed MAP thereby facilitating unimpeded swiping or insertion of a credit card within the MAP.

FIG. 12B shows a Wall Shaping 150 upon Sidewall 143 of Front Wall 140 specific to a gaseous analyzer/sampler that entails shaping forming a Gas Passageway 148 at the bottom. The wall shaping is taller but still of equal height on both sides of the MAP thereby negating the need for a SGRS. Upon assembly of the two walls comprising the MAP, both sides of the deployed portion of the MAP are effectively blocked thereby forming a mouthpiece whereby the lips can easily form a circumferential seal around the mouthpiece where there is very little leakage during the user's attempt to "Blow" an air sample.

FIG. 12C shows the preferred embodiment that follows the intended design for using the structure as a multi-function device capable of performing both credit card reading and gas analysis and other varied functions from the same basic structure. This multi-purpose design employs both a Gas Passageway 148 and an automatic slidable sidewall provision, the SGRS 151, which was just detailed in FIGS. 5A-5C and FIGS. 6A-C through 11A-C. The wall shaping and overall design offered in FIG. 12C is preferred for the universal operation of the many varied functions featured and offered by this invention.

It should also be noted in the universal application provided in FIG. 12C, that the very upper portions or apexes of Wall Shaping 150 that will come in contact with a credit card as it is being swiped or inserted within the reader, are rounded, are at least three in number, and are parallel to each other. This rounded, close, and aligned special shaping is designed to facilitate seamless lateral swiping of the radiused leading corner of the credit card through the reader in the smoothest manner possible without the card hanging up no matter the angle of card tilt or the point of entry that is randomly elected by the user. It should also be recognized that the rounded apexes of the wall shaping are not only parallel to each other but are also in alignment and parallel to the top surface of the phone itself as best depicted in FIG. 10B when the Deployed MAP 139 is occupying its fully extended position. All of these factors are important to ensuring a smooth, precise, consistent, and unobstructed swipe or depth of card insertion within the reader. It will also produce the most reliable and accurate readings and data exchanges while relaying to the user, a highly positive tactile feel that instills confidence in having achieved a successful reading of the card with one single swipe for each instance of card usage.

FIGS. 13A-13D represent plan views for a disposable mouthpiece that is used to fit over the top of a fully Deployed Multi-Applications Platform 139. Its purpose is for maintaining sanitary conditions between multiple users of the same MAP while analyzing personal breath samples of differing individuals. Air flow through the disposable mouthpiece can also be conducted in a bi-directional manner for either blowing or pulling a gaseous sample.

Figure 13A:
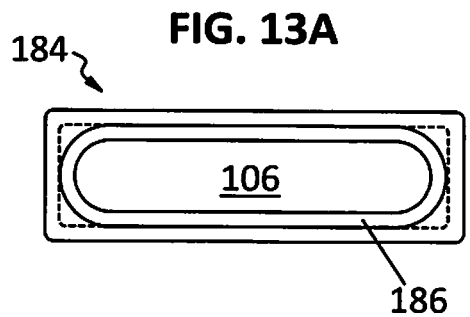
Figure 13B:
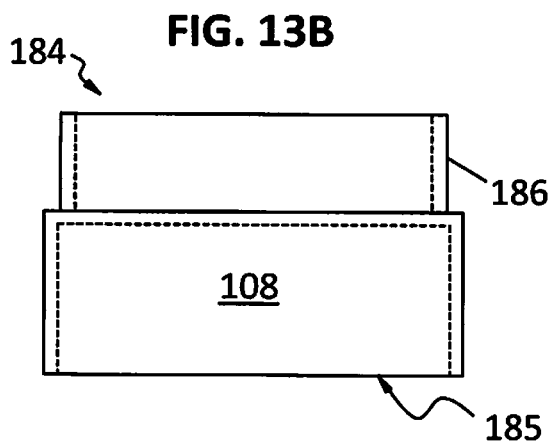
Figure 13C:
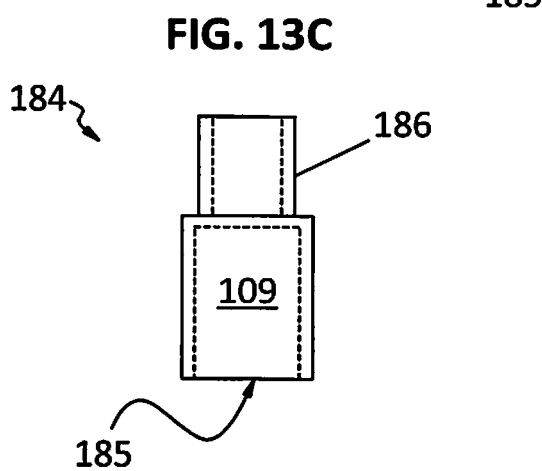
Figure 13D:
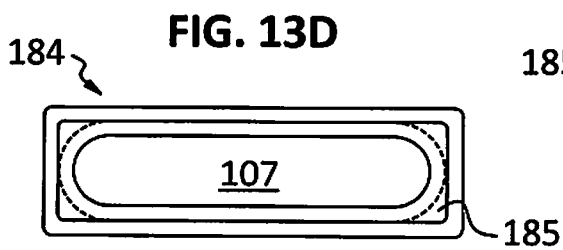

FIG. 13A shows a Top View 106 of a Mouthpiece Portion 186 of a Disposable Mouthpiece Cover 184. FIGS. 13B-13D respectively show a Side View 108, an End View 109, and a Bottom View 107 of the same related structures described in FIG. 13A inclusive of a Hollow Base 185.

FIGS. 14A-14D show another set of plan views that relate to an alternate design for a structure cover that is also to be used to fit over the top of a fully Deployed Multi-Applications Platform 139. This structure cover is used for applications that tend to be more commercial in nature. The multi-use cover is designed with an enclosed top and an integral port for the attachment of test tubing that can substantially extend the mobility and range for remote pulling of air test samples while also improving the positional comfort of the person conducting the testing. Inducement of air flow through the structure cover can also be conducted in a bi-directional manner for either blowing or pulling a gaseous sample.

Figure 14A:
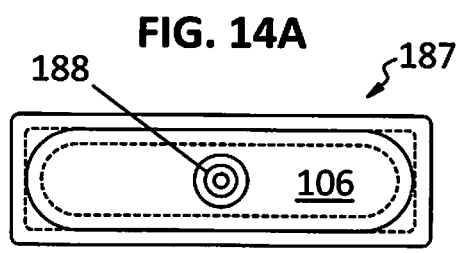

FIG. 14A shows a Top View 106 of a Multi-Use Gaseous Funnel 187 having a Tubing Attachment Nipple 188.

Figure 14B:
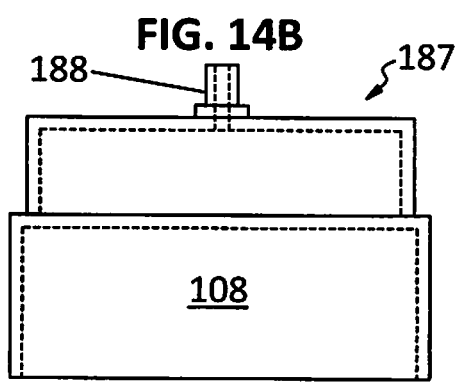
Figure 14C:
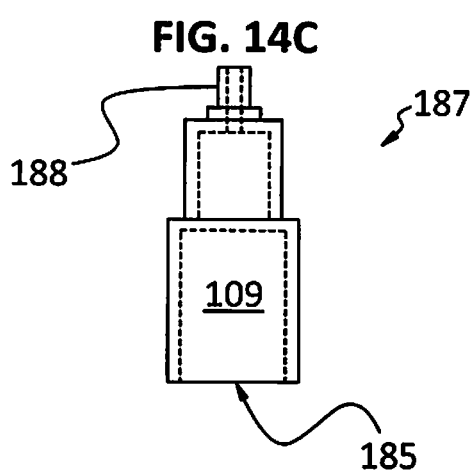
Figure 14D:
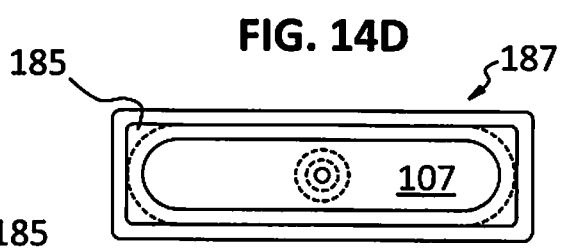

FIGS. 14B-14D respectively show a Side View 108, an End View 109, and a Bottom View 107 of the same related structures described in FIG. 14A inclusive of a Hollow Base 185.

FIGS. 15A-E give visual description of the corresponding fit and sealing capability of the Disposable Mouthpiece 184, and/or the Multi-Use Gaseous Funnel 187 although not specifically depicted, for blowing and/or pulling a gaseous sample. The mouthpieces shown in FIGS. 15B and 15D have a transparent sidewall while those depicted in FIGS. 15C and 15E are opaque. The disposable mouthpiece is initially aligned in FIG. 15A and progressively lowered in FIGS. 15B and 15C over both the fully deployed Multi-Applications Platform 137 and the open Case Lid 132.

The opaque versions shown in FIGS. 15D and 15E better illustrate how the mouthpiece or funnel reach a final vertical stop and seal against the Top of the Case 129 and thereby create the desired in/out pathways that the bi-directional flow of gases must follow in passing in either direction through the unitized mouthpiece cover over and through the Multi-Applications Platform 137.

FIGS. 15D and 15E also illustrate a single directional flow of gas through the MAP/Cover combination where said gas flow exits laterally through Gas Passageway 148 indicated by the Directional Arrow 110. However it is to be understood that a reverse flow through the system where air/gas enters Gas Passageway 148 is in agreement with the planned objectives of this invention.

FIG. 15A additionally shows the previously described Sliding Gas Retentive Sidewall 151 and its integral Orifice 154 that currently is in alignment with Gas Passageway 148 producing an Open Gas Passageway 155.

Looking at FIGS. 16A and 16B, illustration is made for a Case Top Portion 101 having a storage module(s) that contain customized containment bays that will provide housing for the specialized proximate hardware of this invention. Also included as an integral part of the case top portion is a retentive flange that, unique to this invention, is importantly outfitted with a multi-number set of resilient conductors. Upon alignment and insertion within its counterpart, a receiving slot integral to the case bottom portion, the retentive flange pulls vital double duty. Firstly, it binds the upper and lower case portions together in a retentive fashion whereby the physical bodily connection between the top and bottom portions of the case around the encased phone, is reliably maintained. Secondly, the retentive flange importantly serves as the electrical union between the upper and lower case portions whereby it establishes full electrical continuity and communication between both the top and the bottom portions of the protective phone case, the proximate hardware loads that each of those case portions carries, the phone the protective case encloses, and the respective batteries of both the protective case and the enclosed phone.

FIG. 16A is a perspective view of the new form and design given to the previously wasted space within the conventional top portion of a two piece case. A Storage Module 115 is created within the Case Top Portion 101 that is further subdivided into a Gas Analysis Bay 118 and a Card Reader Bay 123. Both of these bays are shown as being currently vacant previous to their being loaded with their respective proximate hardware payloads in order to better visualize the internal storage space within the Case Top Portion 101. A Case Retentive Flange 159 carrying a resilient set of aligned electrical conductors is also depicted.

FIG. 16B is a highly significant drawing since it shows and provides a transparent "for explanatory reasons only" Case Phone Bed 113 that allows unobstructed viewing of the compartmental modular design and configuration below of the currently Vacant Containment Bays 191 within the Top Portion 101 of the case. In actuality, Case Phone Bed 113 is not transparent and normally serves as a flat insertion guide and receiving bed where the phone would normally lie upon inside the assembled case/phone union.

There are generally at least two Guiding Plane Walls 126 provided within case Storage Module 115 of Case Top Portion 101. The Gas Analysis Bay 118 and the Card Reader Bay 123 are separated by one Guiding Plane Wall 126 that has an integral Guiding Plane Slot 127 that importantly permits any gas flow exiting laterally out of the deployed MAP to leave the Card Reader Bay 123 and crossover through the slot and reach the Gas Analysis Bay 118 whereby analysis of the passing gas is conducted. The remaining Guiding Plane Wall 126 forms the other boundary wall for the Card Reader Bay 123 that also has a Guiding Plane Slot 127 that acts as a protective channel for the corresponding movement within the slot of a conductor lead that is directly connected to the deployable/retractable MAP and thereby must have free movement to follow the bi-directional travel of the MAP.

Due to the transparency shown in FIG. 16B for the Case Phone Bed 113 shown in FIG. 16A, the underlying Case Lid 132 disposed within Case Hatch 131 along with Case Guidance Tunnel 124, Air Vent Cluster 130, and the Hand Contact Strip Interface Terminal 198, are all visible within the internal confines of case Storage Module 115.

Before leaving FIG. 16, it should be noted that for reasons of conservation of space within case Storage Module 115, that the Guiding Plane Wall 126 that is described for the physical separation of the Gas Analysis Bay 118 from the Credit Card Reader Bay 123, may be omitted whereby the travel of the card reader and the other related components comprising the deployable MAP 137, aka the deployable substructure of the MAP, would directly slide and seal against the side of the adjacent Gas Analyzer Housing 120, aka the stationary substructure of the MAP.

FIGS. 17A-17C show the progressive filling of the available bays within Case Top Portion 101 with unique electrical hardware components. These "supplemental to the phone" hardware components are identified by this invention as Proximate Hardware 114. Insertion and installation of the proximate hardware is inclusive of the establishment of their respective electrical connections as well as providing support and/or being a portion of the componential formation of the Multi-Applications Platform(s) 137.

FIG. 17A shows the stationary substructure that comprises Multi-Applications Platform 137 as having been installed. The non-moving portion of the MAP is inclusive of Gas Analyzer Housing 120 and its integral Gas Analysis Sensor 119 that are synchronously inserted within the Gas Analysis Bay 118 adjacent to the Air Vent Cluster 130 thereby resulting in a Filled Gas Analysis Bay 192 that forms an Airtight Plug 121 that seals the end of Gas Analysis Bay 118. Also importantly included is the Case Retentive Flange 159 bearing a complement of resilient Flange Interface Conductors 160 which will mate with corresponding conductors of the case bottom portion.

FIG. 17B shows the credit card reader substructure that comprises the deployable/retractable portion of the Multi-Applications Platform 137 after its placement within its assigned Credit Card Reader Bay 123 in a relative positioning reflecting a Retracted Multi-Applications Platform 138 that lies adjacent to the Gas Analysis Bay 118 resulting in a Filled Card Reader Bay 193. The credit card reader is primarily comprised of a Credit Card Reader Housing 146 and a Card Reader Front Wall 140 and a Card Reader Back Wall 141. Although still unwired, both containment bays have now been filled with their respective Proximate Hardware 114 substructures that together comprise Multi-Applications Platform 137.

It should also be noted that although the proximate hardware comprising the Hand Contact Areas 197 that were previously detailed in FIG. 3 do not have a containment bay to fill, they are disposed on and over the back and end exterior surfaces of the case top and bottom portions. Thereby, the displayed package of interface terminals for the various Proximate Hardware 114 options of this invention is also inclusive of an interior located electrical Interface Terminal 198 for the exterior located sensory Hand Contact Areas 197.

Also shown is a pre-wired electrical Interface Block 161 that is provided in the drawings as an "exemplary only" structure that is shown to snap on or otherwise plug into the electrical interface assembly borne by and integral to Case Retentive Flange 159. It is recalled that the retentive flange is a double duty structure that locks the upper and lower portions of the case together in combination with acting as a platform that bears a resilient set of Flange Interface Conductors 160 that plug into a complementary socket provided in aligned fashion upon the Top End Wall 163 of the Case Bottom Portion 102. The pre-wired electrical Interface Block 161 is shown in a pre-installed raised position that provides illustrative emphasis on where the three separate Electrical Conductor Leads 166 emanating from the interface block will interconnect with the interface terminals respective to three of the Proximate Hardware 114 options described in this invention.

Electrical Interconnection will be made for a Gas Analysis Device Arrangement 201, a Credit Card Reader Device Arrangement 209, and a Hand Contact Sensory Device Arrangement 199 that will all receive further description in forthcoming detail. As the interface block is lowered in a direction corresponding to Directional Arrow 110 it is plugged into the Case Retentive Flange 159. The pre-wired electrical conductors running from the interface block are individually plugged into their respective Interface Terminals 122, 125, and 198, whereby full electrical interconnection will be established between all of the Proximate Hardware 114 located on or with the Case Top Portion 101 to and with the Flange Interface Conductors 160 integral to the Case Retentive Flange 159.

FIG. 17C shows the fully filled bays of the Case Top Portion 101 and the conductor leads running from the "example only" electrical Interface Block 161 having been each established to their respective terminals of their corresponding individual hardware pieces resulting in Bays Filled and Wired 194. The Interface Block with Wire Leads 161 carries a grouping of electrical Interface Conductors 160 that mate with complementary electrical Flange Interface Conductors 160 mounted upon the Case Retentive Flange 159 or alternatively with Side Interface Ports 162. As previously stated, the interface Block provided in FIGS. 17B and 17C is only included for the sake of clearly visualizing the component connections rather than real world usage. Solid state circuitry known to the art would generally replace use of a secondary connection block.

Upon completing full assembly of the upper and lower portions of the case to each other and around the phone, points of electrical interface in the form of Slot Interface Conductors 165 integral to Case Retentive Slot 164 are provided upon the case bottom portion that will mate with the just described interface conductors of the case top portion. Universal electrical circuit continuity will be instantaneously established for and with the entire package of electrical proximate hardware components within the top portion of the case to and with the case bottom portion of the case, any proximate hardware or other electrical circuitry the bottom portion might carry, the case's battery, the phone, and the phone's battery upon completing full assembly of the two case portions to one another thereby encasing the mobile phone.

FIGS. 18A and 18B show full case representations where the top and bottom case portions are in end to end alignment but are not currently in a fully assembled state where they totally butt up in a closed position relative to one another which would thereby establish electrical continuity between each case portion and the respective Proximate Hardware loads they each bear.

FIG. 18A shows a perspective bottom view of the Vacant Containment Bays 191 within the Top Case Portion 101 that is similar to that depicted in FIG. 16A. Also depicted within the middle module of the case bottom portion is an upper Control Circuit Board 167 that bears circuitry for running the hand contact areas, bears the case retentive slot, and interconnects with the Electrical Conductor Ribbon 166 that runs the length of the bottom portion of the case where it interfaces with a lower Control Circuit Board 167.

FIG. 18B illustrates a fully prepped protective phone case that is representative of the preferred embodiment of the current invention where the bays of the top and bottom case portions have been loaded with Proximate Hardware 114 and their electrical connections independently established similar to that depicted in FIG. 17C with the exception that the exemplary interface block has been omitted per the preferred embodiment for utilizing solid state circuitry.

All that remains to complete full assembly of the case/phone unit is to insert the mobile phone within the bottom case portion and slide the remaining top case portion over the top end of the phone until the ends of the two case portions abut whereby the retention flange carrying the electrical connections for the case top portion simultaneously engages and locks within its mating electrical counterpart on the bottom case portion in the form of the case retentive slot. The retained/locked disposition between the top and bottom case portions is positionally maintained by the retentive lip(s) integral to Case Retentive Flange 159 of the case top portion being received and mating within cooperative retentive undercuts integral to the Case Retentive Slot 164 on the case bottom portion.

It should also be understood that the retentive system just described for a male projection integral to the case top portion and a female receiving slot integral to the case bottom portion could be reversed whereby a female top case element could receive a male bottom case element if advantages in case overall design and operation are garnered.

At this point the electrical connections for the entire package of Proximate Hardware 114 that the top and bottom case portions now collectively house within their customized bays of their respective storage modules, will all be instantly made and maintained between each other and with the newly encased phone. Further guarantee of the maintenance of that closed and abutted positioning between the upper and lower portions of the case can be further supported through inclusion of a manually releasable locking feature of a design common to the art that is provided either independent of or preferably upon and/or integral to the Case Retentive Flange 159/Case Retentive Slot 164 interrelationship.

FIG. 19 shows the preferred embodiment design for the Case Top Portion 101 with a new and preferred relocation of the Case Retentive Flange 159 from its position in the previous drawings where it was situated in the middle of the Case Top Portion 101. The reasoning behind the change in physical position is to acquire additional valuable space within the Credit Card Reader Bay 123 to accommodate a Full Bay Width Card Reader Housing 210. The Case Retentive Flange 159 is a male projection that pulls double duty in serving as the alignment, closure, and retention mechanism for maintaining the top case portion in a closed position relative to the bottom case portion while they mutually encase the phone. In this invention, the retentive flange also serves as a platform that integrally carries a set of electrical Flange Interface Conductors 160 that mate within a female receiving set of conductors on the case bottom portion.

The retention flange is strategically moved from a midline location on the Bottom End Wall 158 of Case Top Portion 101 to a location in front of the convex Camera Apron 177 along and upon that same Bottom End Wall 158. The camera apron is the opposing inner side of the camera concavity situated on the backside of the case that surrounds the Case Camera Cutout 176 of Case Top Portion 101. This new location removes both the Retentive Flange 159 and the convex Camera Apron 177 as obstructions within the Credit Card Reader Bay 123 that houses the deployable/retractable card reader substructure of Multi-Applications Platform 137. The additional space attained now forms a full bay width rectangular space within Credit Card Reader Bay 123 that advantageously permits a Full Bay Width Card Reader Housing 210 for the Multi-Applications Platform 137.

In order to provide additional insertion guides and extra retentive capability to counter the new highly offset location of the retentive flange, two Auxiliary Retentive Posts 196 are provided that are integral T-shaped cantilevered portions parallel to the ends of the two Guiding Plane Walls 126 and their individual intersection with the Bottom End Wall 158 of the Case Top Portion 101. The terminal ends of Guiding Plane Walls 126 and the Bottom End Wall 158 of the top portion of the case combine to outline the opening that forms the entrance for the insertion of the Full Width Card Reader 210 of the Credit Card Reader System 209 of the deployable substructure of MAP 137 within Card Reader Bay 123.

The posts are additionally equipped with Wire Notches 128 that provide wire traces for the lateral passage of the Electrical Conductor Leads 166 required for the hook up of the Proximate Hardware 114 components. The generally T-shaped Retentive Posts 196 have retentive lips similar to that provided upon the retentive flange itself that mate within cooperative T-shaped retentive slots on the case bottom portion that are equipped with corresponding undercuts to receive the retentive lips of the retentive posts. Provision is made for the inclusion of a releasable locking mechanism of a design known to the art that would promote aligned insertion while achieving and retaining a temporary locked "butted up" position between the case top and bottom portions that would be selectively releasable at the discretion of the phone owner thereby permitting removal of the phone from the protective case.

FIGS. 20A-20D depict the new wider Full Width Tunnel 211 that encloses and guides the vertical movement of the Full Width Credit Card Reader 209 that are both the preferred design of this invention for the deployable/retractable Multi-Applications Platform 137. The attainment of these new widths is enabled by the relocation of the male retentive closure flange/projection just detailed in FIG. 19. As a direct result from that Alternate Retentive Flange Location 195, the Case Hatch 131, the Case Lid 132, and the Case Guidance Tunnel 124 that directs interior travel of MAP 137 within the new wider tunnel, all now possess and benefit from the simpler rectangular overall shape and profile rather than the previously depicted T-shape illustrated in FIGS. 4A-D. The benefits derived from a wider card reader housing that matches the full width of the Card Reader Front Wall 140 and Back Wall 141 are substantive and mainly involve an increase in storage space within Card Reader Housing 146 as well as producing a simpler rectangular profile for both the tunnel and the housing that equates to an equally simple profile for Case Lid 132. Benefits are also derived for sealing of the Case Hatch 131 for an alternate double lid design with corresponding differing hinge and swing directions to be described forthcoming as well as a simpler and better seal for the Disposable Mouthpiece 184 of FIGS. 13, 14, and 15.

FIG. 20A shows a full width Case Tunnel 211 that is covered and closed by a cooperative width of Case Lid 132 closed over a Retracted Multi-Applications Platform 138 that is tucked unseen beneath said lid in a fully lowered position where it resides safely stored within the Case Top Portion 101.

FIG. 20B shows the wider Case Lid 132 having been pushed open by the ascending Multi-Applications Platform 137 where its top profile comprised of Card Reader Housing 210 and Card Reader Walls 140 and 141 are just becoming viewable through the opening defined by Case Hatch 131.

FIG. 20C shows full extension of the MAP above the Top 129 of the case where the fully Deployed Multi-Applications Platform 139 displays a Full Width Card Reader Housing 210 having a Card Reader Front Wall 140 and a Card Reader Back Wall 141.

FIG. 20D shows the Case Lid 132 closed over the Case Hatch 131 after the Multi-Applications Platform 137 has been retracted downward through the Full Width Case Tunnel 211. The MAP will remain retracted within storage until called upon to be redeployed and once again subject to the just described transformational cycle.

FIG. 21 shows a vertical full length perspective of the Case Back Side 104 of a Protective Phone Case 100. Illustrated in the Case Top Portion 101 is the previously described deployable/retractable MAP 137 displaying a fully extended Credit Card Reader System 209. Illustrated on the right side of the Case Bottom Portion 102 is housing for a deployable/retractable full size Credit Card 183 having a Magnetic Stripe 180 on one surface and/or an EMV Chip 182 source on its opposing side. The card is deployable through use of a Thumb Pad Drive 134 whose restricted inline movement is directed by Guidance Tracks 136. Internal card movement is in parallel to Guiding Plane Walls 126. The combination of the Guidance Tracks 136 and Guiding Plane Walls 126 directly limit relative positioning of the full size credit card within, to, and from the Protective Phone Case 100. The user deploys Credit Card 183 whereupon it may be swiped or dipped in a conventional manner within an autonomous reader.

Two other unique embodiments are depicted on the left side of the bottom case portion. The upper left embodiment illustrates a standalone Deployable/Removable EMV Credit/ID Card System 224 which acts as a freehand "reduced size" credit or ID card. In the lower left embodiment an EMV/USB "combination" of a Deployable/Removable Data Transfer/Data Memory System 264 is shown in the general form of a memory stick (also known as a jump, flash, or thumb drive) that is equipped with a selectable, and thereby individually deployable, EMV/USB Extension Combination 265.

Both of the left side embodiments are devices designed with deployable/retractable formats where each would utilize similar Thumb Pad Drives 134 systems that directly effect and limit inline relative positioning of their deployable ends within, to, and from the Protective Phone Case 100. What is particularly unique and useful about these devices is that, in addition, they are each totally removable from their respective Storage Modules 115 whereby they become autonomous devices that may be selectively used independent to the case/phone unit. This permits the devices to be temporarily carried upon the person of the user until it is desired to once again, store them back within their respective containment housing within the Case Bottom Portion 102 in order to always have them conveniently available in concert with travel of the case/phone unit.

Firstly, description will be given for the upper left side embodiment of the case bottom portion. The standalone, reduced size, Deployable/Removable EMV Credit/ID Card System 224 has a long slender body that is aligned and laterally inserted within an internal "tunnel shaped" Storage Module 115 that enters perpendicular to the case perimeter/circumferential edge. The device is equipped with a retentive means for retaining the device within the tunnel. At the end of the data storage stick that is to be inserted and retained within the case, a male interface arrangement is provided that bears a Resilient Set of Conductors 266 that plug into a female internal interface port of a type know to the art that has integral hard wired interconnection to the internal system of circuit boards and conductors within the case bottom portion. This temporary electrical interface connection permits the device to be totally withdrawn from the tunnel and utilized independently. The tunnel exterior opening on the case edge may be equipped with a hinged door to close and seal the tunnel and its contents.

The extendable end of the EMV/ID card body bears a user positionable, reduced size, EMV/ID card portion that generally is located upon the same side of the device as the Thumb Pad. The EMV/ID card portion can be deployed or retracted from the circumferential edge of the case through use of the Thumb Pad Drive 134 which has integral attachment to the body of the EMV/ID card. In order to uncover the hidden thumb pad drive, the user's finger is inserted within a Fingernail Concavity 303 whereby a Storage Module Lid 116 can be flipped open through use of a Hinge 133 arrangement or the lid may be removable. The user is now able to access the thumb pad drive lying directly beneath the Storage Module Lid 116 through a Case Cutout 178 that overlies and laterally intersects the storage module tunnel. This arrangement enables the thumb pad drive to be used to deploy the EMV Chip from the circumferential edge of the case as desired for dipping the EMV Chip 182 within an autonomous EMV reader. The upper left illustration of the case bottom portion shows the EMV as being in the, just described, fully extended position. After the EMV chip has been read and the transaction completed, the EMV chip can be withdrawn from the EMV reader and retracted back into safe storage within the side of the case. The lid is closed or replaced whereby its top surface remains flush with the backside of the case.

As stated, for alternate freehand usage, the EMV device may be totally removed from its storage module in the side of the case. Since no electrical power or device interconnection is required for an EMV chip to be read, this creates a standalone EMV Credit 224 card system and/or ID card that can be used independently and then quickly and easily aligned and reinserted within its storage module tunnel within the Case Bottom Portion 102. It should also be noted that since the standalone EMV credit card example requires no power source, it therefore would not benefit from having the resilient set of conductors provided upon its end that is to be releasably inserted within the case tunnel. However, that plug in capability supplied by the resilient conductor set shown in the exemplary drawings is included as a means for providing a hard wired version of the standalone credit card arrangement that has programmable or other selective electrical control characteristics. Should the EMV credit card not be desired by the user as either a standalone option or as an addition on the memory stick then the user may prefer a programmable and updatable personal ID, business, or general information type of card, or any other card or device that might require selective or continuous updating, that would carry evolving data such as medical history or other desired personal/business data.

It is requested to be understood that alternatively the thumb pad drive/guidance track iteration previously described for the non-removable version of the full size Deployable Credit Card 183 may also be utilized as the drive arrangement for the reduced size EMV/ID card if card removability is not desired.

Description will now be given for the lower left embodiment of the case bottom portion. The Deployable/Removable Data Transfer/Data Memory System 264 employs a similar arrangement to that just described for the Deployable/Removable EMV Credit/ID Card System 224. In fact all the design, configuration, and usage description just made applies for both devices with one substantive difference. The Deployable/Removable Data Transfer/Data Memory System 264 employs EMV/USB Extensions 265 that are uniquely "combined" on one device where they can be selectively chosen for individual extension while they remain housed either within the case or alternatively, when the user should elect to totally remove the device from the case and use it freehand as a standalone device.

This means that a choice is provided to the user for either extending the EMV card, the USB interface, or both from the side of the case. In order to accomplish that task the device employs a slightly different thumb pad drive system.

A spring influenced Pivoting Thumb Pad Drive 225 is provided that is in integral pivoting connection to the EMV card portion of the device. The pivoting thumb pad drive is further provided with an integral, vertical oriented, resilient Locking Plunger 234. The locking plunger is provided with resilient vertical movement which permits compensating vertical positioning of the plunger for cooperative fit within a vertical oriented Locking Notch 241 that is integrally provided upon the top surface of the USB portion of the device. The spring influence provided for the pivoting thumb pad induces a normal, at rest position, where the thumb pad remains in a rocked backward position toward its locking plunger end which influences a constant state of down pressure upon the resilient plunger. While both portions are fully retracted within the case, the EMV portion is in full alignment with the USB portion of the device whereby the resilient locking plunger is enveloped by the locking notch due to the combined effects of the spring influences of both the pivoting thumb pad and the locking plunger. Any subsequent drive effort exerted upon the thumb pad will thereby drive both portions simultaneously.

In order for the user to select which device portion they desire to extend from the side of the case, they must choose between two operative options available to the user.

Option 1 (Leaving the EMV portion extended for credit card use):

Starting from a fully retracted position within the case where both device portions are aligned and locked together, the natural "rocked backward position" of pivot is maintained for the thumb pad while driving both portions outward from the case until reaching a Travel Stop 226 integral to the USB portion.

At this point, if the EMV is the portion that is desired for leaving extended from the case, then the thumb pad is pivoted forward whereby the resilient locking plunger is withdrawn from the locking notch integral to the USB portion which results in the EMV portion becoming totally disengaged from the USB portion. The EMV portion can now be solitarily driven further outward until hitting its own travel stop provided by the thumb pad hitting within the end of the Case Cutout 178. The extended EMV portion may now be utilized as a credit card. The illustration depicted in the lower left embodiment of the case bottom portion happens to be shown in the fully extended EMV credit card position just described. To retract both portions, the thumb pad is pivoted backward and the EMV portion retracted until the resilient locking plunger once again naturally engages the locking notch of the USB portion along its path of travel whereby both portions can now be fully retracted and stored within the case.

Option 2 (Leaving the USB portion extended for Data Memory exchange):

Starting again from a fully retracted position for both device portions within the case where both device portions are aligned and locked together, a rocked backward pivoted position is maintained for the thumb pad while driving both portions outward from the case until reaching the Travel Stop 226 integral to the USB portion.

To leave the USB extended alone by itself, the thumb pad is pivoted forward whereby the locking plunger disengages from the locking notch. The EMV portion can now be retracted back within the case leaving the USB portion alone in an extended position from the case. The extended USB portion may now be inserted and coupled within any mating USB interface portal in order to establish a direct communicative link with other computer devices to exchange (read/write) data or conversely may sever that link through device withdrawal and the subsequent retraction and storage of the USB extension within the case bottom portion. In order to retract the USB extension, the thumb pad and the integrally connected EMV are driven forward while maintaining the spring influenced pivoted backward position until the resilient locking plunger naturally engages the locking notch integral to the USB portion along its forward path of travel. The thumb pad is then pivoted backward whereby both portions remain locked together and thereby may be retracted simultaneously back into the case.

In continued description of the USB memory stick. At the point of the upper and lower case portions of the case being assembled around the phone, the internal female interface port that the data storage stick is plugged into already has hard wired interconnection established to the case bottom portion and thereby is instantly linked with both the case top portion and the enclosed phone. Data from the phone may be copied to the storage stick and conversely data stored upon the stick may be read, displayed, saved, or otherwise used upon the phone by the phone owner as desired. A direct wired link may be selectively established between any USB equipped computer device, whether it be direct USB to USB interconnection or via an USB compatible cord, to and with the deployed USB extension of the memory stick. The connected computer device may pull data from the memory stick or copy data to the stick. In addition, full cross communication between the USB equipped computer device and the case/phone unit can be conducted through their mutual interconnection to the memory stick.

Upon the data stick being needed as an independent data storage device that is to be portably carried by the user or upon the device reaching a degree of storage whereby the storage stick is approaching or has exceeded its storage capacity, it may be unplugged from within its internal case connection by its lateral withdrawal from the case tunnel. It then may be replaced with a new USB storage stick in the instance of having reached its storage capacity or just reinserted after usage as a standalone device. In either case, the extended USB end of the device may now be retracted whereby the whole memory stick is safely stored within the confines of the case.

It is requested to be understood that specific to the deployable EMV/USB Extension Combination 265 that various other arrangements known to the art may be employed to produce the desired outcomes for individual EMV/USB extendibility and/or for the for the pivoting thumb pad and/or the locking plunger themselves but the novelty for their selective extendibility, in combination with device removability and portability, would still be in effect. It is also recognized that the USB interface may be replaced by other types and/or configurations of interface common to the industry. It also should be understood that the extendable EMV portion of that same EMV/USB Extension Combination 265 may be omitted thereby leaving a removable freehand USB Memory Stick. However, for sake of increased utility and consumer value, the "combined EMV/USB iteration" is the preferred embodiment.

Another alternate USB embodiment option is for a generally male USB extension to be disposed as an integral portion of the deployable MAP 137 of the Case Top Portion 101 that is already in wired interconnection to the Flange Interface Conductors 160 of the Case Retentive Flange 159. Still another alternative embodiment is the use of an independent USB Adapter that is slipped onto and mates with a version of a conductor arrangement integral to the deployable MAP 137. Either embodiment option would enable direct interconnection of the MAP USB interface integral to the Case/Phone unit to and with other computer devices possessing a female USB port. However, since making a USB port as an integral component of the MAP that is non-removable, it would preclude or otherwise cause difficulties with MAP cross compatibility as a credit card reader or with other previously described multiple MAP functions. Therefore either a male or a female USB independent adaptive piece would be the better option. A standalone adapter whose first adapter end is insertable and instantly inter-connectable to and with the deployable MAP 137 device and a second adapter end that receives other USB devices.

Also depicted at the bottom of FIG. 21 is a "portable" Deployable/Removable Blood Glucose Test Device 267 that has a similar slender "insertable/removable" body structure, pivoting thumb pad, and a plug-in electrical interface means that bears a set of resilient conductors upon its insertable end, to that just described for the Deployable/Removable Data Transfer/Data Memory System 264 comprised of a EMV/USB Extension Combination 265.

The systems mainly differ in that instead of the USB extension, the blood test system is outfitted with a Deployable Lancet Housing 270 that houses a Disposable Lancet 273 that is inserted and cocked within the lancet housing. Sandwiched over the top of the Deployable Lancet Housing 270 is an Extendable Test Strip 268 that is outfitted with a Disposable Blood Test Strip equipped with an integral blood Collection Tube/Window 269. The Test Strip 268 portion and the Lancet Housing 270 portion importantly differ in that the test strip portion, for the sake of sterility, is disposable and thereby removable while the lancet housing is not disposable or removable but is only capable of being deployed from the end of the device and then reversed and retracted back into internal storage. However, as stated, the Deployable Lancet Housing 270 does carry and house a removable member in the form of Disposable Lancet 273 that, similar to Extendable/Disposable Test Strip 268, is also disposable for reasons of maintaining a "single use" state of sterility for the blood glucose testing system.

We now begin physical description of the Deployable/Removable Blood Glucose Test Device 267 and its related usage. As in earlier description for the extendable USB device, a spring influenced Pivoting Thumb Pad Drive 225 is provided. Firstly, the pivoting thumb pad is capable of establishing releasable pivoting connection to the test strip portion of the blood test device. Secondly, the pivoting thumb pad drive is also provided with an integral, vertical oriented, resilient Locking Plunger 234. The locking plunger is provided with resilient vertical movement which permits compensating vertical positioning of the plunger for cooperative fit within vertical oriented Locking Notches 241 of various components of the blood test device upon their insertion and alignment with the locking plunger.

The spring influence provided for the pivoting thumb pad induces a normal, at rest position, where the thumb pad remains in a rocked backward position toward its locking plunger end which influences a constant state of down pressure upon the resilient plunger. Upon insertion of the lancet tube within the lancet housing, the Lancet Tube becomes cocked and locked within the lancet housing due to the locking notches 141 of 271, 273, and 274 all aligning while the spring influenced locking plunger of the thumb pad mutually aligns, penetrates, and locks within their aligned holes. The resilient locking plunger is naturally enveloped by the locking notches due to the combined effects of the spring influences of both the pivoting thumb pad and the locking plunger.

Starting from a fully retracted position of the thumb pad and the interconnected internal components of the test device. The thumb pad inclination is maintained in its spring influenced naturally position of being pivoted backward, while driving the thumb pad forward/outward until hitting a travel stop. This driving action of the thumb pad both deploys the lancet housing and exposes the pivoting attachment point of the thumb pad whereby the test strip may be releasably attached. The Lancet Tube is inserted, cocked, and locked within the lancet housing due to the locking notches 141 of 270, 271, 273, and 274 all aligning and having the spring influenced locking plunger of the thumb pad align and penetrate their aligned holes which are currently in a stacked relationship. Both the Test Strip 268 portion and the Lancet Housing 270 portion, as stated, have previously be inserted and loaded internally. The Test Strip 268 portion occupies a position of stacked alignment over the Lancet Housing 270 portion where they are locked together in this stacked alignment by the resilient Locking Plunger 234, integral to the Pivoting Thumb Pad 225, being seated within the Locking Notch 241, integral to the lancet housing. In order to achieve mutual extension of the two stacked portions from the end of the device, a rocked backward position of pivot is maintained for the thumb pad while driving both portions outward from the case until reaching a Travel Stop 226 integral to the lancet housing portion. The Disposable Lancet 273 and protective tip may now be inserted as a unit within the end of the Lancet Housing 270 portion which remains in stacked and locked alignment with the Test Strip 268 portion. Upon the lancet being fully loaded within the lancet housing, the lancet is auto-locked in a cocked position by its own Locking Notch 241 integral to the lancet reaching stacked alignment with the locking notch integral to the lancet housing whereby the lancet's locking notch also engages over the resilient locking plunger of the pivoting thumb pad.

The protective tip of the lancet is removed and a finger of the user is placed against the end of the deployed lancet housing. The front of the thumb pad is pivoted forward whereby the locking plunger integral to the opposing side of the pivoting thumb pad is raised and withdrawn from the respective notches of both the lancet and the lancet housing. The cocked lancet immediately fires outward a short distance from the case whereby it pricks the finger of the person being tested. While maintaining the pivoted forward position of the thumb pad, the thumb pad is driven outward toward the edge of the case whereby it extends Test Strip 268 beyond the lancet housing due to it having integral pivoting attachment with the thumb pad.

The Blood Collection Tube/Window 269 integral to the extended test strip may now be placed directly against the pricked finger where it is used to pull, by capillary action, a sample volume of blood from the finger. The blood sample expressed from the finger is sterilely stored within the collection window whereby it may be shipped to a lab for running the desired panel of blood tests. Alternatively, the accompanying software/hardware of the case/phone unit may be activated whereby immediate on the spot blood testing and analysis may be executed for simple procedures such as establishing the current blood sugar levels of the testee. Those test results may be relayed, saved, and stored to memory on the underlying encased phone or exported to the proper medical personnel for further diagnosis and action in line with the healthcare goals and needs prescribed for the testee.

Testing has now been completed whereby the already analyzed test strip is first in line for hand removal and disposal followed by the removal and disposal of the used lancet. The thumb pad may now be pivoted backward in conjunction with a reverse finger drive force being applied to the thumb pad. As the thumb pad is retracted, its integral locking plunger resiliently picks up and engages within the locking notch of the lancet housing whereby the thumb pad and lancet housing are retracted fully within the confines of the blood test device within the case tunnel. The exterior tunnel door undergoes hand or automatic closure whereby the system is stored until needed again.

Upon the initiation of a new testing procedure, the device components are manually extended whereby the placement of a new sterile lancet and a new sterile test strip may be loaded thereby prepping the device to repeat the testing cycle once again.

Other than the full width magnetic stripe credit card, the preceding computer hardware components of FIG. 21, and others not shown, could be successfully mounted, housed, deployed, and retracted from protected storage located within either the Case Bottom Portion 102 as shown or, alternatively, upon the Case Top Portion 101 as well. However, for reasons of larger overall size and for reasons just stated for some of the hardware not being particularly "multi-use" compatible for being conducted upon or as a componental part of the Multi-Applications Platform 137, these hardware components are shown in the various illustrations as being preferably mounted and utilized from the Case Bottom Portion 102.

It is also requested to be understood that a version of the deployable Multi-Applications Platform 137 may also be housed and utilized from the Case Bottom Portion 102. Also shown in FIG. 21 is a deployable Phone Viewing Stand Leg 302 for propping up the phone while conveniently viewing the phone's virtual display screen. This leg also pulls novel double duty as a cover that opens and reveals an underlying novel structure that will be detailed in upcoming description in FIG. 36A.

Collectively, FIGS. 22A-22D show how two individual case over phone units can be specifically oriented to one another whereby data can be directly passed from one unit (the source) and received by the remaining unit (the reader).

FIGS. 22A and 22B show the respective Front 103 and Back Side 104 plan views of the Case Top Portions 101 for two similarly equipped Protective Phone Cases 100 which are both outfitted with Deployed Multi-Applications Platforms 139 that each carry credit card EMV Chips 182. For reasons of space limitation and component viewability, it is practical to show only the top case portions in the two case over phone (case/phone unit) representations rather than the actual full case over phone arrangement of this invention. It should thereby be understood that neither of the case bottom portions nor the two phones themselves are included in the drawings but should be considered as present similar to the case over the phone representation illustrated previously in FIG. 2. Therefore each top portion illustrated in FIGS. 22A-22D should be pictured in the mind's eye as being a full case having both top and bottom portions that fully encase their respective phones.

FIG. 22A illustrates how the case/phone unit that is designated to be used as a Case/Phone Reader 216 unit is placed upon a flat surface on its back with its Case Back Side 104 facing down and the display screen of the Case/Phone Unit Facing Up 217 towards the owner that is viewing the phone's display screen while conducting the monetary or other data transfer.

FIG. 22B illustrates how the remaining case/phone unit that is be used as the EMV Source Case/Phone Unit 218 is placed in a reverse "flipped over" positioning relative to the case/phone unit of FIG. 22A. FIG. 22B shows its Case/Phone unit as being Face Down 219 upon a flat surface and its integral EMV Chip 182 that is designated as the EMV Source to be read, is also Face Down 219 and not currently visible.

FIG. 22C shows how the Case/Phone Unit that was flipped over in FIG. 22B has now also been inverted relative to the position of the credit card reading case/phone unit depicted in FIG. 22A. That flipped and inverted version is now described as Inverted Case/Phone Unit 220. The Deployed Multi-Applications Platforms 139 upon the top portions of each case/phone unit now face each other and may be aligned and moved toward one another whereby they are placed into a temporary mated state of interlockment where they mutually lie parallel and inverted to one another upon a flat surface as illustrated in FIG. 22C.

In order to facilitate a clear path for the respective Deployed Maps of each Case/Phone unit to interlock without obstruction, the lid arrangement of this embodiment has an Alternate Single Lid Location/Swing 212 with a respective Alternate Hinge Location 214 that removes the lids from impeding the mutual overlapping of the their respective Deployed MAPS during the interlockment procedure. The flipped and inverted EMV Source Case/Phone Unit 218 can now be scanned by the Reader Case/Phone Unit 216 which establishes a direct data link with the inverted EMV Source Case/Phone Unit 218 for taking account identification information and other related data occurring during the proceedings of the financial transaction. The interlockment of the case/phone units illustrated in FIG. 22C will now be rolled over 90 degrees into a revealing plan end view.

FIG. 22D shows a detailed plan end view of the mutual interlocking between the respective structures of the Credit Card Data Reader Case/Phone Unit 216 of FIG. 22A and the Credit Card EMV Data Source Case/Phone Unit 218 of FIG. 22B that provides the capability to conduct Inverted Case to Case Reading 221. That unique capability is a direct result from employing a One Case as Card Reader/One Case as Card EMV Source 215 system for conducting selective data exchange.

The preceding examples show the case/phone unit that is to be used as the reader is physically placed upon its back and the other case/phone unit that is to be used as the data source is flipped and inverted to the first whereby its screen is facing down. It is to be understood that the phone/case positions described are not random but are favorable positions in order to effectively conduct a table top credit card transaction. The primary reason for the importance of that positioning is while the phones mutually lie prone upon a flat service "only the phone lying on its back, which is the credit card reading phone that is about to receive data such as taking a payment, currently has its graphic display screen facing up whereby it is viewable. It is necessary for the screen of the credit card reading phone to be viewable in order for that phone user to make the proper selections upon the screen that are primary to conducting the transaction.

However, since both "case over phone units" are equipped identically but are positioned in such a manner as one phone is flipped and inverted to the other before they mutually align and mate their Deployed MAP 139 substructures, it should be recognized that "both" phones can still do the very same tasks in reading the others EMV chip since their mutual MAP interlocking positions both express the very same relationship for their respective Sidewalls 142 that possess the imbedded EMV Chips 182, to face the other's Sidewalls 144 that possess the Credit Card Reader Head 147. However the phone user with the screen facing down does not have visual access to enter keystrokes to conduct a transaction while the phones are lying prone upon a flat surface. If both phones are held free hand, their unitized tilt can be adjusted to the advantage of the person currently entering keystroke selections at that particular moment. This would thereby enable mutual MAP interlocking and computer linking for the mutual back and forth exchange of data (Sidewalls 142 to 144 and Sidewalls 142 to 144).

It is also a design and feature option for Sidewall 143 of both MAP 137 substructures to employ and/or avail themselves for the special setup/use/condition where the addition of a "Wired and/or Wireless" chip on the respective Sidewalls 143 of both case/phone units would create a "Wired and/or Wireless" Sidewall 143 to Sidewall 143 mutual bi-directional exchange of private, encrypted, or other special data. Refer to FIG. 5C for better MAP wall and sidewall identification.

The FIGS. 23A-C and 24A-C depict a new MAP device and usage arrangement whereby an Extendable EMV Credit Card 222 is created. This is accomplished through the novel capability to selectively disengage the Card Reader Front Wall 140 from a fully deployed MAP. The remainder of the deployed MAP is then retracted thereby leaving the disengaged Front Wall 140 standing independently as a Deployed Single Wall EMV Credit Card 242.

To better understand the embodiments it would be beneficial to review FIG. 5 where previously detailed component and specialized wall shaping description is given for a double wall (four sidewalls) structure having a Card Reader Front Wall 140 and a Card Reader Back Wall 141, a Credit Card Reader Housing 210, and a Credit Card Reader Head 147 that mutually assemble to form the Multi-Applications Platform 137. However, what was lacking in FIGS. 5A-5C but is now shown in FIGS. 23A-C and 24A-C is detail of the changing relationships of the Multi-Applications Platform 137 being housed and deployed from within the confines of its own custom Credit Card Reader Bay 123 that is located and integrally formed as part of the Case Top Portion 101.

Most importantly, the main purpose and what is uniquely conveyed by FIGS. 23A-C and 24A-C is the introduction to the design, means, and methods for deploying a double wall structure from the top portion of the case and then retracting a portion of that structure whereby a Deployed Single Wall EMV Credit Card 242 individually remains that has its integral EMV Chip 182 ideally disposed for being read and used at the discretion of the phone user for conducting payment transactions similar to the function of an independent credit card.

FIGS. 23A-C represent the respective views of a Case Front Side 103, a Case End 109, and Case Back Side 104 that show a currently deployed double wall (Walls 140 and 141) Credit Card Reader 209 that is a substructure of the Deployed Multi-Applications Platform 139.

FIGS. 24A-C represent the respective views of a Case Front Side 103, a Case End 109, and Case Back Side 104 where a Card Reader Front Wall 140 still remains deployed thereby forming a Single Wall EMV Credit Card 242 that was converted and formed from the double wall deployment depicted in FIGS. 23A-C. This transformation was enabled by retracting the Card Reader Back Wall 141, in tandem with its adjacent Card Reader Housing 210 and Credit Card Reader Head 147, thereby leaving the Card Reader Front Wall 140 in a deployed position. As depicted in FIG. 24A, the deployed Front Wall 140 and its integral EMV Chip 182 disposed upon Sidewall 142, can now be inserted within any autonomous EMV reader to initiate and complete a credit card transaction. Front Wall 140 is shown with significantly Reduced Corners 223 comparatively with Back Wall 141. This makes initial alignment and insertion of the standalone Deployed Front Wall 140 within an autonomous EMV reader a very simple proposition. Also, while utilizing the MAP as the double wall Credit Card Reader 209, the Reduced Corners 223 for Front Wall 140 makes alignment and insertion of a credit card within the small gap between the two walls of the Deployed MAP 139, a much easier task while executed from the Case Front Side 103 that bears the encased phone.

Specific description will now be given for the mechanics of how the withdrawal of a portion of the MAP is accomplished thereby leaving a standalone EMV Credit Card. Before proceeding with that description, it should be noted that highly detailed stage by stage explanation for all the components and inter-workings of the current embodiment, will be continued in upcoming FIGS. 25A-25I.

Looking at FIG. 23B, we begin an abbreviated description for creating an Extendable EMV Credit Card 222 from an already Deployed MAP 139. The thumb pad drive of this embodiment is a Pivoting Thumb Pad Drive 225 whereby the user is able to not only influence bi-directional motion of the MAP within and out of its containment bay, they are also endowed with the capability to disengage Front Wall 140 from the remainder of the Deployed MAP 139 structure. To initiate the disengagement process for the MAP, the top half of the pivoting thumb pad drive is depressed by a finger whereby it pivots forward and, at its opposing end, reciprocally withdraws a Locking Plunger 234 and its integral Angled Locking End 240 from a mating interlocking fit within a Locking Notch 241. The locking notch is located within Wall Shaping 150 integral to Sidewall 143 of Front Wall 140.

Now Viewing FIG. 23B and FIG. 24B, with the angled end of the locking plunger having now been disengaged from within the locking notch, the thumb pad drive can be pulled fully downward in tandem with both the interconnected Card Reader Housing 210 and the Back Wall 141 following. The thumb pad is then released whereby its pivoted position automatically recovers to its original non-pivoted position. This leaves a still deployed Front Wall 140 that was prevented from following the retracted portion of the MAP by the effect of upper Retentive Bumper(s) 227. The Deployed Single Wall EMV 242 credit card is retained from further upwards vertical displacement by the effect of lower Retentive Bumper(s) 227 and any lateral displacement by the combination of the top face of retracted Back Wall 141 and the inner walls of the Case Tunnel 211 whereby the Deployed Single Wall EMV Credit Card 242 stably stands above the Top 129 of Case Top Portion 101. Front Wall 140, and its integral EMV Chip 182 disposed upon Sidewall 142, can now be inserted within any autonomous EMV reader to initiate and complete a credit card transaction.

Still Viewing FIGS. 23B and 24B, another differing aspect of this embodiment is that the previous arrangement for the Case Lid 132 which acts as the closure cover atop the Card Reader Bay 123 that houses the Retracted MAP 138, is now designed and endowed with an Alternate Double Lid Design 213 where two lid portions have Alternate Hinge Locations 214 that allow the double lids to swing open from a common midline in opposing directions. As the MAP 137 is deployed upward within the walls of its Guidance Tunnel 211 and out of Card Reader Bay 123, the two doors are pushed open whereby the MAP ascends through the Case Hatch 131 where it attains a deployed status above Case Top 129. The reason behind this lid design alteration is that the location and swing of the single lid design depicted in previous embodiments entails the lid reaching a deployed height alongside of Sidewall 142 that comes very close to touching the EMV chip thereby obscuring EMV access and making it more difficult to use the deployed single wall arrangement as an EMV sourcing card. In contrast, the double lid design produces a very short lid height alongside of Sidewall 142 of Front Wall 140 that does not obscure the area where the EMV chip is disposed and also importantly allows the top edge of the opposing lid portion to completely close against the deployed card reader housing and thereby flush seal Hatch Opening 131.

Alternate to the double lid design is another single lid arrangement, offered in description only, where Front Wall 140 is designed slightly longer (taller) than Back Wall 141. This enables the top surface of the taller Front Wall 140 to be and remain flush with both the top of the case and the lid while said lid is closed over the hatch. The single lid swings open from the case backside and seals alongside the taller Front Wall 140 when the MAP is fully retracted whereby the combination of the top of taller Front Wall 140 and the top surface of the closed lid mutually compose a flush surface to and with the Top 129 surface of the case. The opposite side and direction of opening entailed by this particular single lid design in comparison to the original design of Case Lid 132, is offered as an embodiment option only and is not included in the drawings for reasons that the Alternate Double Lid 213 arrangement is the preferred design.

FIGS. 25A-I are a continuation in detail for the design arrangement shown in FIGS. 23A-C and 24A-C. The same double lid design is shown for covering the hatch with the objective of deploying a single wall EMV sourcing credit card. FIGS. 25A-I relate additional structural detail and device positioning in a step by step transformation and methodology for achieving the deployment of a double wall card reader and the subsequent retraction of one wall thereby leaving the remaining wall in the deployed position to act as an Extendable EMV Credit Card 222.

However, differing from the more abbreviated description given in FIGS. 23A-C and 24A-C, an additional new embodiment is shown in FIG. 25F that is of substantive usefulness. A Deployed Single Wall EMV Credit Card 242 is depicted that is totally "removable" from the MAP thereby providing a standalone, free in hand, User Withdrawn Single Wall EMV Credit Card 243. After the user finishes with need for the standalone EMV card, the removed wall can be hand aligned and reinserted within the MAP. A quick re-deployment of the MAP will re-engage and lock with the newly inserted single wall EMV chip card and once again restore all components back to the original unitized double wall card reader comprising the MAP assembly.

In FIG. 25A, the process begins with the double wall MAP assembly being in a retracted and safely stored position within its storage bay with the double lids closed and blocking the hatch integral to the top portion of the protective case platform.

An inset enlargement is also shown in FIG. 25A that magnifies some critical component relationships and structural differences from earlier embodiments. In particular, a Pivoting Thumb Pad Drive 225 and related spring influenced structures are detailed that enable the user to selectively release and disengage the EMV single wall from its union with the remainder of the MAP. The Pivoting Thumb Pad Drive 225 is provided with the capability to pivot slightly about its short axis by the inclusion of a Taper 228 that defines a Fulcrum Point 229 upon the back side of the thumb pad at its uppermost end. The Pivoting Thumb Pad Drive 225 is further equipped with two integral structures at its opposing base end. Provided are a duplicate pair of Spring Cavities 231 followed by a singular Slot 237 at the very end of the pivoting thumb pad that provides a space for a pair of U-Clip 238 bodies. Both spring cavities and the singular U-clip slot are each equipped with a pair of Unthreaded Holes 235 that pass through their respective structures.

The spring cavities each have an Unthreaded Hole 235 that passes through their centers whereby a pair of Threaded Fasteners 135 that have each been pre-fitted with a Tensioning Spring 233 is first inserted through an Unthreaded Hole 235 of Spring Cavity 231 integral to the Pivoting Thumb Pad 225. Secondly it passes through a Guidance Track 136 situated on the Case Back Side 104 that defines the back wall of the Credit Card Reader Bay 123. Thirdly it passes through an unthreaded hole integral to Card Reader Housing 210. Fourthly it terminates within a Threaded Hole 230 integral to Back Wall 141 where it is fastened therein.

Very importantly, the threaded fastener of the Pivoting Thumb Pad 225 arrangement differs from the previously described arrangement for the threaded fastener utilized in Thumb Pad Drive 134 in that the threaded fastener of Pivoting Thumb Pad 225 does not pass through Back Wall 141 and does not fasten within Front Wall 140. The reason for this difference is that in order to be able to selectively separate Back Wall 141 from Front Wall 140 as desired in either the Extendable Single EMV Wall 222 embodiment that is currently being described or the forthcoming description for a Removable EMV Wall 224, it is imperative that Back Wall 141 is only bound to Front Wall 140 by a releasable type of interconnection in order for them to function independent to one another as desired.

As the threaded fastener is tightened it binds the thumb pad to the MAP as both the Tensioning Spring 233 and the Head 232 of Threaded Fastener 135 mutually seat themselves within the confines of the Spring Cavity 231 integrally positioned at the bottom end of Pivoting Thumb Pad 225. This arrangement permits the upper end of the thumb pad to be depressed by the user's finger where upon the opposing end of the thumb pad reciprocates in the opposite direction and compresses the tensioning spring. This resilient spring tensioning enables the pivoting thumb pad to return to its original position upon finger pressure on the thumb pad being removed.

Also included is a pair of Locking Plungers 234 with each having a U-Clip Retention Groove 239 at one end of the plunger for receipt of a U-Clip 238 while the opposite end of the plunger terminates with an Angled Locking End 240. Since the angled end of the plunger has a prescribed orientation that has to be maintained, the end of the plunger that bears the U-Clip Retention Groove terminates with Flattened Sides 236 that preserve the desired orientation within cooperatively shaped Unthreaded Holes 235 that pass through the Slot 237 of the Pivoting Thumb Pad 225. The end of the plunger having the U-Clip groove is inserted within the unthreaded hole within the Slot 237 of the thumb pad where a U-Clip 238 is pushed onto the U-Clip Retention Groove 239 thereby affixing the plunger to the thumb pad in a resilient manner.

The opposing end of the plunger having the Angled Locking End 240 passes through the Guidance Track 136 and through an Unthreaded Hole 235 that is disposed through both the Card Reader Housing 210 and the Card Reader Back Wall 141. The Angled Locking End 240 of the plunger seats within an aligned Locking Notch 241 located within the surface of Wall Shaping 150 integral to Front Wall 140.

Now as the top of the finger pad is depressed, the opposing end of the finger pad reciprocates in an opposite direction whereby the tensioning spring is compressed concurrent with the plunger undergoing slight withdrawal from its unthreaded hole which removes its angled locking end from within the confines of the Locking Notch 241 integral to Front Wall 140. This breaks the unitized bond between Front Wall 140 and the remainder of the MAP so that when the user's finger exerts either upward or downward drive pressure upon the thumb pad, the remaining portion of the MAP will be driven in tandem with thumb pad movement while Front Wall 140 will remain stationary.

FIG. 25B shows the Pivoting Thumb Pad Drive 225 having been pushed vertically by the user until the body of spring tensioned Threaded Fastener 135 hits the upper terminal end of the Guidance Track 136 that creates an upper Stop 226 for thumb pad travel. The upwards driving motion shoves the Double Lids 213 fully open in concert with achieving full deployment of the currently unitized double wall credit card reader assembly. The entire MAP is unitized for the moment by the angled end of the plunger currently residing within the Locking Notch 241 so that all MAP 137 travel is transferred in kind to Front Wall 140.

FIG. 25C shows the top portion of the pivoting thumb pad having being depressed, seesawing its opposing end outward and compressing the thumb pad Tensioning Spring 233 in tandem with retracting the Angled End 240 of the Locking Plunger 234 from its seat within Locking Notch 241 of Front Wall 140. The remainder of the MAP and Front Wall 140 are no longer retained and bonded together as one unitized structure.

FIG. 25D depicts Back Wall 141, and its attached Card Reader Housing 210, having both been retracted back within the storage bay by the influence exerted by the user pulling downward on the thumb pad until hits the lower terminal end of Guidance Track 136 that creates a lower Stop 226 for thumb pad travel. Due to the angled locking end of the plunger having been removed from its seat within the Locking Notch 241 of Front Wall 140, the retracting action did not move Front Wall 140 and consequently, it remains in place, fully deployed above the Top 129 of the Case Top Portion 101.

FIG. 25E shows the depressed thumb pad having been released with the consequent spring influenced return of Locking Plunger 234 to a resilient positioning where its Angled End 240 is partially extended from Back Wall 141. This leaves a still deployed Front Wall 140 that was prevented from following the retracted portion of the MAP due to inter-component friction by the effect of upper Retentive Bumper(s) 227. The Deployed Single Wall EMV 242 credit card is retained from further upwards vertical displacement by the effect of lower Retentive Bumper(s) 227 and any lateral displacement by the combination of the top face of retracted Back Wall 141 and the inner walls of the Case Tunnel 211 whereby the Deployed Single Wall EMV Credit Card 242 stably stands above the Top 129 of Case Top Portion 101. Bumper vertical displacement resistance in both directions is also necessary when the Deployed EMV Credit Card 242 is inserted or withdrawn from a conventional credit card reading unit. One of lids of the double lid configuration may be closed flush against the still deployed Front Wall 140 although that closure is not mandatory or even necessary.

FIG. 25F shows the optional stage of the process and the primary objective of this multi-stage embodiment for creating a removable freehand EMV Credit/ID Card 224 device arrangement. The user can now elect to completely remove the Deployed Single Wall EMV Credit or ID Card 242 out of the top of the Credit Card Reader Bay 123 via the Case Hatch 131 opening. The user simply grasps the top of the deployed Front Wall 140 and incrementally increases the vertical pulling force exerted upon Front Wall 140 until the frictional resistance provided by lower Retentive Bumpers 227 is overcome and Front Wall 140 is released from the confines of Card Reader Bay 123. Front Wall 140 is now in hand and ready for use as a reduced size, hand manipulated credit card comparable to a credit card you would remove from your wallet or purse and use autonomously.

FIG. 25G shows the previously removed "in hand" Front Wall 140 after being newly aligned and reinserted back through the Hatch 131 and directed into collective realignment by the top of Sidewall 144 of Back Wall 141 and the encompassing confines of the interior walls of Guidance Tunnel 211 within the Top 129 of the Card Reader Containment Bay 123.

FIG. 25H shows the Pivoting Thumb Pad 225 being pushed vertically again thereby engaging and scraping its angled locking end of its resilient Locking Plunger 234 against the bottom of Front Wall 140. The angled end of the plunger wedges and momentarily depresses and, with further travel, reaches and resiliently snaps into the receiving confines of Locking Notch 241 of single Front Wall 140. With that consequent interlocking having taken place, re-unitization of the entire double wall MAP 137 card reader structure is re-established.

FIG. 25I shows the reverse downward pull of the Pivoting Thumb Pad 225 by the user until hitting the lower Stop 226 of the Guidance Track 136. The downward driving action influences the return of the whole unitized double wall assembly back to a fully Retracted MAP 138 position that is safely stored and housed within its designated Card Reader Bay 123 integral to the Top Portion 101 of the Protective Phone Case 100 platform. The Double Lids 213 are closed by hand thereby sealing the top of the card reader bay over the retracted MAP. The individual stages have come full circle for the MAP deployment/retraction process that creates either an Extendable EMV Credit Card 222 device usage arrangement capable of producing a Deployed Single Wall EMV Credit Card 242 or can be taken an elective step further whereby a removable independent EMV Credit/ID Card 224 device usage arrangement is created where the selective removal and reinsertion of a freehand card is facilitated in the form of a User Withdrawn Single Wall Freehand EMV Card 243. The retracted and safe storage of the MAP completes the multi-stage process which is now prepped and ready to once again repeat the cyclical Multi-Applications Platform 137 deployment/removal/reinsertion/retraction proceedings.

In FIG. 26, a Case Back Side 104 and Top 106 perspective view of a Protective Phone Case 100 and a Deployed MAP 139 are shown for a user induced Blow Gas Analysis System 201 device. The depiction illustrates the associated flow of air as it passes in, through, and out of the MAP. The Deployed MAP 139 inclusive of its related internal wall shaping, a Guiding Plane Wall 126 inclusive of its integral Guiding Plane Slot 127, a Gas Analyzer Housing 120 inclusive of its extended Gas Analysis Sensor 119, and an Air Vent Cluster 130 all collectively define an exacting pathway that the user's breath must follow to travel through the deployed MAP device and out the side of the Top Portion 101 of the case/phone union of this invention. Also shown is a Disposable Mouthpiece 184 that provides the user with a choice to either place and seal their lips directly over the extended portion of the Deployed Multi-Applications Platform 139, inclusive of a Front Wall 140, a Back Wall 141, and a Card Reader Housing 146 plus a Case Lid 132, or to apply and use a new sanitary mouthpiece every time an individual other than the owner desires to have a breath sample analyzed.

FIG. 26 distinctly tracks a user induced flow of air or other gas in a direction indicated by Air/Gas Flow Arrows 200 that is blown through the tops of either the Disposable Mouthpiece 184, if utilized, or directly upon and in between Walls 140 and 141 of the Deployed MAP 139, across an inline Gas Analysis Sensor 119, and out of the Cluster Venting 130 whereby electrical data relative to the desired analyzation parameters is recorded and sent to CPU of the interconnected phone running the computer programming of a gas analysis application.

FIGS. 27A and 27B illustrate further detailed perspectives specific to the Blow Air Flow Configuration Detail 202 arrangement for the Blow Gas Analysis System 201 and the related physical construction for the deployable Multi-Applications Platform 137 that was previously described in depth in FIGS. 5A and 5B. The inset shown in FIG. 27A focuses on showing important Wall Shaping 150 on Sidewall 143 of Front Wall 140 and its subsequent location within the MAP and how said shaping guides and funnels the "blow" air flow laterally out of the MAP. A precise air path is formed that funnels the flow of the user's breath over a Gas Analysis Sensor 119 before exiting via the Cluster Air Venting 130 integral to a Case Top Portion 101 that uniquely houses the deployable MAP device. The direction and path for the air flow shown in FIGS. 27A-B is indicated by Arrows 200.

FIG. 27A shows a backside view of the entire case platform as well as the corresponding inset that depicts partial structural detail that defines the MAP interior that dictates the exacting pathways that form the unique "Blow" air flow passageways of this invention.

FIG. 27B shows a see through End View 109 of the Disposable Mouthpiece 184 while telescoping over both the MAP 137 and the Case Lid 132. Arrows 200 relate the air flow detail as it is blown downward by the user as it initially passes through the Mouthpiece Portion 186 where it continues downward guided by the MAP walls and the integral Wall Shaping 150 until perpendicularly exiting the bottom of MAP 137 through a lateral Gas Passageway 148.

FIGS. 28A-C show design arrangements used to effect a user induced reverse "Pull" flow of the air/gas being sampled.

FIG. 28A is a Backside 104 and Top 101 perspective view of the case and deployed structure that demonstrates the bi-directional air flow capability of this invention whereby an induced "reverse" flow of air useful for "Pulling" an ambient gaseous sample for analyzation can be generated directly upon the MAP by the lips and mouth of the user.

FIG. 28B illustrates an alternate gaseous pull arrangement where a specialized MAP cover in the form of a Multi-Use Gaseous Funnel 187 having an enclosed top with an integral connector port in the form of a Tubing Attachment Nipple 188 are provided. The specialized cover is meant to be used in lieu of the Disposable Mouthpiece 184 so that mechanical inducement of a reverse flow of air can be effected. Multi-Use Gaseous Funnel 187 is used in combination with Air Tubing 189 and a bi-directional Hand or Mechanical Air Pump 190 that collectively can be used to stimulate a pulled air sample when use of the mouth cannot be employed due to either the extended duration of a sampling or the unknown or noxious nature of the gas or gases being sampled.

FIG. 28C shows use of a bi-directional Hand or Mechanical Air Pump 190 connected via Air Tubing 189 and a specialized Air Vent Hole Adapter 206 that inserts and twist locks within an Air Vent Hole 205 of the case to stimulate the same reverse direction of air flow illustrated in FIGS. 28A and 28B. However, to effect that same reverse direction of induced air flow, the pump in FIG. 28C is configured to cause a push of air through the tubing while the pump in FIG. 28B initiates a pulling of the air sample. The induced air flow direction for both pumps is indicated respectively for each by Arrows 200.

When sampling ambient air by mouth inducement, the sample has to be drawn or pulled whereas use of a mechanical or hand pump is compatible with a bi-directional stimulation of air flow that is illustrated through the pulling action of the pump system in FIG. 28B or the pushing action of the pump system in FIG. 28C. However either hand or pump induced "pull" sampling that is drawn directly through the vent cluster/hole is the shortest most direct route to introduce air flow across the Gas Analysis Sensor 119 of the Pull Gas Analysis System 203.

The drawings also show the presence of both an Air Vent Cluster 130 and an Air Vent Hole 205 that is centered within the air vent cluster. Generally the Air Vent Hole 205 is only needed when connection to extraneous independent air equipment/devices is required while the Air Vent Cluster 130, that is designed with multiple small holes, is the preferred venting arrangement for keeping debris from entering the case and is thereby used for all applications not dependent upon the attachment qualities provided by the larger single hole version of the air vent. However both hole arrangements can be supplied as shown in the drawings and a simple plug as known to the art can be used to provide a flush seal that shuts off the Air Vent Hole 205 when the hole is not needed for extraneous equipment attachment. To shut off the Air Vent Cluster 130, the Air Vent Hole Adapter 206 may be designed with its middle base having a sufficient diameter as to block all of the multiple holes of the air vent cluster while the adapter is attached within the air vent hole while extraneous equipment is being utilized. The just described venting arrangements also apply to the immediately following descriptions for FIG. 29A and FIG. 30. In addition, an arrangement that provides the user with the capability to alternately choose between use of either a multi-hole air vent cluster or a singular air vent hole is shown forthcoming in FIG. 33D.

FIGS. 29A and 29B illustrate further detailed views specific to the Pull Air Flow Configuration and Detail 204 for the Pull Gas Analysis System 203 and the related physical construction for the Deployed Multi-Applications Platform 139.

FIG. 29A and its related "structural detail inset" focus on showing the induced "reverse" air flow being deflected and guided by the simple Wall Shaping 150 on Sidewall 143 of Front Wall 140 of the Deployed MAP 139. The direction for the internal flow of the subject gas within the MAP is indicated by Air/Gas Flow Arrows 200. The wall shaping also importantly outlines a gas inlet orifice in the form of Gas Passageway 148 that provides a lateral entryway for the pulled gas sample to be drawn into, up through, and directly out the top of the Deployed MAP 139 or indirectly out through the top of Disposable Mouthpiece 184 of FIG. 29B.

FIG. 29B shows a see through End View 109 of the Disposable Mouthpiece 184 while telescoping over both the Deployed MAP 139 and the Case Lid 132. Arrows 200 relate the "reverse" air flow detail as it is pulled upward by the mouth of the user. The induced flow of air enters laterally at the base of the Deployed MAP 139 through an integral Gas Passageway 148 where it is immediately deflected by internal Wall Shaping 150 causing the air flow to turn vertically and travel upward and out of the top of the Mouthpiece Portion 186 of the Disposable Mouthpiece 184.

FIG. 30 shows a Case Back Side 104 and Top 106 perspective view of a Protective Phone Case 100 and a Deployed MAP 139 that illustrates a health related embodiment in the form of a Spirometer Blow/Pull System 207 that exercises the lungs through resistive air flow while measuring lung capacity. This arrangement employs a bi-directional "Push/Pull" capability for giving the lungs a workout while inducing, guiding, measuring, and/or analyzing the flow of air across in-line air/gas sensor(s) to obtain data to chart relative lung health for improvement, regression, or a state of stability.

Arrows 200 indicate the air flow pattern for a bi-directional flow of air between the user and a Resistive Balloon 208 of the Spirometer Blow/Pull System 207. The degree of balloon inflation provides visual impetus and motivation for exercising the lungs as the user is provided with simple but accurate feedback on their day to day capability to inflate the balloon to a maximum volume per a single breath whereby they receive instantaneous visual results that they can compare to previous efforts. The user will receive not only visual feedback but will be supplemented with computer data such as relative lung volume, rates of inflation, breath composition, and any other lung health parameters desired to be tracked by the computer application programming.

Setting up and accessing the Spirometer Blow/Pull System 207 is as simple as plugging in an Air Vent Hole Adapter 206 that remains attached to the Resistive Balloon 208 so that both adapter and balloon are installed simultaneously through their mutual insertion and twist locking of the adapter within the Air Vent Hole 205 centered within Air Vent Cluster 130 integral to the Case Top Portion 101. Alternative to use of the Resistive Balloon 208 and Air Vent Hole Adapter 206, the user may exert their breath efforts directly upon the top of the MAP or upon the Disposable Mouthpiece 184 so that the air flows back and forth over the Gas Analysis Sensor 119 and directly in and out of the unobstructed opening of the Air Vent Hole/Cluster venting combination whereby the entirety of the inhale/exhale cycles can be tracked and have data produced for daily, weekly, monthly charting and/or storage within memory.

Any device or devices, electrical or non-electrical, present or future, that would benefit from a defined but adaptable arrangement of bi-directional air flow passages whose flow enters the case and passes through the confluences of the Multi-Applications Platform to once again exit the case and whose forced flow has been mechanically or humanly induced so as to as measure or otherwise analyze the qualities of that air or gas, are potential hardware applications to be situated upon and pass through the convolution of airways formed within the deployable Multi-Applications Platform and any contributing adjacent structures or containment bays atop the protective phone case.

In FIG. 31A, a Case Back Side 104 and Top 106 perspective view of a Protective Phone Case 100 with a Deployed MAP 139 are shown for an embodiment of an Electronic Vaporizer and/or Nebulizer Inhalant System 244 device arrangement that incorporates a reverse air flow pathway. The reverse air flow pattern inherent to this embodiment is similar to that illustrated in FIG. 28A other than the Air Vent Cluster 130 integrally located upon the surface of the Case Top Portion 101 requires selective shut off capability by a closure device while employing the vaporizer/nebulizer inhalant usage option.

The Electronic Vaporizer or Nebulizer Inhalant System 244 of this invention occupies both the top and bottom portions of the case. A "reverse" flow of air/vapor is stimulated by the mouth of the user causing air to be drawn into the Electronic Vaporizer or Nebulizer Inhalant System 244 through Air Inlet 246 and through a Reservoir 247 in the Case Bottom Portion 102 where it continues its upward travel along and through an exactingly guided path where it exits either directly out of the Case Top Portion 101 through the top of the Deployed MAP 139 or alternatively out the top of the cooperative over fit of Disposable Mouthpiece 184.

FIG. 31B specifically illustrates use of the Multi-Use Gaseous Funnel 187, cooperative Air Tubing 189, and a Therapeutic Mask 256 to be worn over the face of a person receiving a nebulizer treatment.

Viewing FIGS. 31A and 31B, the prescribed medicinal therapeutic formula, water/medicinal mix, or simple warmed water for humidifying, is filled/loaded within Reservoir 247 where it is heated into steam or a medicinal laden vapor and/or is pumped, pressurized, or otherwise converted into an atomized small particulate therapeutic spray. To provide additional medicinal volume and treatment capacity for the nebulizer system, the Reservoir Fill Lid 248 may be removed through Case Cutout 178 whereby a supplemental reservoir in the form of an Exterior Reservoir Expansion Tank 249 or bottle may be directly attached to the inlet of the case's onboard interior Reservoir 247 via a quick 90 degree twist of a Fill and Attachment Flange 250 integral to the supplemental expansion tank. A leak proof attachment is achieved between the Reservoir 247 and the Exterior Reservoir Expansion Tank 249 through use of an intermediary elastomeric seal such as an O-ring or other quick attachment and seal combination common to the art.

It is also to be recognized that the supplemental Exterior Reservoir Expansion Tank 249 may be of any size or shape and/or may be of a collapsible construction for convenience in carry/storage. It's integral connective Flange 250 may be centered or offset to the inlet of the supplemental tank in order to best accommodate the needs for the nebulizer system while maintaining unobtrusive positioning yet quality esthetics for conforming to the Case Back Side 104 while being temporarily coupled to Reservoir 247 that is stationed within its storage module within the interior of the Case Bottom Portion 102 of the Protective Phone Case Platform 100. Since the nebulizer patient is normally using and browsing their phone in order to occupy their time during the therapeutic treatment period, the balance, comfort, and backside of the case feel while holding the phone/case unit must remain a priority design commitment.

Specific to the nebulizer system, a Pump 190 draws replacement air in through Air Inlet 246 and forces the heated or atomized vapor within Reservoir 247 to pass from the Case Bottom Portion 102 into the Case Top Portion 101 via its respective flow through Lower and Upper Telescoping Tubes 253 and 254. The therapeutic vapor flow then makes a lateral turn where it passes into and through the Deployed MAP 139 and out of the over fitting Multi-Use Gaseous Funnel 187 via the Tubing Attachment Nipple 188 and the interconnected Tubing 189 whereby the medicinal mixture reaches the Therapeutic Mask 256 worn by the recipient patient.

In FIGS. 32A and 32B, views of the Vaporizer or Nebulizer Inhaled Air Flow Configuration and Detail 245 are shown that demonstrate and detail the reverse air flow pathways specific to the Electronic Vaporizer and/or Nebulizer Inhalant System 244 and the related physical construction for the Deployed Multi-Applications Platform 139.

FIG. 32A, and related inset, show structural detail and guidance for the "reverse" flow of air/vapor as it enters the case at the air inlet in the case bottom portion and exits directly out the top portion of the case through the MAP top.

FIG. 32B shows a see through end view of the Disposable Mouthpiece 184 that telescopes over the MAP and the related "reverse" air/vapor flow detail and the alternate "top of the cover" mouthpiece exit point. Alternate to using the over fitting Disposable Mouthpiece 184 as the MAP cover of choice is the use of the Multi-Use Gaseous Funnel 187 with its Tubing Attachment Nipple 188 as the gas flow exit point.

Viewing FIGS. 32A and 32B, a storage module integral to the case bottom portion is outfitted internally with a customized containment bay that provides specialized housing for a portion of the Electronic Vaporizer or Nebulizer Inhalant System 244 of this invention. Since detail was just provided for nebulizer use and function in FIGS. 31A and 31B, description will now be given for a personal pleasure inhalant system, such as for an electronic cigarette, which conventionally is known as vaping.

A Reservoir 247 and related vaporizer structures are centered within the containment bay over a Case Cutout 178 prepared within the floor of the containment bay that provides access to the Back Side 104 exterior surface of the Case Bottom Portion 102 for convenient filling of the reservoir. Reservoir 247 may hold an inhalant, medicinal, or other formula but in this case a formula specific to an electronic cigarette is utilized. The reservoir is fitted with a Reservoir Fill Lid 248 that is installed and removed from within Case Cutout 178 by the user from the case exterior. Reservoir 247 is further equipped with an Air Inlet 246, a Heating Element 251 with accompanying Electrical Interface Terminals 252, and a Lower Telescoping Vapor Flow Tube 253. The upper end of the Lower Telescoping Vapor Flow Tube 253 exits out of its containment bay and passes through the Top End Wall 163 of the Case Bottom Portion 102 where its terminal end extends a short distance from the surface of Top End Wall 163.

The Case Top Portion 101 has an Upper Telescoping Vapor Flow Tube 254 that fits within a through hole that forms an Upper Gas Passageway 255 integral to Gas Analyzer Housing 120. The extended end of the Lower Telescoping Vapor Flow Tube 253 has a cooperative alignment and size to telescope within the Upper Telescoping Vapor Flow Tube 254 as the Top 101 and Bottom 102 Case Portions are moved toward each other during their assembly around the newly encased Mobile Phone 105. The lower and upper vapor tubes are now in a linked telescopic connection that ensures a proper passage and flow of air from the Air Inlet 246 in the Case Bottom Portion 102 to and out of the terminal top end of the Upper Telescoping Vapor Tube 254 of the Case Top Portion 101.

The top end of the upper vapor tube terminates at the upper end of the Gas Analyzer Housing 120 that lies in direct parallel with the lateral lying Gas Passageway 148 of the Deployed MAP 139. With the completion of full case assembly around the phone, the system has been placed in a state of full air flow connectivity that ensures an air tight passageway has been formed from the Air Inlet 246 of the Reservoir 247 at the bottom end of the system to the very top end where the user will place their lips directly upon the Deployed MAP 139 to stimulate a drawing action upon the vapor/inhaler system.

As the user turns on the system and energizes the Interface Terminals 252 of the system Heating Element 251, he or she then places their lips either directly upon the top of the Deployed MAP 139 or alternatively upon the Disposable Mouthpiece 184 whereby they exert a draw upon the air tight system. This creates a negative pulling action that causes air to enter the Air Inlet 246 where it passes through the Reservoir 247 that contains the vaporized inhalant due to the heating action of the energized Heating Elements 251. The aerosol, liquid and/or solid particulate suspension, vapor exits the Reservoir 247 via the Lower Vapor Tube 253 and continues its flow through the telescopic inter connection with the Upper Vapor Tube 254 where the flow turns laterally as it is drawn through the Slot 127 of Guiding Plane Wall 126 and thereby reaches the adjacent Gas Passageway 148 of the Deployed MAP 139 and is deflected upward by the Wall Shaping 150 shown in FIG. 32A where it exits the top of MAP 137 through Mouthpiece Portion 186 and directly reaches the lips and mouth of the user during vaping or indirectly reaches a nebulizer patient via gaseous Tubing 189 interconnected to a Therapeutic Mask 256.

The device arrangement just described for vaping should not preclude use of Pump 190 to assist or boost the vapor flow however it is primarily described as not being needed, other than for nebulizer or other forced air flow usage, since a great deal of the pleasure derived from vaping is the user experience received from drawing upon the device.

FIGS. 33A-33C depict embodiments of a closure cover for the Air Vent Cluster 130 that utilizes either an Exterior Air Vent Closure Cover 258 or a preferred Interior Air Vent Closure Cover 257. FIG. 33D shows an alternate design for the Exterior Air Vent Closure Cover 258 comprising a Multi-Position Air Vent Closure Cover System 259 that covers either an Air Vent Cluster 130 and/or an Air Vent Hole 205 and dictates the open or closed positions for the alternate air venting arrangement integral to Case Top Portion 101. The generally four position design closure cover is needed when the Air Vent Cluster 130 is physically located adjacent to but separate from the Air Vent Hole 205 instead of the arrangement exampled in FIGS. 28,29, and 30 where the vent hole is centered within the vent cluster. The Multi-Position Air Vent Closure Cover System 259 facilitates universal operability for the in and/or out gas flow travel requirements of FIGS. 26-30, the gas flow shut off capability requirements of FIGS. 31-32, and the gas flow interconnectivity to air tubing or other independent air equipment/devices requiring a vent hole as depicted in FIGS. 28 and 30. A specialized Air Vent Hole Adapter 206 is designed with the capability to connect to independent air devices on one end while the remaining end has a cooperative fit within the Air Vent Hole 205 of a design that generally employs either a friction based fit or a twist lock design known to the art.

FIG. 33A shows an Open Vent Cluster Position 260 for both an Interior 257 and Exterior 258 closure cover that permits a user induced "forward flowing column" of forced air to be "blown" directly into the top of the MAP as depicted in FIG. 27A, or alternatively upon the disposable mouthpiece shown in FIG. 27B, where it freely exits the side of the Case Top Portion 101 via Vent Cluster 130 as indicated by Arrows 200.

FIG. 33B also shows Open Vent Cluster Positions 260 for both an interior and exterior closure cover that permits a "reverse flowing column" of forced ambient air sample to be "pulled" and freely enter the Case Top Portion 101 via Vent Cluster 130 where it is deflected upward within the MAP and exits directly out its top in response to the user placing a mouth induced drawing action directly upon the MAP or, alternatively, upon the disposable mouthpiece of FIG. 28A or by mechanical inducement as depicted in FIGS. 28B and 28C.

FIG. 33C shows a Closed Position 263 for both an interior and exterior closure cover that by blocking and preventing any air flow through the Air Vent Cluster 130 from occurring, forces ambient air to be "pulled" in through an Air Inlet 246 of the Vaporizer/Nebulizer Inhalant Device 244 when the user's lips draw directly upon the MAP in FIG. 32A or, alternatively, upon the disposable mouthpiece depicted in FIG. 32B.

FIG. 33D employs an Exterior 258 version of a Multi-Position Air Vent Closure Cover System 259 that is configured for four positional selection and rotation between either an Open Vent Cluster Only Position 260, an Open Vent Cluster and/or Vent Hole 261 together position, an Open Vent Hole Only 262 position, and a totally Closed Position 263 that blocks the Vent Multi-Position Air Vent Closure Cover System 259 for both the Cluster 130 and the Vent Hole 205. The Multi-Position Air Vent Closure Cover System 259 arrangement facilitates interchangeable use and operability between all of the gas/air conveyance systems of this invention upon and from the very same Multi-Applications Platform 137.

It is requested to be understood that any of the closure cover drawings for the venting arrangements exampled in the blow, the pull, the spirometer blow/pull, or the vaporizer/nebulizer inhalant options, may require or be better served with concurrent use of the disposable mouthpiece and/or the multi-use gaseous funnel although neither are pictured in any of the drawings shown in FIGS. 33A-D.

It should also be understood that alternative to any of the preceding descriptions or future iterations of various gas/air flow appliances and arrangements that human breath, ambient air, and/or other sourcing of a gas or air may be interchangeably introduced or exited directly from the "MAP or the MAP disposable mouthpiece end" of the system or from the "case venting end" of the bi-directional air flow system.

FIGS. 34A and 34B illustrate an improvement disposed in the bottom recess of the Gas Analysis Bay 118 in the form of a Whistle System 278 for alerting others as to current location, a state of endangerment or emergency, or sounding a call for help by the phone owner/user. Alternatively, the whistle may be used as a device of general random purpose or as a pet or animal call.

FIG. 34A is a Case Front Side 103 perspective view of the Case Top Portion 101 displaying Vacant Containment Bays 191 and a Case Phone Bed 113 that appears in natural solid form that thereby blocks interior viewing of the underlying containment bays and in particular, Gas Analysis Bay 118. FIG. 34A is mostly included in the drawings for location and visualization of the enclosed and hidden nature of the proposed whistle device. It also illustrates the rectangular open ended Gas Analysis Bay 118 and identifies the five wall surfaces that comprise and form its rectangular inner cavity:
The inward facing surface of Outer Alignment and Connection Rail 111
The inward facing surface of the Guiding Plane Wall 126
The inward facing surface of Case Phone Bed 113
The inward facing surface of Case Back Side 104
The inward facing surface of Top Wall 129 that forms the bottom end of the bay that opposes the bay's open end.

FIG. 34B shows the wall that comprises Case Phone Bed 113 as being transparent or having been removed so as to provide visual access to the underlying molded body of the whistle that will be formed during manufacture of the case itself as a structure that integrally projects from the inner surface of Top 129 wall at the very bottom of Gas Analysis Bay 118. As it name indicates, the opposing exterior surface of that wall forms the Top 129 surface at the uppermost end of Case Top Portion 101.

There are two main structural components comprising Whistle Device 278. A larger semi-circular portion comprising a Whistle Casing 285 is molded as integrally projecting portions from three different wall surfaces that form part of the interior of Gas Analysis Bay 118. Those walls are identified as the inward facing surface of Guiding Plane Wall 126, the inward facing surface of the wall comprising the Case Back Side 104, and the inward facing surface of the Top Wall 129. The second structural component is a Whistle Top 279 that is integrally molded as part of the inward facing surface of Case Phone Bed 113 in combination with the inward facing surface of Top Wall 129 where it shares common molding and surface projection with Whistle Casing 285. In all instances concerning FIG. 34B, the term "inward facing surface" is meant as inward facing in relation to facing the interior of Gas Analysis Bay 118.

Whistle Top 279 and Whistle Casing 285 are particularly spaced as to form a partial circular formation between themselves that leaves two spatial gaps in their combined circular shape. The first gap is stepped and forms an Air Inducement Aperture 280 while the remaining gap forms an Air Exit Slot 283 that aligns with the Air Vent Cluster 130 that permits a forced flow of air to exit the Gas Analysis Bay 118 and Case Top Portion 101. The front side of the circular moldings, opposite to their back wall formed from the inner surface of Top Wall 129, remains open in the front and is not closed by any mutual integral moldings. Instead the front side of Whistle 278 is closed and sealed in an airtight manner by full insertion of the Gas Analysis Housing 120 within Gas Analysis Bay 118 thereby forming an Airtight Plug 121.

A Bottom End Wall 286 of the Gas Analysis Housing 120 seats and abuts against the combined circular front edges of Whistle Top 279 and Whistle Casing 285 that share in common molding and projection from the inward facing surface of the Top Wall 129. Insertion of the Gas Analysis Housing 120 is preceded by placing a Resonating Ball/Pea 282 within a Resonating Chamber 281 that is a natural circular formation within the center of the two circular moldings.

Upon insertion of the Gas Analysis Housing 120 in combination with its forward facing Gas Analysis Sensor 119, the gas sensor aligns with and is inserted, indicted by Directional Arrows 110, within the very center of the circular moldings which is suitably called Resonating Chamber Center 284. Upon its full insertion, the Bottom End Wall 286 of the Gas Analyzer Housing 120 seals against the edges of the whistle in combination with forming an Airtight Plug 121 for the Gas Analysis Bay 118 that thereby creates an airtight recess behind the Airtight Plug 121 which Whistle System 278 occupies. All user forced air blown in the top of the MAP must now follow an exactingly defined air passageway and path that must pass through the confines of the whistle and exit the side of the Case Top Portion via Air Cluster 130. This assembled arrangement for Whistle 278 still permits analogous usage of the system as both a gas analyzer in combination with an alerting whistle.

The user blows a forced column of air through the top of the Deployed MAP 139 whereby it laterally exits its bottom through its Aligned and Open Gas Passageway 155 where it travels through its alignment with the Guiding Plane Slot 127 and is funneled into its integral attachment with the whistle's Air Inducement Aperture 280 where it continues to forcefully travel forward in a focused stream of air entering Resonating Chamber 281 causing the Resonating Ball 282 to vibrate vigorously and spin around the center positioning of Gas Analysis Sensor 119 before it exits the whistle via Air Exit Slot 283 in alignment and airtight communication with Air Vent Cluster 130 whereby the air flow makes final exit out the side of Case Top Portion 101. It is thereby put forth that Gas Analysis Bay 118 houses, accommodates, forms, affixes, and/or comprises a non-electrical whistle device powered by human breath.

It is to be understood that with the inclusion of the inline molded disposition of the air operated whistle device that the air flow patterns and related functions of any of the other previously described single or bi-directional air flow devices and arrangements are still fully operative as their various air flow patterns and directions may still pass through the whistle device without restriction or ill affect. Full compatibility and cross usage between any of the air/gas systems with each other or the whistle either already exist as described or can be accomplished through adaptation in congruence with the desires of the user.

Unique to this invention, the device arrangements for both the Whistle and the single EMV card depicted in FIG. 25 are two different applications with totally unrelated functions and desired outcomes which are examples of non-electrical applications that can be utilized and operated upon or within the upper portion of the case while that upper portion is placed in a "detached state and status" from its normal union with the phone and the lower case without negative effect since neither of those applications rely upon maintaining electrical interconnection with the system in order to function.

FIGS. 35A and 35B collectively show an embodiment for a personal security and protective device in the form of an Electroshock Stun Gun System 287 having an Electrode Pair(s) 288 that are disposed upon Walls 140 and 141 of the Deployed Multi-Applications Platform 139 whereby the pair of electrodes can be deployed, activated, and discharged against the body of a hostile or otherwise aggressive person or animal to repel an endangering attack.

FIG. 35A is a Case Back Side 104/Top 106 perspective view of the Deployed Multi-Applications Platform 139 and the Electrode Pair 288.

FIG. 35B is a Case End 109/Top 106 perspective view of the electrodes and the air gap formed between the electrode pair or pairs. The width of the air gap is similar to the distance between the two walls of the deployed platform upon which the electrodes are integrally disposed.

Viewing FIGS. 35A and 35B, in tandem with user selecting the stun gun icon from the phone menu, the deployable MAP is provided with a positional switch that would turn on and energize the stun gun system immediately upon the MAP being fully deployed. This MAP positional switch could also be utilized to control the on/off electrical connection for any other MAP related electrical feature or program that is desired to be turned on/off in conjunction with user deployment of the MAP.

Upon the user encountering a potential attack and recognizing that a person or animal is in such a state of aggression that they cannot be dissuaded from further hostile advancement, the Thumb Pad Drive 134 of the Case Top Portion 101 may be quickly driven upwards and locked whereby the Multi-Applications Platform 137 becomes fully deployed.

The two walls 140 and 141 that comprise the Deployed Multi-Applications Platform 139 each carry an Electrode Pair 288 disposed upon their top corners. The thumb of the user is maintained upon the Thumb Pad Drive 134 whereby they can shove the prominently exposed Electrode Pairs 288 of the Electroshock Stun Gun System 287 device against the body of an attacker and selectively discharge a high voltage Electrical Arc 289 across the air gap of the device for whatever duration and frequency needed as to repel the attack.

FIGS. 36A-36F illustrate arrangements for a case borne Electrical Multi-Meter System 290 and related independent device(s) that are to be used for the measurement and analysis of electrical circuitry.

FIG. 36A shows a Case Back Side 104 and Top 106 perspective view of a two piece Protective Phone Case 100 having a Deployed Multi-Applications Platform 139 that is equipped with a set of Wire Test Leads 291. The wired probe sets possess a permanently extended and Affixed 292 position for their pinpoint probe conductors located at the end of each test lead. The wired probe set is connected via Attachment Interface 293 points to Electrode Pairs 288 disposed upon the top corners of Front Wall 140 and Back Wall 141 that comprise part of the card reader substructure of MAP 137. Alternative to connection to the electrode pair, the set of wired test probes may be directly connected to a Jack Pair 311 interface upon the Case Back Side 104 or beneath a Phone Viewing Stand Leg 302.

Also illustrated in FIG. 36A are a pair of unique standalone Test Probes 294 that are housed by a novel storage system within the Case Top Portion 101. The independent Test Probes 294 are equipped with Deployable 295/Retractable 296 Pinpoint Test Ends that are housed internally within a Test Probe End Compartment 297 at one end of the probe body while a Battery/Hardware Compartment 298 is provided within the opposing end to house the probe power source and related wireless operative hardware.

In order to provide a protected storage arrangement for the test probes that is endowed with highly convenient user access, the vertical depth available within the Top Case Portion 101 is advantageously used to form housing for the at least two probes by locating a pair of bottomless Storage Columns 299 alongside and adjacent to both sides of the Case Camera Cutout 176.

Upon the user completing a circuit testing task, the bodies of the test probes may be placed within the custom Case Storage Columns 299 within the top portion of the case for quick and easy transference between storage and retrieval for either the wired or wireless versions of the test probes.

In order to facilitate probe removal, FIG. 36A also details a unique redesign and use of a Phone Viewing Stand Leg Arrangement 302. The conventional function for the opening and angling of the deployable viewing stand leg as a prop for the phone that permits the user to enjoy hands free observance of the phone's display screen is still available from the Case Back Side 104. However, a novel addition is included where a practical manual ejection system for removing the stored probes from their housing alongside the camera cutout is made possible without requiring tools or any case disassembly or separation of the top and bottom portions of the two piece case system in order to access and remove the probes. Directly beneath the viewing stand leg is a long Depression 304 that permits the surface of the leg to remain flush with the back of the case while the leg remains closed. This depression is integral to the new arrangement whereupon anytime the Viewing Stand Leg 302 is opened it exposes Dual Ejection Cavities 305 that are cut into the bottom of Depression 304. Also, an alternate location for the previously described Jack Pair 311 may be situated within this depression below the viewing stand leg.

The bodies of the wireless probes are strategically designed with a length that is longer than the depth of the thru-hole Storage Columns 299 in which they are to be housed. Upon insertion of test probe bodies within the bottomless columns, the top ends of the test probes are precisely positioned vertically within their respective columns by Probe Vertical Stops 300 that also seal the tops of the probes flush with the Top 129 of the case. Since the probes are longer than the depth of the bottomless columns, their respective bottom ends extend a short distance beyond the Bottom End Wall 158 of the Case Top Portion 101. When the Case Top Portion 101 is closed over the Mobile Phone 105 to the point of abutting with the Case Bottom Portion 102, the Extended Bottoms 301 of the two stored probes pass through Aligned Thru-Holes 306 located upon the Top End Wall 163 of the Bottom Case Portion 102 where they enter Dual Ejection Cavities 305 located beneath the Phone Viewing Stand Leg 302.

In conjunction with the user's desire to extract and use the probes, the viewing stand leg is flipped opened by use of a fingernail within Fingernail Concavity 303. The Extended Bottom Ends 301 of the individual probes are now exposed and can be manually shifted upward out of their ejection cavities. The opposing top ends of the probes reciprocally shift into Partially Ejected 307 positions that extend a short distance from the Top 129 surface of the case whereby they can be easily grasped and removed by the user. With the probes now in hand, the user can force the Thumb Pad Drive 134 of the respective probes upward along Guidance Tracks 136 resulting in an Deployed Test Probe Pinpoint End 295 that can immediately be utilized for circuit testing upon the probes being energized and the related software programming initiated and run.

The just described probe storage arrangement is primarily centered upon use of a wireless pair of circuit testing probes. However description will now be given for a wired version that will be stored and extracted in identical fashion from the same Storage Columns 299 but has additional structure and equipment provided underneath the Phone Viewing Stand Leg 302.

Within the Depression 304 below Phone Viewing Stand Leg 302, a Wire Storage Spool 308 is provided that is partially housed within a hole adjacent to Fingernail Concavity 303 that is particularly centered between the two Ejection Cavities 305. The preferred embodiment of the spool has dual stacked reels that each carries a supply of insulated Recoilable Wiring 309. One end of the wiring maintains electrical connection with the rotatable spool which maintains electrical continuity through a rotor/stator arrangement, or through other rotating electrical means known to the art. Continuity between the stator and the encased Mobile Phone 105 is established at a circuit board that interconnects with the nearby conductors disposed within the Case Retentive Slot 164 or the Multi-Conductor Ribbon 166.

The remaining opposing ends of the two wire coils laterally enter the Ejection Cavities 305 where their respective Recoilable Wires 309 attach directly to the Extended Ends 301 of the two Test Probes 294 that pass through the Top End Wall 163 of the Case Bottom Portion 102. The probes remain stored within Columns 299 until they are needed and thereby ejected and removed from the Case Top Portion 101. As the wired probes are removed from the case, Wires 309 uncoil from Wire Storage Spool 308 until reaching a fully extended distance whereby their circuit testing capability may be employed. Upon completion of the circuit testing task the Wired Test Probes 294 can be retrieved back within their respective Probe Storage Columns 299 through hand rotation of a Positionable/Stowable Spool Handle 310 on the top of the Wire Storage Spool 308. The open Phone Viewing Stand Leg 302 that was previously set to view the display screen of the phone while conducting the circuit testing task may now be closed.

FIGS. 36B-36F illustrate a wireless probe with an extendable pinpoint end that builds upon the basic form and construction of the Sliding Gas Retention Sidewall 151 introduced in FIGS. 5A and 5B and whose operation and function was detailed in FIGS. 6A-11A, 6B-11B, and 6C-11C. FIGS. 36B-36F detail step by step depictions of a MAP Wireless Test Probe System 312 for storage and retrieval for the electrical probes respectively within and from the Multi-Applications Platform 137 of the two-piece Protective Phone Case 100.

FIG. 36B shows end views of two SGRS 151 Wireless Test Probes 313 that illustrate Deployed 295 and Retracted 296 Test Probe Pinpoint Ends that are selectively moved by a Thumb Pad Drive 134 traveling within Guidance Tracks 136 of a user initiated positioning system. An end view of the Multi-Applications Platform 137 is shown as being in a Retracted 138 state within its Guidance Tunnel 211 that currently has a fully open position for the Double Lids 213 and the Hatch 131 at the Top 129 of the Case Top Portion 101.

The SGRS Test Probe Body 313 having the Retracted Probe 296 is shown in alignment with the top of the Retracted MAP 138 and is thereby prepared to be inserted down through the open Hatch 131 and into Tracks 152 integral to Front Wall 140 and Back Wall 141 of the Retracted MAP 138. The probe is pushed further downward until passing into and out of Thru-Hole 315 integral to the Top End Wall 163 of the Case Bottom Portion 102 until bottoming out within the end of the Ejection Cavity 305 that reciprocally brings the top of the probe flush with the top of Retracted MAP 138. The case double lid can now be closed thereby safely storing both the Retracted MAP 138 and the stored probes it encloses.

FIG. 36C shows a cut away Side View 108 of an abbreviated Retracted MAP 138 where only Sidewall 143 of Front Wall 140 is shown for simplicity and better interior visualization. It should be understood that the two stored probe bodies are analogous with and still function as sliding gas retention walls whose construction and function have been thoroughly detailed previously. The Extended Ends 301 of the Stored Test Probes 314 are shown as having being received within the Ejection Cavities 305 of the Cases Bottom Portion 102 beneath the Viewing Stand Leg 302 that is partially depicted in a cut away sectional view.

FIG. 36D shows the ejection process having begun where a finger of the user can be used to displace the Extended Ends 301 of the probes and propel them upward a short distance to the point of being flush with the bottom surface of the Top End Wall 163 of the case's Bottom Portion 102. At the opposing top end of Front Wall 140 of Retracted MAP 138, the tops of the two SGRS Test Probes 313 are now shown as having been Partially Ejected 307 above the MAP enabling easy grasping by the user for removal.

FIG. 36E shows the two SGRS Test Probes 313 having been totally withdrawn from the MAP and their Thumb Pad Drives 134 moved upward whereby the now Deployed Test Probe Pinpoint Ends 295 are positioned in a manner consistent with use for conducting electrical testing and circuit analysis. Upon the probes no longer being needed for further testing, their Thumb Pads 134 can be driven downward Retracting 296 the previously extended pinpoint tops of the probes back within the Probe End Storage Compartment 297. The two wireless SGRS Test Probes 313 can now be re-aligned, inserted, and stored back within their respective Tracks 152 within the Deployed MAP 139. With the SGRS Test Probes 313 safely stored, the MAP is Retracted 138 back into protected storage within its Guidance Tunnel 211 and the Double Lids 213 closed over the Hatch 131 until the probes are needed again or MAP 137 is required for other analogous use or function.

FIG. 36F is a cutout sectional backside view of the Thru-Hole 315 arrangement that is integrally disposed upon the Top End Wall 163 of the Case Bottom Portion 102 that aligns with the SGRS Test Probes 313 utilized within the Multi-Applications Platform 137. The sectional drawing is only included to show the 180 degree flip in the horizontal orientation required for the Viewing Stand Leg 302, the Depression 304, and the Ejection Cavities 305 in order to have alignment with the Multi-Applications Platform 137 and be capable of servicing the SGRS Test Probe 313 arrangement that is located on the opposite side of the case. It is to be understood that a choice is to be made between utilizing the Wireless Test Probe 294 arrangement that is to be housed within Columns 299 and Ejected from Thru-Holes 306 or to utilize the SGRS Wireless Test Probe 313 arrangement that is housed within the MAP 137 and Ejected from Thru-Holes 315. Only one set of probes is needed for the circuit tester embodiment and thereby the drawings are meant as description for alternate systems where one arrangement or the other is to be employed, not both.

Conclusion has been reached for description of the drawings and illustrations for various computer functions and tasks that may be run and operated from the deployable structure of this invention however it is requested to be understood that other computer applications, existing and future, may be compatible candidates to be deployed and operated from said deployable structure. It is also to be recognized that the drawings are not to scale with some being abbreviated in some manner and are meant as to be representative only whereby a great amount of latitude is provided for their inter-use, compatibility, and non-specific interpretation.

It is thereby declared that the drawings and specification of this invention offer wide-ranging, although not totally comprehensive, partial illustration and description of Multi-Applications Platform 137 that is disposed and selectively operated from the protective phone case. The MAP is comprised of the generally stationary substructure of the gas analyzer housing in combination with the generally deployable substructure of the card reader housing and adjacent front and back wall components and all other related and/or associated supportive structures, devices, and device usages that are collectively housed and/or deployed respectively on and from the phone protective case platform.

In addition, upon completing mutual case/phone assembly, the establishment of an instantaneous and all inclusive state of electrical interconnectivity between the protective case and the mobile phone importantly permits and enables case design options that make full use of whatever "security" medium and method of owner recognition that were selected and included by the phone manufacturer for inherent use upon that particular make and model of phone. Whether it be fingerprint matching with a touch ID sensor or iris scanning that are popularly initiated from the home button on some phones, these enhanced techniques and methods for positively establishing the identity of the current operator of the phone as being the valid owner/authorized user are beneficial to enhancing security for the overall phone/case union. That protective "proof of identity" benefit is intended to be fully used to best practice by this invention in relation to restricting use of the case's entire proximate hardware package, and in particular the Multi-Applications Platform, for the exclusive operation by either the owner or a select list of users that are authorized by that owner.

Full case communication with the phone's inherent ID method adds a significant deterrent to help prevent unauthorized usage of the assets of the phone/case combination, or any of their mutual contents, should they be lost, stolen, tampered with, or should other illegitimate alteration or usage be calculated or attempted.

Also, since the assets of the case include a gaseous analysis system capable of determining the blood alcohol level of the phone user and since the case is also in full communication and with the underlying phone's method for establishing the personal identification of the phone user as being the authorized owner/user, a unique opportunity exists for configuring the case/phone unit to be a significant aide in the prevention of Driving Under the Influence (DUI) or Driving While Intoxicated (DWI). The vehicle and case/phone may be configured so as to require the passage of a blood alcohol testing cycle immediately before starting the vehicle registered to the authorized phone owner. A testing showing a safe blood alcohol level would permit immediate access to starting the vehicle while failure would place a time period for the blocked status to remain in effect until undergoing and passage of a new blood alcohol test that would only be allowed after the expiration of a preset time interval in accordance with the phone's programming. Passage of the blood/alcohol test would be required before each instance of starting the vehicle.

It is a program of intentional inconvenience to be placed upon past or persistent offenders of drunken driving until their probation is lifted or otherwise expires. Severe penalties would be in effect for the probational driver whom is found driving any vehicle other than the one for which they are duly registered to operate. It could also be a program that newly licensed drivers are placed under by their parents or guardians. The parent would have the capability to utilize their phone to set, change, or remove the code governing the blocking action at their discretion or in the event of an emergency. Importantly, all instances of blood/alcohol testing would be documented in a logged phone record showing the specific alcohol content level of each test that would be available for anytime review by that parent or guardian.

The system would initiate and function through the authorized user of the case/phone unit first being properly identified whereby the phone would then communicate wirelessly with an ignition switching device in relay of the pass or fail outcome of the blood alcohol test. This wireless ignition device would be already existent in newer cars as original equipment, or would plug into the OBD port as an independent device, or be installed on or near the ignition as a secondary market retrofit device for any vehicle regardless of make and model. Keyless entry, remote starting, and vehicle theft prevention safeguards may also be included and implemented under the limiting auspices of only verified authorized users.

Not only is the security of the case/phone union enhanced by employing the assets of this invention but the personal security of the user is also improved by employing some of the different types of electrical and/or non-electrical proximate hardware combinations that can be stored and deployed by and from the novel Multi-Applications Platform(s). Since the MAP is generally mounted within the top portion of the case, the security measures it carries can be conveniently accessed, handily activated, readily manipulated, and expediently utilized directly against threats or for quickly sounding an "at risk" alert and call for help.

The definitive meaning inferred for the term "Protective Case Platform" is inclusive of being protective from an "everyday usage" standpoint by limiting physical damage to both the case and/or the phone it encloses; from a case component protective standpoint by providing a safe base upon the case for housing Proximate Hardware and its consequent deployment and return to storage; from an unauthorized user security standpoint by preventing operation of the phone/case unit by persons other than the owner themself or their assigns; from a personal well being standpoint by being protective of the user through detection of harmful user environmental concerns or dangers and the relay or sounding of alarms; and in a general "all encompassing manner" by offering protection and aid toward the maintenance of any and all of the phone/case unit in a consistently operative and constantly available status while being protective of the physical platforms and structures of each as well as all of the components they carry independently and/or in combination while limiting operation to the rightful owner/users and being protective of their personal well being, security, and enjoyment of the combined assets of this novel case/phone union.

In the instance of phones where the manufacturer mounts their cameras centrally, the corresponding centrally located camera cutouts for the case that encloses the phone would require an alternate configuration and location for the containment bays for both the credit card reader and the gas analysis that would employ a lateral air passageway between them located adjacent to the camera cutout of the case. The creation of a lateral air passageway(s) would potentially benefit from leaving the location of the retentive flange at its current middle positioning since the case camera cutout apron is also centered as an integral part of the centrally located phone camera.

For mobile phones of a smaller size that are enclosed within a smaller protective case, the inclusion and usage of a Multi-Applications Platform is still viable and realistic from the standpoint that the width of the MAP can be reduced since its primary limiting factor is having sufficient width to laterally swipe the magnetic stripe of a credit card. With use of the EMV chip having become universally adopted and with its compatibility for being read by the MAP through a user initiated vertical dip of the EMV chip within the MAP, the MAP width may be reduced to accommodate smaller case/phone units. Also, none of the bi-directional gas/air applications or other described embodiments and features described and illustrated within this specification and the drawings would be negatively affected by a reduced width MAP. Finally, any vital or supportive hardware that cannot be fitted or otherwise included or housed upon or within the top case portion can easily be included within the storage modules inherent to the bottom case portion.

It should also be noted that the depictions of the conductors shown in all of the drawings and described within this specification are each illustrated as being single conductors for reasons of simplification of the drawings. However, it should be understood that the conductor illustrations are meant to primarily show the routing and points of connection and in actuality, each conductor shown might be equivalent to one or more conductors or represent a multi-conductor bundle. Also, the number of conductors shown in the multi-conductor ribbon/bundle is meant as being illustrative only and would vary in accordance with the type and number of electrical hardware components it might serve.

Another alternative format and option for the protective phone case of this invention is user elected ownership and/or interchangement (swapping out) of the phone owner's current Case Top Portion and current Proximate Hardware package with a Case Top Portion that is already pre-equipped and preset with alternative hardware and APP options/features that have been selected and ordered by that owner in congruence with their varied or changing interests.

The one or more power cells that comprise the substantive rechargeable, or otherwise replenishable, onboard power supply system of the casing may make use of the same or similar points of interface with the retained mobile device so as to automatically or selectively provide backup power and/or recharging capabilities to the one or more rechargeable power cells of the mobile device and its related power supply system. Advantageously, the charging cycles for both systems can be conducted simultaneously without separation or removal of the mobile device from the confines of the casing holster. The charging cycle and power transmission between the protective case and the mobile device is also well suited to be conducted wirelessly through inductive charging between the case and mobile device due to their close layered proximity to one another.

The limited space and volume of the containment modules located within the upper portion of the case are reserved for the pertinent hardware capable of conducting the greatest range of computer tasks from the MAP structure that have become popular to the public. The greater volume and space afforded within the containment modules located in the lower case portion can be utilized to host the more redundant or non-specific hardware that supports and/or controls the upper case portion hardware in performance and execution of the desired set of computer tasks.

System command and control may be conducted solely via the processor capabilities contained on the mobile device platform or supporting logic and control may be provided through one or more additional processors to be provided and located upon the protective case platform. Smart processor design and integration within and between the two cooperative command and control systems will minimize power consumption and extend the length of time between charges for the power cells of both platforms and their related powered systems that will thereby expedite smooth execution of the operational parameters for the particular APP and function desired by the phone owner/user. Also, at some point, the phone case platform may have multiple hardware systems controlled by its own co-processor that would thereby increase the complexity for the selection and management of the various APPS to a degree that it might be useful to supply a case borne graphic display that would show and convey "simplified" operational information directly to the user.

The current conventional requirement for a phone user to keep track of a growing number of electronic devices/products that are physically extraneous to the platform of their phone, while importantly remembering to retain those devices handy on their person, can become a cumbersome and obtrusive endeavor. The likelihood that the electrical products will either be left behind and thereby be unavailable when needed or, even if the extraneous pieces of equipment are consistently remembered and carried by the user, they might become damaged, misplaced, stolen, or even lost. Yet these supplemental devices and their highly useful functions remain greatly desired and sought by the phone owner consumer public.

The MAP is the "Swiss Army Knife" equivalent for the convenient carry and consistent supply of "Supplemental to the Phone" hardware capable of instantly running computer applications that are useful and important to the everyday phone user!

It is requested to be recognized that the preceding description of packaged and/or individual features and functions outlined for the protective case system of the subject invention are meant as description and illustration only and are not to be construed as limiting in scope, use, or intellectual protection sought for other designs, variations, or diverse embodiments for cooperative and/or parallel applications of usage of the present invention.

Upon further consideration, many other advantages and utilizations of the applicant's invention will become apparent to those skilled in the art from the previous descriptions, drawings, and claims hereupon and it is thereby respectfully requested that these new and varied uses, iterations, and embodiments also fall within the scope of the intellectual protection sought.

Such scope is limited only by the following appended claims as read in light of and connection with the preceding specification and the corresponding illustration.

I claim:

1. In a cell phone protective case having an electrical and data interconnectivity with a cell phone wherein the improvement comprises a stored, housed and enclosed multiple applications platform (MAP) with at least one deployable, retractable and integral MAP case component that is part of at least one protective case component of an at least two component protective case with an electrical or mechanical connection between the deployable, retractable and integral MAP case component and the at least one protective case component of the at least two component protective case and a cell phone protective case platform interface to the cell phone to run similar and dissimilar applications upon the stored, housed and enclosed multiple applications platform (MAP) and having a universal charging and power connection between the cell phone protective case and the cell phone and wherein once the at least two component protective case is assembled it has at least one standalone or independent function capable of operating without the cell phone.

2. The cell phone protective case of claim 1 further comprising a power supply disposed in the protective case.

3. The cell phone protective case of claim 1 wherein one component of the at least two component protective case accommodates the at least one deployable, retractable and integral MAP case component to monitor, treat and/or analyze biomedical conditions.

4. The cell phone protective case of claim 1 wherein one component of the at least two component protective case accommodates a breath composition device.

5. The cell phone protective case of claim 4 wherein the breath composition device measures alcohol content.

6. The cell phone protective case of claim 4 wherein the breath composition device measures lung capacity or lung condition.

7. The cell phone protective case of claim 1 wherein one component of the at least two component protective case accommodates a device to measure parameters of an environmental gas.

8. The cell phone protective case of claim 7 wherein the device to measure parameters of an environmental gas measures parameters of a poisonous gas or a hazardous gas.

9. The cell phone protective case of claim 8 wherein the poisonous gas is carbon monoxide.

10. The cell phone protective case of claim 1 wherein one component of the at least two component protective case has a device to detect explosives.

11. The cell phone protective case of claim 1 wherein one component of the at least two component protective case has a device for the detection and analysis of body fluids.

12. The cell phone protective case of claim 11 wherein one of the body fluids is blood.

13. The cell phone protective case of claim 12 wherein the blood glucose level is detected and analyzed.

14. The cell phone protective case of claim 1 wherein one component of the at least two component protective case detects texting and driving.

15. The cell phone protective case of claim 1 wherein one component of the at least two component protective case has a device to monitor or provide for personal security and the security of the cell phone.

16. The cell phone protective case of claim 15 wherein the personal security includes a stun gun.

17. The cell phone protective case of claim 1 wherein the at least one standalone or independent function is a cell phone security or a personal security function.

18. The cell phone protective case of claim 1 wherein the at least one standalone or independent function provides analysis of air, gas or a liquid.

19. The cell phone protective case of claim 18 further comprising an air, gas or liquid interconnect between the at least two components of the protective case.

20. The cell phone protective case of claim 19 further comprising a vapor inhaler system.

21. The cell phone protective case of claim 1 wherein the at least one deployable, retractable and integral MAP case component is housed in a bay within the at least one component of the two component protective case.

22. The cell phone protective case of claim 21 wherein the at least one deployable, retractable and integral MAP case component is a mechanical or electrical MAP.

23. The cell phone protective case of claim 22 further comprising sliding gas retention sidewalls (SGRS).

24. The cell phone protective case of claim 22 further comprising a vent and a vent closure cover.

25. The cell phone protective case of claim 21 wherein the bay has lids to open and close the bay.

26. A wireless device protective case comprising:
(a) a protective case top portion to protect one portion of a perimeter of the wireless device;
(b) a protective case bottom portion to protect the remaining portion of the perimeter of the wireless device;
(c) a data/power/charge port disposed in the protective case top portion or the protective case bottom portion to slidably engage and interconnect with a data/power/charge port of the wireless device;
(d) a stored, housed and enclosed multiple applications platform (MAP) with at least one deployable, retractable and integral MAP case component that is part of the protective case top portion, the protective case bottom portion or both; and
(e) an electrical connection between the protective case top portion and the protective case bottom portion to interconnect the top portion with the bottom portion wherein the electrical connection provides at least one independent function or standalone device capable of operating independent of the wireless device.

27. The wireless device of claim 26 wherein the electrical connection is an electromechanical connection.

28. The wireless device protective case of claim 26 further comprising a battery disposed in the protective case bottom portion or the protective case top portion or intermediate the protective case bottom portion and the protective case top portion.

29. The wireless device protective case of claim 28 wherein the battery is housed in the protective case bottom portion.

30. The wireless device protective case of claim 26 further comprising a proximate hardware module.

31. The wireless device protective case of claim 30 wherein the proximate hardware module of the protective case is adjacent to the wireless device upon closure of the protective case.

32. The wireless device protective case of claim 26 further comprising a multiple applications platform (MAP).

33. The wireless device protective case of claim 32 wherein the MAP of the protective case provides for the transfer of data to another protective case.

34. The wireless device protective case of claim 32 further comprising an EMV source and a USB memory stick.

35. The wireless device protective case of claim 34 wherein the memory stick includes a removable credit card.

36. A cell phone protective case comprising:
   (a) a protective case top portion having a case retentive connection with an electrical and/or mechanical contact;
   (b) a protective case bottom portion having at one end a data/power/charge port to slidably engage and interconnect with a data/power/charge port of a cell phone and at the other end the case retentive connection with the electrical and/or mechanical contact to interconnect the electrical and/or mechanical contact of the protective case top portion with the electrical and/or mechanical contact on the protective case bottom portion and connect the data/power/charge port of a cell phone data/power/charge port when the protective case top portion and the protective case bottom portion are closed;
   (c) a battery in the protective case bottom portion connected to the data/power/charge port of the cell phone; and
   (d) a multiple applications platform (MAP) fully housed and enclosed within the protective case top portion and/or the protective case bottom portion and with at least one retractable and deployable MAP component that is part of the protective case top portion or protective case bottom portion and is retractably housed and enclosed within the protective top case portion or the protective case bottom portion and wherein when the protective case top portion and the protective case bottom portion are assembled there is at least one independent function capable of operating without the cell phone.

37. The cell phone protective case of claim 36 further comprising a MAP to MAP exchange of data.

38. The cell phone protective case of claim 36 wherein the MAP runs related and unrelated computer applications with the computer applications of the cell phone.

39. The cell phone protective case of claim 38 wherein the MAP includes a module for preventing texting and driving.

40. The cell phone protective case of claim 36 wherein the retractable and deployable MAP component is a bottom MAP retractable structure.

41. The cell phone protective case of claim 40 further comprising an air passage and wherein the MAP includes a breath analyzer connected to the air passage.

42. The cell phone protective case of claim 36 further comprising an air gas, vapor or liquid interconnect and a bidirectional air gas, vapor or liquid passage to connect the protective case top portion to the protective case bottom portion.

43. The cell phone protective case of claim 36 wherein the standalone or independent function of an assembled at least two component protective case is a multimeter.

\* \* \* \* \*